(12) United States Patent
Kondo et al.

(10) Patent No.: US 8,218,637 B2
(45) Date of Patent: Jul. 10, 2012

(54) IMAGE PROCESSING APPARATUS AND ASSOCIATED METHOD

(75) Inventors: Tetsujiro Kondo, Tokyo (JP); Tsutomu Watanabe, Kanagawa (JP); Takafumi Morifuji, Tokyo (JP)

(73) Assignee: Sony Corporation, Tokyo (JP)

( * ) Notice: Subject to any disclaimer, the term of this patent is extended or adjusted under 35 U.S.C. 154(b) by 1384 days.

(21) Appl. No.: 11/828,102

(22) Filed: Jul. 25, 2007

(65) Prior Publication Data

US 2008/0008245 A1    Jan. 10, 2008

Related U.S. Application Data

(62) Division of application No. 10/744,043, filed on Dec. 24, 2003, now Pat. No. 7,974,345.

(30) Foreign Application Priority Data

Dec. 24, 2002 (JP) ................................ 2002-371403

(51) Int. Cl.
*H04N 7/12* (2006.01)
*H04N 11/02* (2006.01)
(52) U.S. Cl. .............................. 375/240.16; 375/240.12
(58) Field of Classification Search . 375/240.01–240.29
See application file for complete search history.

(56) References Cited

U.S. PATENT DOCUMENTS

| | | | |
|---|---|---|---|
| 5,132,792 A | 7/1992 | Yonemitsu et al. | |
| 5,253,065 A | 10/1993 | Richards et al. | |
| 5,400,087 A | 3/1995 | Uramoto et al. | |
| 5,469,212 A | 11/1995 | Lee | |
| 5,608,458 A | 3/1997 | Chen et al. | |
| 5,701,164 A | 12/1997 | Kato | |
| 5,731,850 A | 3/1998 | Maturi et al. | |
| 5,838,391 A | 11/1998 | Kim | |
| 5,867,221 A * | 2/1999 | Pullen et al. | 375/240.16 |
| 5,872,604 A | 2/1999 | Ogura | |
| 5,946,044 A * | 8/1999 | Kondo et al. | 348/458 |
| 6,057,884 A | 5/2000 | Chen et al. | |
| 6,148,030 A | 11/2000 | Katata et al. | |
| 6,380,986 B1 | 4/2002 | Minami et al. | |
| 6,442,203 B1 | 8/2002 | Demos | |
| 6,738,099 B2 | 5/2004 | Osberger | |

FOREIGN PATENT DOCUMENTS

EP    944265 A2    9/1999

OTHER PUBLICATIONS

Ardizzone, E. et al. "Video Indexing Using Motion Compensation Vectors", 1999 IEEE International Conference on Multimedia Computing and Systems, vol. 2, pp. 725-729.

* cited by examiner

*Primary Examiner* — David Czekaj
(74) *Attorney, Agent, or Firm* — Oblon, Spivak, McClelland, Maier & Neustadt, L.L.P.

(57) ABSTRACT

An image data processing method includes selecting a motion compensating vector of a noticed region based on additional information added to student data. The image data processing method also includes classifying the noticed region into one of a plurality of classes based on the motion compensating vector selected by the selecting. In addition, the image data processing method includes constructing a prediction tap of the noticed region based on the motion compensating vector selected by the selecting and learning a prediction coefficient based on the one of the plurality of classes using teacher data corresponding to the constructed prediction tap. The image data processing method additionally includes producing prediction coefficient data for each class, based on the prediction coefficient. The image data processing method further includes storing the prediction coefficient data in a coefficient memory based on a quantization scale and a bit rate.

5 Claims, 62 Drawing Sheets

F I G. 6 A
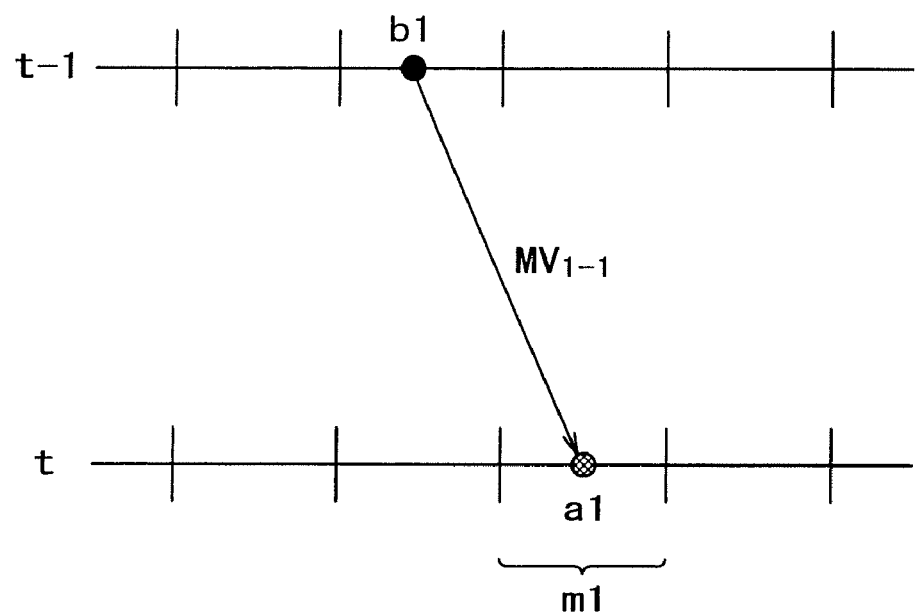
F I G. 6 B
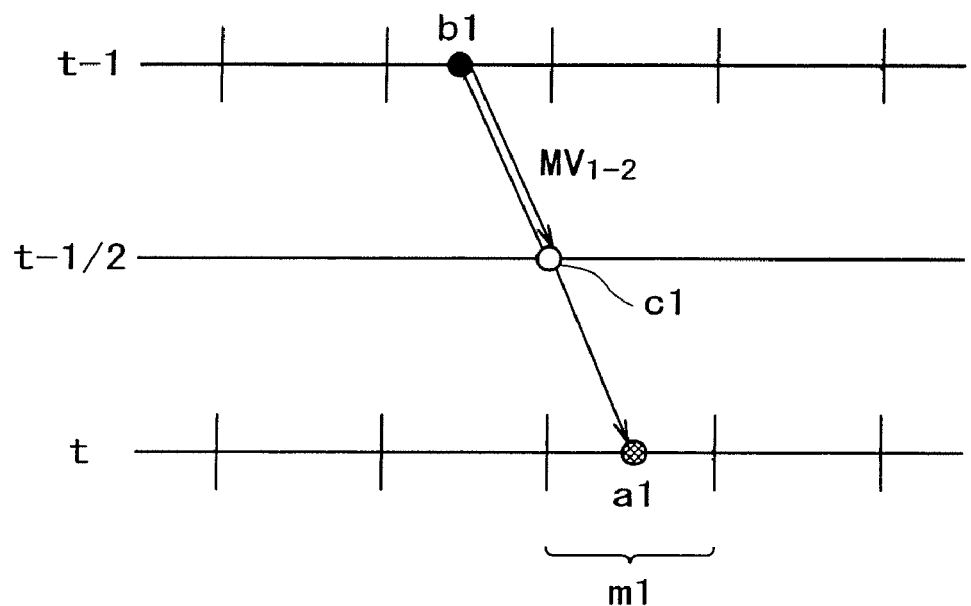

F I G. 8
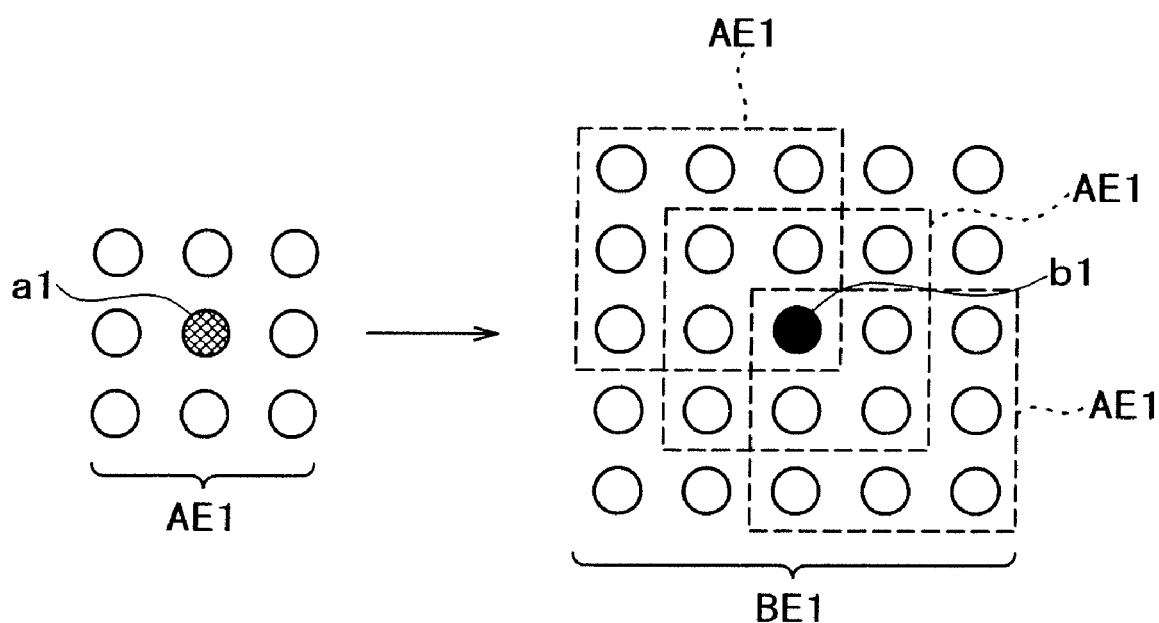

F I G. 9
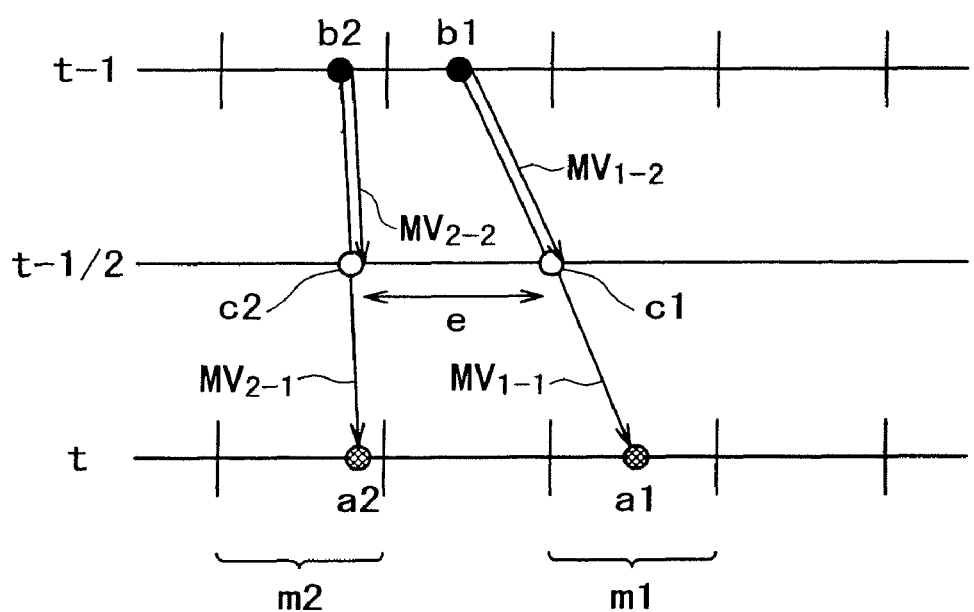

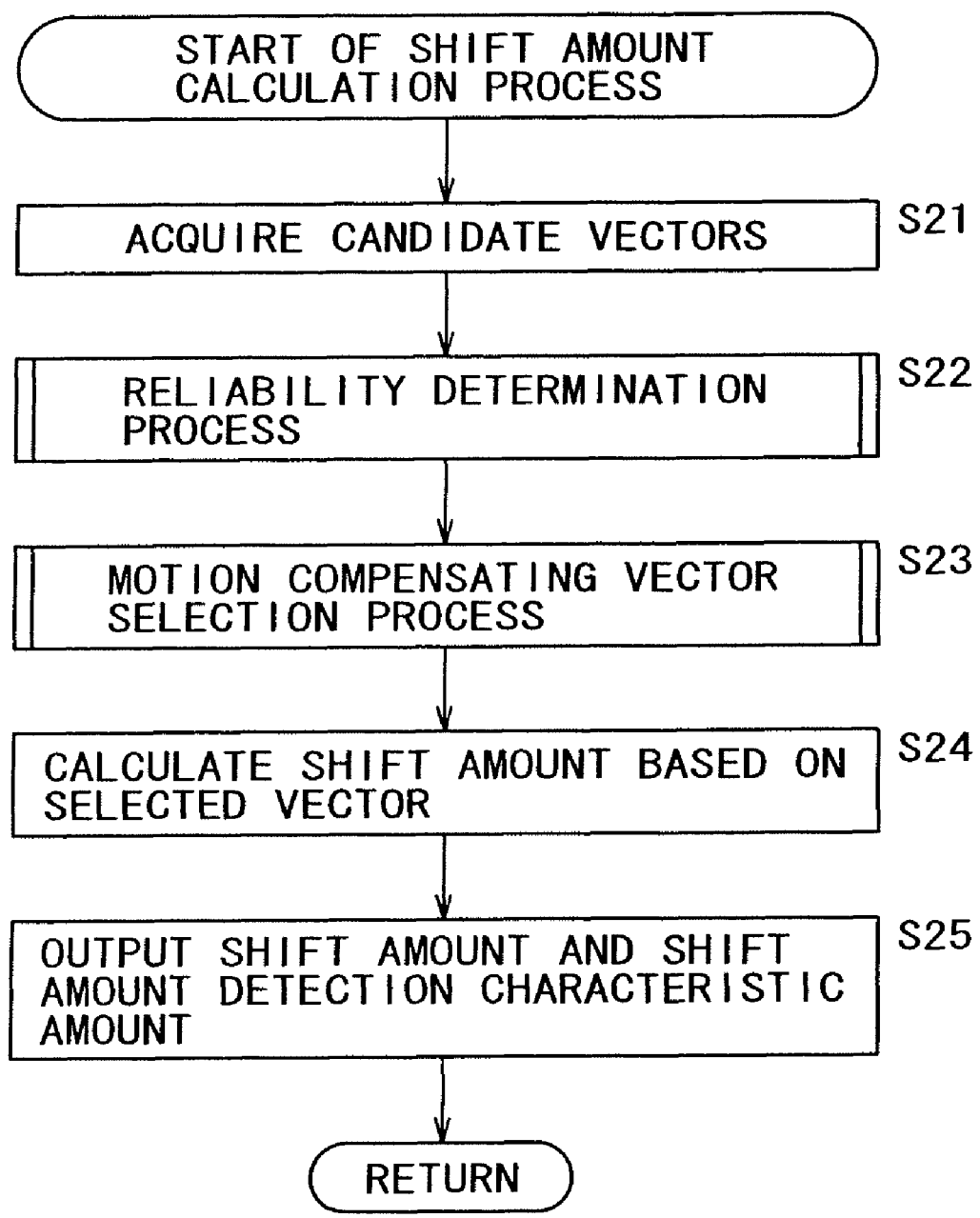

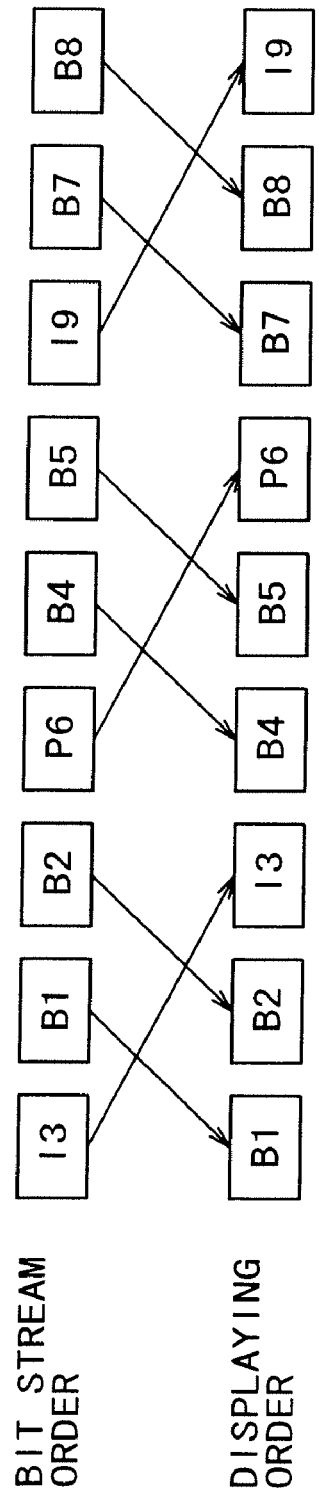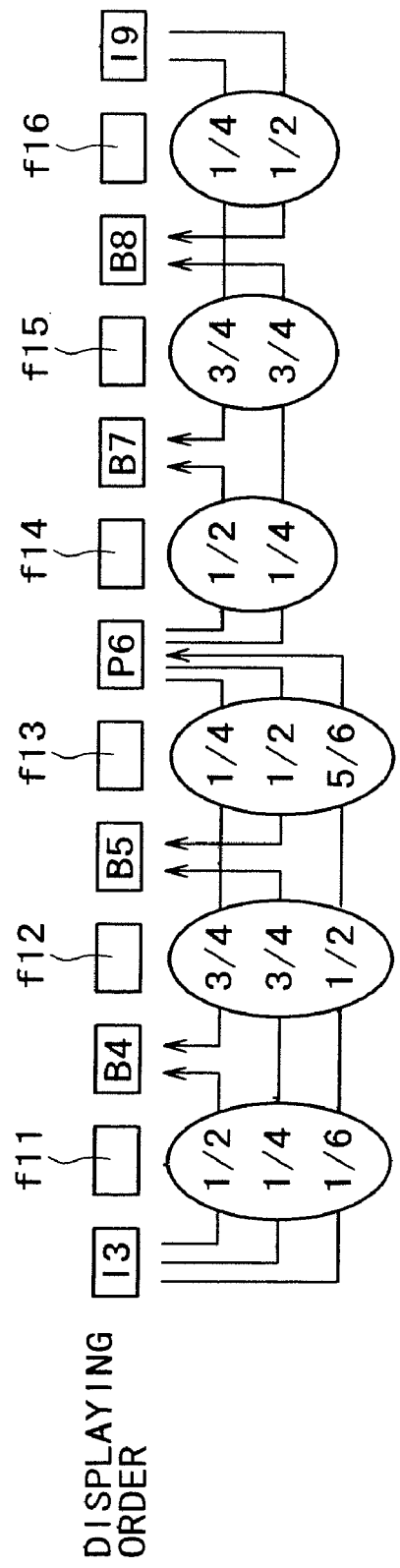

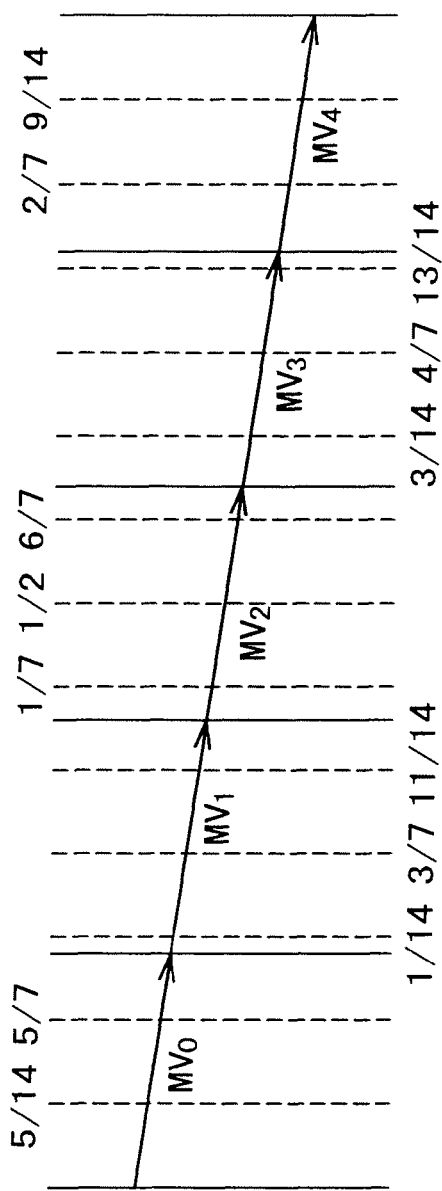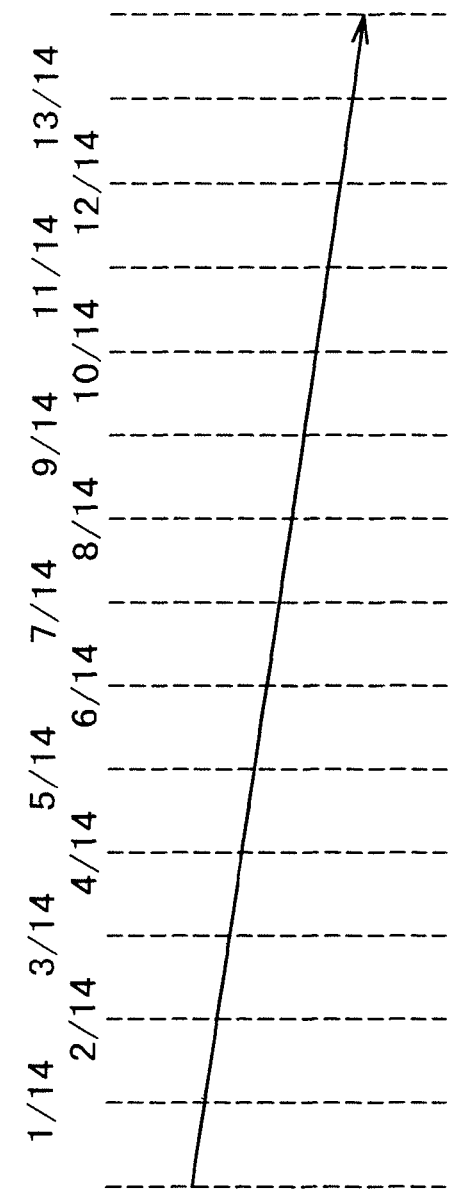
FIG. 15A
FIG. 15B

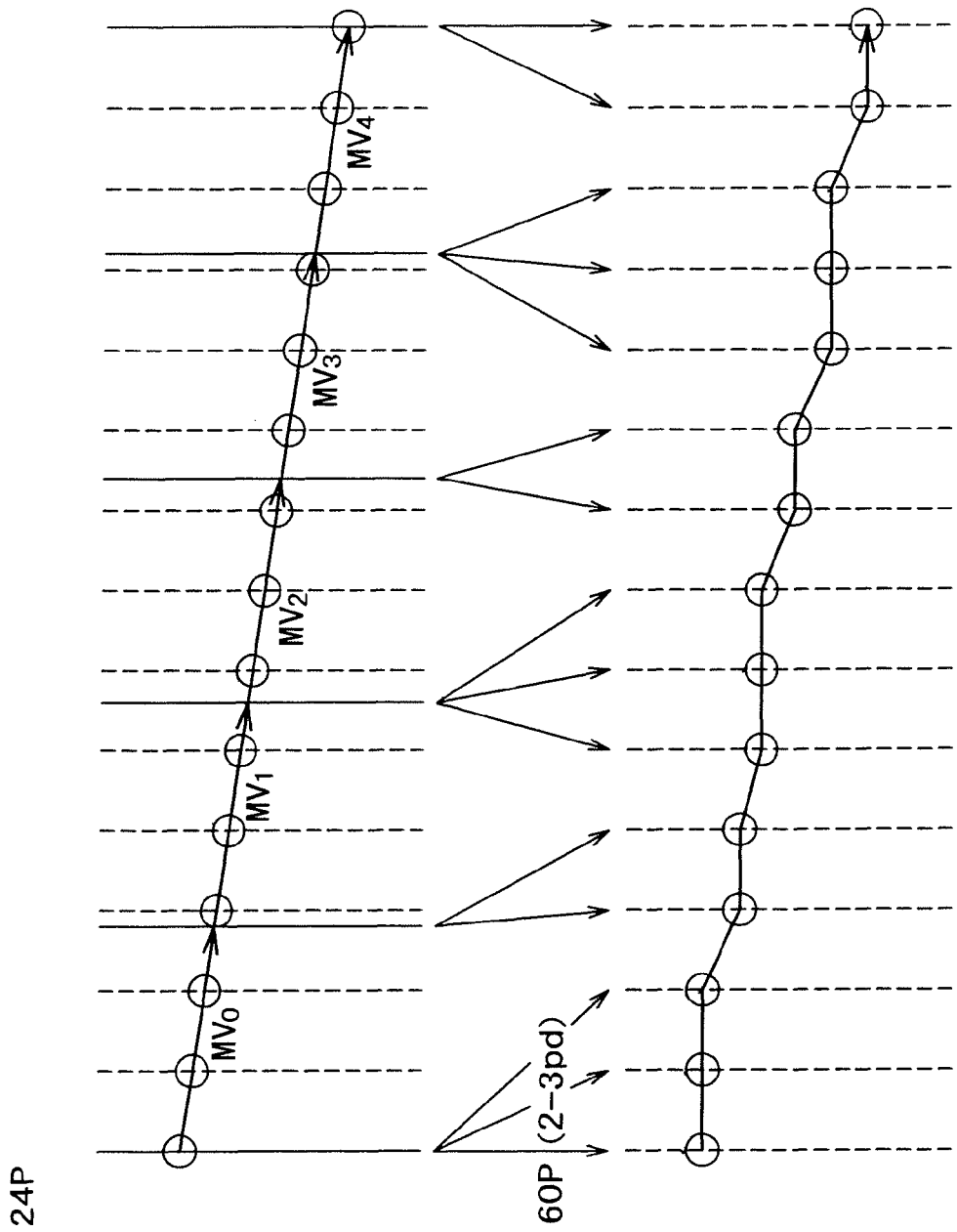

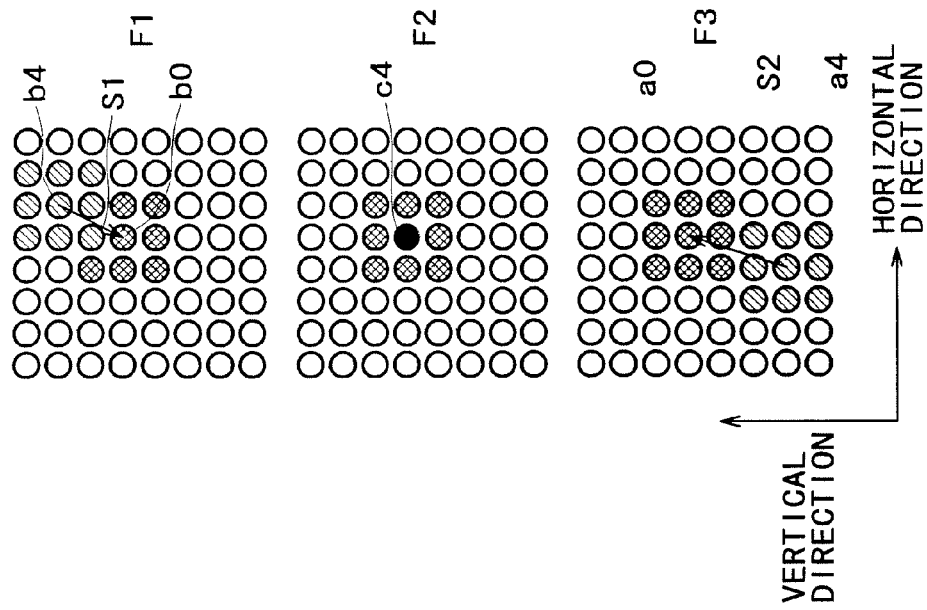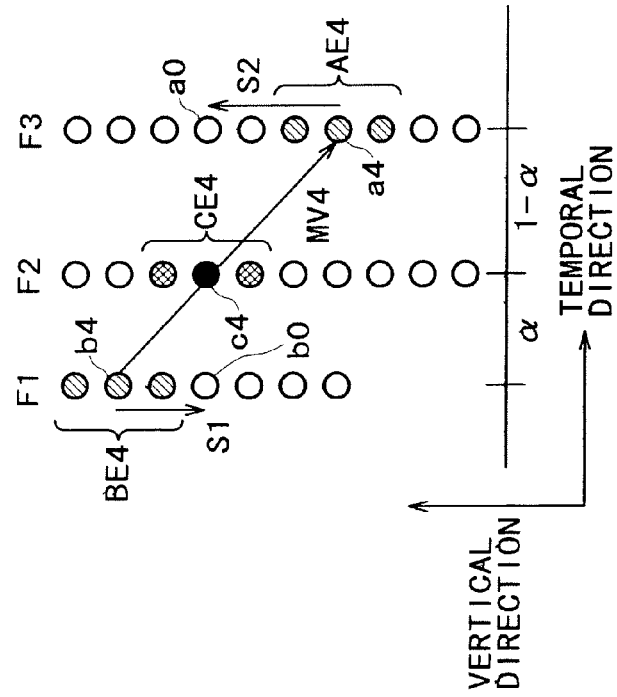

IMAGE PROCESSING APPARATUS AND ASSOCIATED METHOD

CROSS REFERENCE

This application is a Division of and claims the benefit of priority under 35 USC §120 from U.S. Ser. No. 10/744,043, filed Dec. 24, 2003, and claims the benefit of priority under 35 USC §119 from Japanese Patent Application No. 2002-371403, filed Dec. 24, 2002, the entire contents of each are incorporated herein by reference.

BACKGROUND OF THE INVENTION

The present invention relates to an image data processing apparatus and associated method, a recording medium, and a program. More particularly, the present invention relates to an image data processing apparatus and method. A recording medium, and program by which the quality of an image signal can be enhanced.

A method of performing 2-3 pull-down of encoded images of a DVD (Digital Versatile Disc) or the like such as 24 P (Progressive) (24 frames per 60 fields) images of a video signal or the like into 60i (Interlace) (60 fields per second) or 60 P (Progressive) (60 frames per second) images is known as disclosed in Japan Laid-Open Patent Application No. HEI 07-123291.

Additionally, in order to increase the number of frames, a temporal resolution creation process is sometimes used as disclosed in Japan Laid-Open Patent Application No. Hei 2002-199349.

Conventionally, in order to perform temporal resolution creation, motion compensating vectors are determined from a creation (image) signal produced once, and then the motion compensating vectors are utilized to perform a temporal resolution creation process.

However, since a creation signal produced contains coding distortion, the method of performing creation of a time resolution utilizing motion compensating vectors determined from a creation signal cannot accurately calculate motion. Accordingly, there is a problem that presently known methods of temporal resolution creation do not provide an optimal image quality.

SUMMARY OF THE INVENTION

It is an object of the present invention to improve the quality of an image signal.

According to a first aspect of the present invention, there is provided an image data processing apparatus, having a first selection means for selecting a motion compensating vector of a noticed region based on additional information added to image data. A classification means classifies the noticed region into one of a plurality of classes based on the motion compensating vector selected by the first selection means. A second selection means selects a prediction coefficient based on the class classified by the classification means A construction means constructs a prediction tap of the noticed region. An arithmetic operation means arithmetically operates a resolution creation signal based on the selected prediction coefficient and the prediction tap.

The image data processing apparatus may be configured such that it further includes a first extraction means for extracting a plurality of candidate vectors of the motion compensating vector from the additional information. A reliability calculation means calculates a reliability of each of the candidate vectors. An evaluation means evaluates the reliabilities of the candidate vectors calculated by the reliability calculation means. The first selection means selects the candidate vectors evaluated to have the highest reliability by the evaluation means as the motion compensating vector of the noticed region.

The reliability calculation means may include re-encoding means for re-encoding an input signal of the noticed region. A second extraction means extracts re-encoded vectors corresponding to the candidate vectors from the re-encoded signal. A comparison means compares the candidate vectors with the re-encoded vectors extracted by the second extraction means to calculate the reliabilities of the candidate vectors.

The reliability calculation means may include neighborhood vector extraction means for extracting neighborhood vectors corresponding to the candidate vectors. A comparison means compares the candidate vectors with the neighborhood vectors to calculate the reliabilities of the candidate vectors.

The reliability calculation means may include history extraction means for extracting a vector history corresponding to each of the candidate vectors. A comparison means compares the candidate vectors with the candidate vectors in the past obtained from the vector history to calculate the reliabilities of the candidate vectors.

The reliability calculation means may include history extraction means for extracting a vector history corresponding to each of the candidate vectors. A discontinuity evaluation means calculates the reliability of each of the candidate vectors from a discontinuity in motion of the candidate vector obtained from the vector history.

The reliability calculation means may include extraction means for extracting a motion compensating vector of an overall screen. A comparison means compares the candidate vectors with the motion compensating vector of the overall screen to calculate the reliabilities of the candidate vectors.

The reliability calculation means may calculate the reliabilities of the candidate vectors based on motion compensation residuals of the candidate vectors.

The first selection means may select, when the candidate vector evaluated to have the highest reliability by the evaluation means cannot be selected as the motion compensating vector of the noticed region, that one of the candidate vectors whose motion compensation residual is the smallest as the motion compensating vector of the noticed region.

The image data processing apparatus may be configured such that it further includes tap extraction means for extracting the noticed region as a tap based on the motion compensating vector selected by the first selection means. The classification means classifies the noticed region into one of the plurality of classes based on a positional relationship of the noticed region drawn near as a tap by the tap extraction means and a boundary of the noticed region before drawn near as a tap by the tap extraction means.

An image data processing method of the first aspect includes selecting a motion compensating vector of a noticed region based on additional information added to image data. A classification of the noticed region into one of a plurality of classes based on the motion compensating vector selected by the process of the first selection step. A second selection of a prediction coefficient based on the class classified by the process of the classification step. A construction prediction tap of the noticed region, arithmetically operating a resolution creation signal based on the selected prediction coefficient and the prediction tap.

A program of a recording medium of the first aspect includes a first selection of a motion compensating vector of a noticed region based on additional information added to image data. A classification of the noticed region into one of a plurality of classes based on the motion compensating vector selected by the process of the first selection step. A second selection of a prediction coefficient based on the class classified by the process of the classification step. Constructing a prediction tap of the noticed region, and an arithmetic operation step of arithmetically operating a resolution creation signal based on the selected prediction coefficient and the prediction tap.

A program of the first aspect causes a data processing device to select a motion compensating vector of a noticed region based on additional information added to image data. The data processor classifies the noticed region into one of a plurality of classes based on the motion compensating vector selected by the process of the first selection step. The data processor selects a prediction coefficient based on the class classified by the process of the classification step. The data processor constructs a prediction tap of the noticed region, and arithmetically operates a resolution creation signal based on the selected prediction coefficient and the prediction tap.

According to a further aspect, there is provided an image data processing apparatus having a selection means for selecting a motion compensating vector of a noticed region based on additional information added to student data. A classification means classifies the noticed region into one of a plurality of classes based on the motion compensating vector selected by the selection means. A learning means constructs a prediction tap of the noticed region based on the motion compensating vector selected by the selection means and learning a prediction coefficient based on the class classified by the classification means using teacher data corresponding to the constructed learning tap.

The image data processing apparatus may be configured such that it further includes tap extraction means for extracting the noticed region as a tap based on the motion compensating vector selected by the selection means. The classification means classifies the noticed region into one of the plurality of classes based on a positional relationship of the noticed region drawn near as a tap by the tap extraction means and a boundary of the noticed region before tap extraction as a tap by the tap extraction means.

An image data processing method of the further aspect of the present invention includes selecting a motion compensating vector of a noticed region based on additional information added to student data. The method classifies the noticed region into one of a plurality of classes based on the motion compensating vector selected by the process of the selection. The method constructs a prediction tap of the noticed region based on the motion compensating vector selected by the process of the selection step and learning a prediction coefficient based on the class classified by the process of the classification step using teacher data corresponding to the constructed learning tap.

A program of a recording medium of the further aspect includes selecting a motion compensating vector of a noticed region based on additional information added to student data, classifying the noticed region into one of a plurality of classes based on the motion compensating vector selected by the process of the selection step, and constructing a prediction tap of the noticed region based on the motion compensating vector selected by the process of the selection step and learning a prediction coefficient based on the class classified by the process of the classification step using teacher data corresponding to the constructed learning tap.

A program of the further aspect of the present invention causes a computer to select a motion compensating vector of a noticed region based on additional information added to student data, classify the noticed region into one of a plurality of classes based on the motion compensating vector selected by the process of the selection step, and construct a prediction tap of the noticed region based on the motion compensating vector selected by the process of the selection step and learning a prediction coefficient based on the class classified by the process of the classification step using teacher data corresponding to the constructed learning tap.

In the first aspect, a motion compensating vector of a noticed region is selected based on additional information added to image data, and the noticed region is classified into one of a plurality of classes based on the selected motion compensating vector. Then, a prediction coefficient is selected and a prediction tap of the noticed region is constructed based on the class obtained by the classification. Next, a resolution creation signal is arithmetically operated based on the selected prediction coefficient and the prediction tap.

In the further aspect of the present invention, a motion compensating vector of a noticed region is selected based on additional information added to student data, and the noticed region is classified into one of a plurality of classes based on the selected motion compensating vector. A prediction tap of the noticed region is constructed based on the selected motion compensating vector, and a prediction coefficient is learned based on the class obtained by the classification using teacher data corresponding to the constructed prediction tap.

BRIEF DESCRIPTION OF THE SEVERAL VIEWS OF THE DRAWINGS

FIGS. 6A and 6B are time charts illustrating an exemplary tap extraction where M=1;

FIG. 8 is a pixel grouping of an exemplary tap extraction where M=1;

FIG. 9 is a time chart showing another exemplary of tap extraction where M=1;

FIG. 12 is a flow chart illustrating a shift amount calculation process at step S2 of FIG. 11;

FIGS. 13A and 13B are display orders illustrating an exemplary motion compensating vector in the temporal direction where M=3;

FIGS. 15A and 15B are motion vector charts illustrating an exemplary creation of a time resolution;

FIGS. 16A and 16B are motion vector charts illustrating an exemplary conventional creation of a time resolution;

FIGS. 47A and 47B are pixel maps illustrating an exemplary tap extraction;

DETAILED DESCRIPTION OF THE INVENTION

In the following, an exemplary embodiment of the present invention is described with reference to the drawings.

Figure 1:
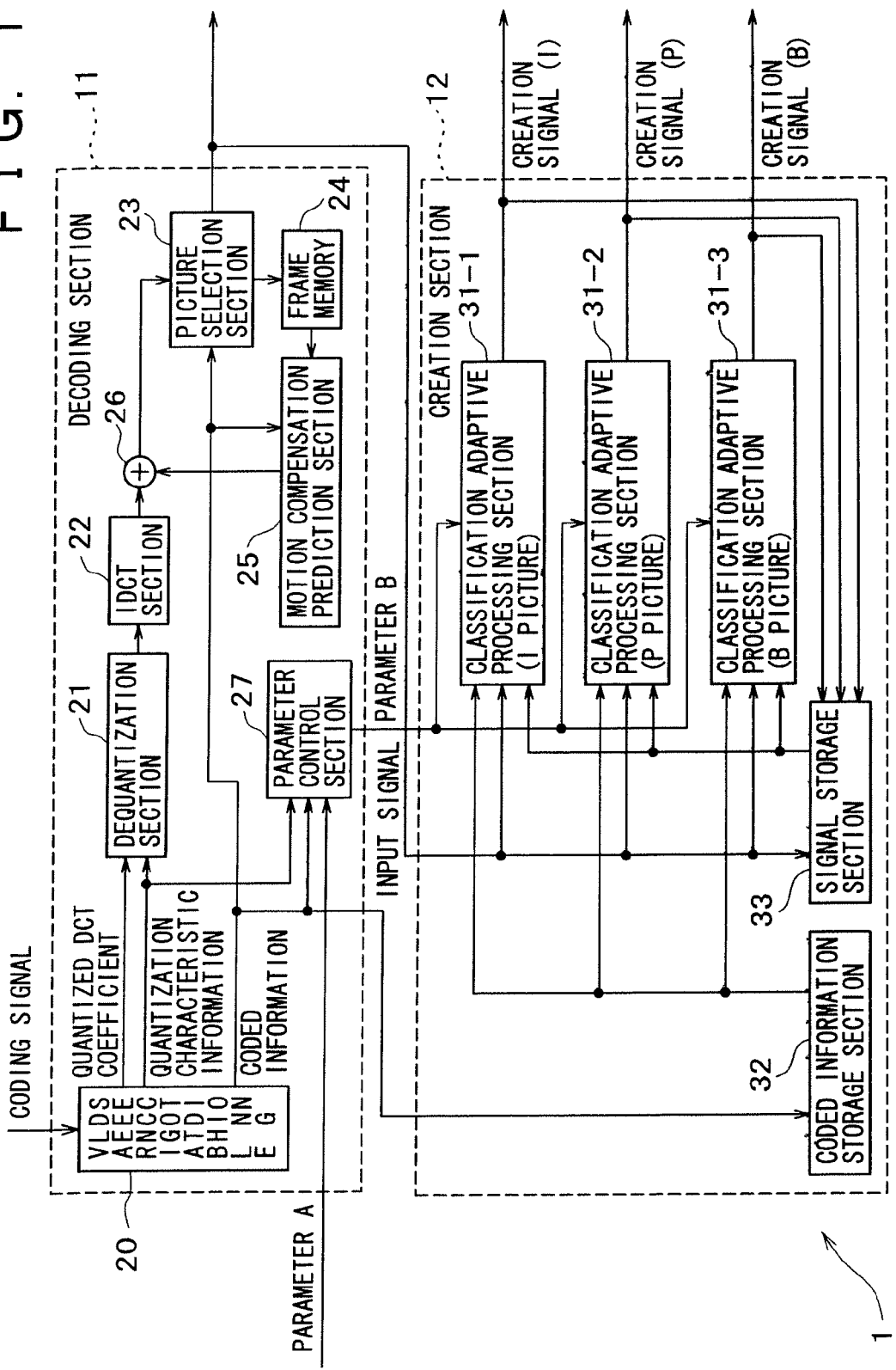
FIG. 1 is a high level block diagram showing an exemplary configuration of an image data processing apparatus in accordance with the present invention.

FIG. 1 shows a configuration of an image data processing apparatus 1 to which the present invention is applied. It is to be noted that, while the image data processing apparatus 1 includes various features for other processes such as a process of encoding data, in the example shown in FIG. 1, the description of such features are omitted for convenience of illustration and brevity.

The image data processing apparatus 1 includes a decoding section 11 and a creation section 12. In the image data processing apparatus 1, a coded signal of the MPEG (Moving Picture Experts Group) 2 system of 30 P (30 frames per second) images, for example, is decoded by the decoding section 11, and a time resolution is created by tap extraction based on motion compensation of a pixel of interest and 60 P (60 frames per minute) images are produced (creation) by the creation section 12.

The decoding section 11 includes a variable length decoding section 20, a dequantization section 21, an IDCT (Inverse Discrete Cosine Transform) section 22, a picture selection section 23, a frame memory 24, a motion compensation prediction section 25, an adder 26 and a parameter control section 27. In the decoding section 11, the variable length decoding section 20 quantizes a coded signal input thereto, decodes, demultiplexes and extracts a quantized DCT coefficient from the quantized coded signal and adds the quantized DCT coefficient to the coded signal, and then decodes, demultiplexes and extracts quantization characteristic information and coded information transmitted thereto as side information.

The dequantization section 21 receives the quantized DCT coefficient and the quantization characteristic information extracted by the variable length decoding section 20 as inputs thereto and dequantizes the quantized DCT coefficient based on the quantization characteristic information to restore the DCT coefficient. The IDCT (Inverse Discrete Cosine Transform) section 22 inverse discrete cosine transforms the restored DCT coefficient to calculate a pixel value. An output of the IDCT section 22 exhibits an actual pixel value where the image in question is an I (information) picture but exhibits a difference value between corresponding pixel values where the image in question is a P (predicted) or B (bi-directional) picture.

The picture selection section 23 receives the coded information demultiplexed by the variable length decoding section 20 as an input thereto and outputs an image signal from the adder 26 as a decoded signal when the coded information input indicates an image (B picture) which is not referred to by any other picture (that is, which is not used for a motion compensation prediction process). However, when the input coded information indicates an image (I picture or P picture) which is referred to by some other picture (that is, which is used for a motion compensation prediction process), the picture selection section 23 outputs the image signal from the adder 26 as a decoded signal and besides supplies the image signal to the frame memory 24 so that it may be stored into the frame memory 24. The motion compensation prediction section 25 performs motion compensation for the image data stored in the frame memory 24 based on a motion compensating vector. The adder 26 adds a signal from the motion compensation prediction section 25 to the difference signal (signal of a P picture or a B picture) from the IDCT section 22 and outputs a resulting signal to the picture selection section 23.

The parameter control section 27 receives a parameter A from an input section 416 (FIG. 62) based on an operation of a user. The parameter A is, for example, a Volume value. The Volume value is a value for picture quality adjustment for making the horizontal resolution and the vertical resolution have suitable values at the same time, for making the horizontal resolution, vertical resolution and noise removal degree have suitable values at the same time, or the like. Details of the Volume value are disclosed, for example, in Japanese Patent Laid-Open No. 2002-218414, the contents of which are incorporated by reference herein. Further, the parameter control section 27 provides a conversion function using a quantization scale of the quantization characteristic information and a bit rate of the coded information extracted by the variable length decoding section 20 to determine a parameter B from the parameter A and supplies the parameter B to classification adaptive processing sections 31-1 to 31-3.

For example, when "1.0" of the parameter A is arithmetically operated with a conversion function for use where the bit rate is "10 Mbps" and the quantization scale is "40", "1.00" of the parameter B is obtained. Meanwhile, when "1.0" of the parameter A is arithmetically operated with a conversion function for use where the bit rate is "10 Mbps" and the quantization scale is "20", "0.50" of the parameter B is obtained. When "0.5" of the parameter A is arithmetically operated with a conversion function for use where the bit rate is "10 Mbps" and the quantization scale is "40", "0.50" of the parameter B is obtained. When "0.5" of the parameter A is arithmetically operated with a conversion function for use where the bit rate is "10 Mbps" and the quantization scale is "20", "0.25" of the parameter B is obtained.

In other words, the parameter B is obtained by conversion of the parameter A in accordance with the bit rate and the quantization scale. While the parameter A assumes a value within a range necessary for picture quality adjustment as viewed from a user (human being), since the parameter B is given as a combination of the parameter A with the bit rate and the quantization scale, the number of values within the range is greater than that of the parameter A. As a result, finer adjustment can be achieved.

The creation section 12 includes classification adaptive processing sections 31-1 to 31-3, a coded information storage section 32 and a signal storage section 33. The classification adaptive processing sections 31-1 to 31-3 execute classification adaptation processes for an I picture, a P picture and a B picture, respectively, and fetch data of an I picture, a P picture and a B picture from an input signal supplied thereto from the picture selection section 23 based on coded information from the coded information storage section 32. Since the classification adaptive processing sections 31-1 to 31-3 have a basically same configuration except that they process different pictures from one another, where there is no necessity to distinguish them from one another, each of them is referred to merely as classification adaptive processing section 31.

Each classification adaptive processing section 31 determines the reliability of each of motion compensating vectors of coded information extracted by the variable length decoding section 20 and stored in the coded information storage section 32 using a decoded signal (hereinafter referred to as input signal) input from the picture selection section 23 of the decoding section 11 and a creation signal output from the classification adaptive processing section 31 and stored once into the signal storage section 33 and selects a predetermined motion compensating vector based on the determined reliabilities. Where only a motion compensating vector having a high reliability is used in this manner, a high quality temporal resolution process can be achieved. The classification adaptive processing section 31 arithmetically operates a shift amount of a noticed pixel (central tap) based on the selected motion compensating vector (selected vector), constructs a class tap by the tap extraction from the input signal and the creation signal and determines a class in accordance with a characteristic amount thus determined. Further, the classification adaptive processing section 31 constructs a prediction tap by the tap extraction from the input signal and the creation signal, executes a prediction arithmetic operation process for the prediction tap using prediction coefficient data selected based on the class from within coefficient memories 71-0 to 71-N (FIG. 2) corresponding to the parameter B from the parameter control section 27 to produce a creation signal of a time resolution and outputs the creation signal.

The coded information storage section 32 stores coded information of a plurality of frames demultiplexed from the side information by the variable length decoding section 20 of the decoding section 11. The coded information is formed from, for example, a motion compensating vector and so forth. Consequently, upon classification, a motion compensating vector can be referred to not only in a spatial direction (within the same frame) but also in a temporal direction (across different frames), that is, in both of the spatial and temporal directions.

The signal storage section 33 stores the input signal supplied thereto from the picture selection section 23 and creation signals produced by the classification adaptive processing sections 31. The input signal and a creation signal have a positional relationship between the present and the past in time. Consequently, upon classification or upon prediction tap construction, signals in the temporal and spatial directions can be referred.

Figure 2:
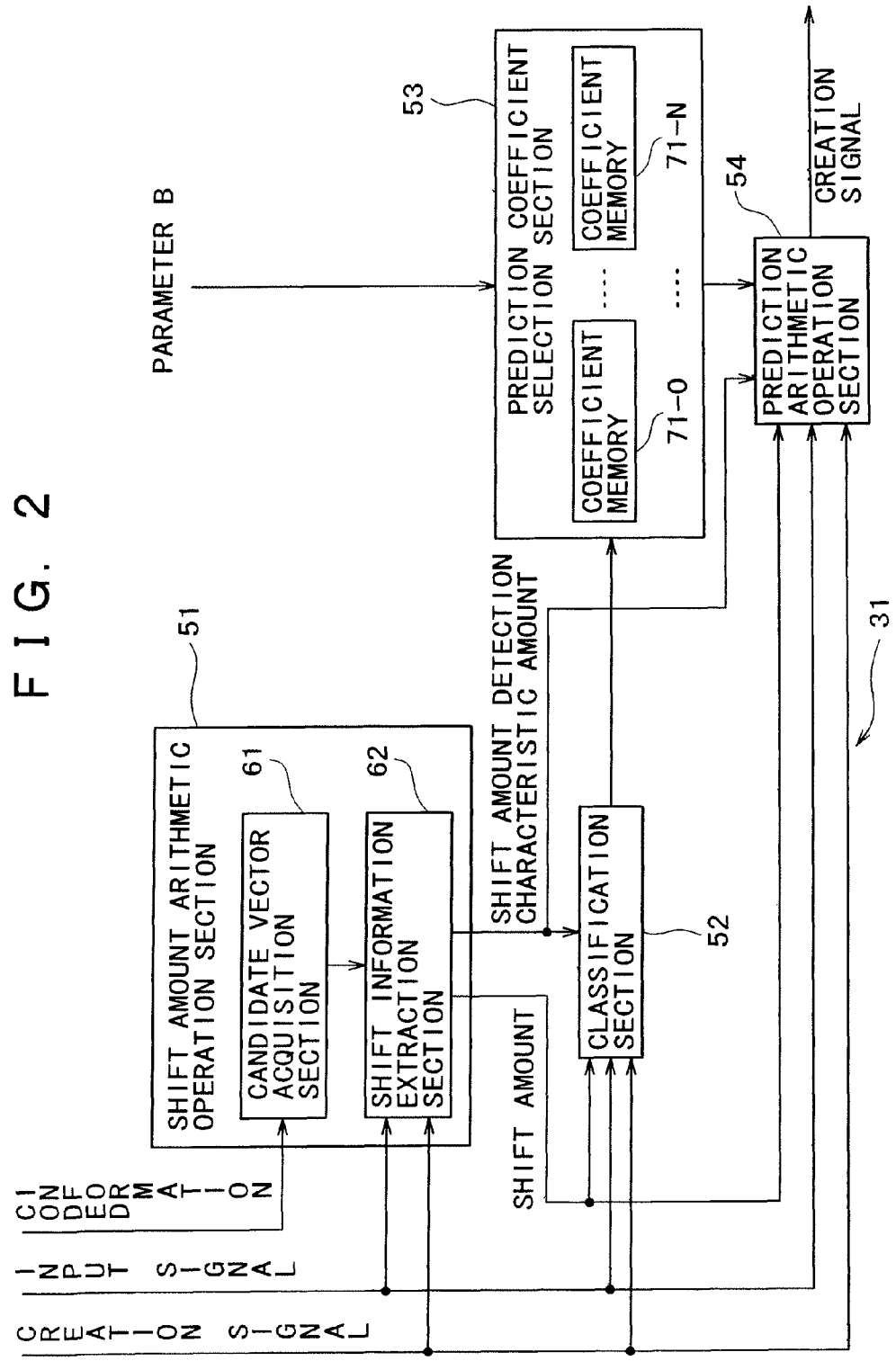
FIG. 2 is a high level block diagram showing an exemplary configuration of a classification adaptation processing section of FIG. 1.

FIG. 2 shows a first example of configuration of the classification adaptive processing section 31 of FIG. 1.

A shift amount arithmetic operation section 51 includes a candidate vector acquisition section 61 and a shift information extraction section 62. The candidate vector acquisition section 61 acquires motion compensating vectors relating to a noticed pixel (motion compensating pixels in the temporal direction and the spatial direction) from coded information stored in the coded information storage section 32.

The shift information extraction section 62 uses the input signal supplied from the picture selection section 23 and the creation signal stored in the signal storage section 33 to evaluate the reliability of candidate vectors corresponding to the noticed pixel from among the candidate vectors (motion compensating vectors) acquired by the candidate vector acquisition section 61 to select that one of the candidate vectors which is discriminated to have the highest reliability as a selected vector. Then, the shift information extraction section 62 detects, based on the selected vector, shift information representative of a shift amount of the noticed pixel (central tap), the reliability, a motion compensation residual or the like of the motion vector as a shift amount detection characteristic amount and outputs the shift information and the shift amount detection characteristic amount to a classification section 52 and a prediction arithmetic operation section 54.

The classification section 52 uses the input signal supplied from the picture selection section 23 of the decoding section 11 and the creation signal supplied from the signal storage section 33 to construct a class tap by the tap extraction based on the shift amount and the shift amount detection characteristic amount supplied from the shift information extraction section 62, detects a characteristic amount of the class tap, produces a class code based on the detected characteristic amount, and outputs the class code to a prediction coefficient selection section 53.

The prediction coefficient selection section 53 selects, from among the coefficient memories 71-0 to 71-N, that coefficient memory corresponding to the parameter B supplied from the parameter control section 27 of the decoding section 11. Then, the prediction coefficient selection section 53 selects, from among prediction coefficient data stored in advance in the selected coefficient memory, that prediction coefficient data which corresponds to the class code produced by the classification section 52, and outputs the selected prediction coefficient data to the prediction arithmetic operation section 54. It is to be noted that such prediction coefficient data are calculated by a learning apparatus 301 hereinafter described with reference to FIG. 51 and stored in advance into the coefficient memories 71-0 to 71-N in accordance with the parameter B.

The prediction arithmetic operation section 54 uses the input signal supplied from the picture selection section 23 of the decoding section 11 and the creation signal supplied from the signal storage section 33 to construct a prediction tap by the tap extraction based on the shift amount and the shift amount detection characteristic amount of the central tap supplied from the shift information extraction section 62, executes a prediction arithmetic operation process using the prediction coefficient data from the prediction coefficient selection section 53 based on the prediction tap to produce a creation signal of a created time resolution and outputs the creation signal.

Figure 3:
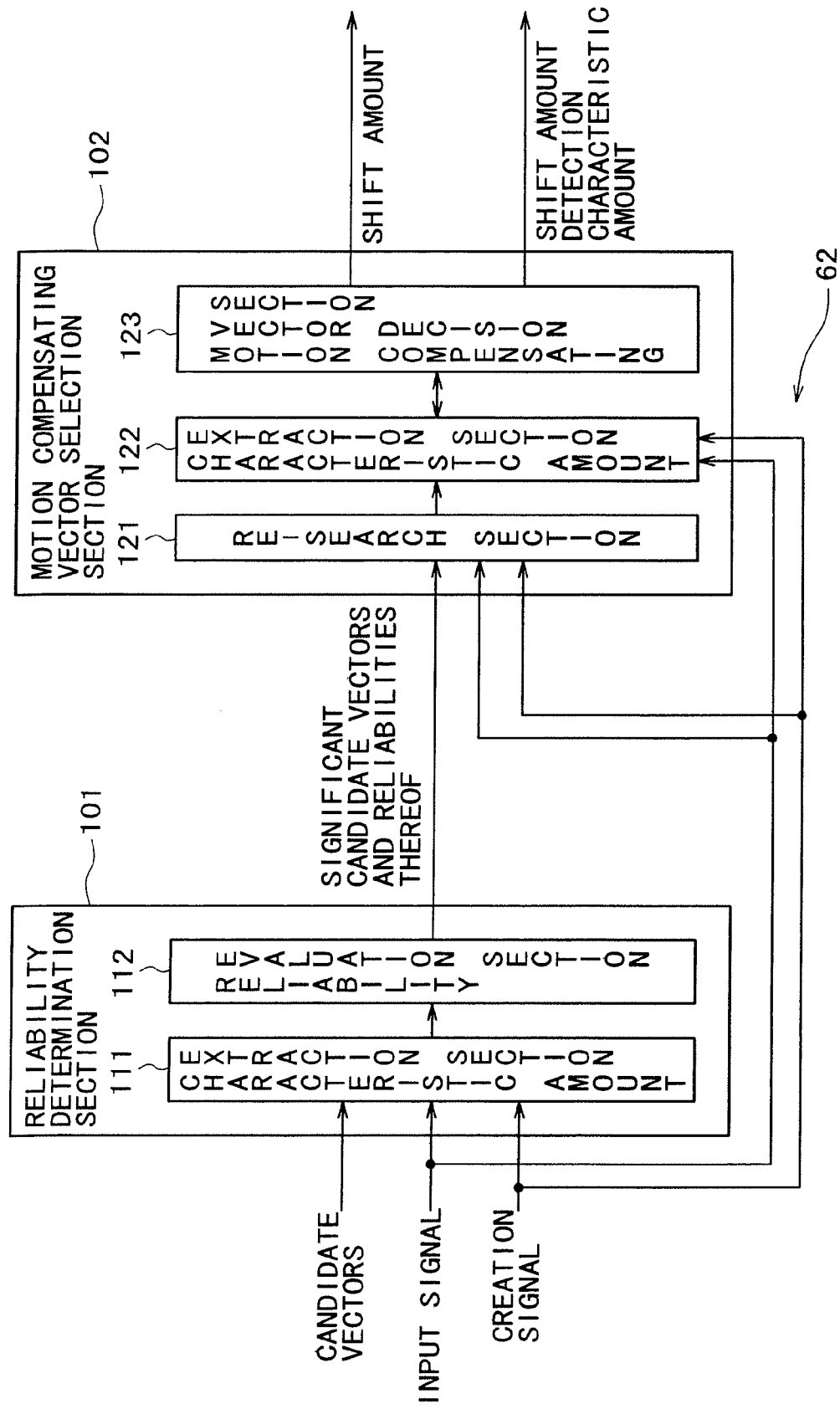
FIG. 3 is a block diagram showing an exemplary configuration of a shift information extraction section of FIG. 2.

FIG. 3 shows a first example of configuration of the shift information extraction section 62 of FIG. 2.

In the example of FIG. 3, the shift information extraction section 62 includes a reliability determination section 101 and a motion compensating vector selection section 102. The reliability determination section 101 receives the candidate vectors acquired by the candidate vector acquisition section 61, the input signal supplied from the picture selection section 23 of the decoding section 11 and the creation signal supplied from the signal storage section 33 as input signals thereto.

A characteristic amount extraction section (reliability arithmetic operation section) 111 of the reliability determination section 101 uses the input signal or the creation signal to calculate a motion compensation residual of a candidate vector to determine the reliability of the candidate vector (for example, it is determined that the smaller the motion compensation residual, the higher the reliability). Alternatively, the characteristic amount extraction section 111 re-encodes the input signal or the creation signal, extracts a motion compensating vector corresponding to a candidate vector from within the re-encoded information, and compares such motion compensating vectors to determine the reliabilities of the candidate vectors (for example, it is determined that the smaller the absolute value of the difference between the two vectors, the higher the reliability). It is to be noted that this process is hereinafter described in detail with reference to FIG. 26. A reliability evaluation section 112 discriminates whether or not the reliabilities of the candidate vectors determined by the characteristic amount extraction section 111 are higher than a predetermined reference value, determines those candidate vectors determined to have higher reliabilities than the reference value as significant vectors and outputs the significant candidate vectors to the motion compensating vector selection section 102 together with the reliabilities of them.

The reliability determination section 101 includes a re-search section 121, a characteristic amount extraction section 122 and a motion compensating vector decision section 123. The re-search section 121 uses the input signal or the creation signal to take elements around a start point, around an end point or around a midpoint of each of the significant candidate vectors output from the reliability evaluation section 112 into consideration to determine a weighted mean to re-search whether or not there is a motion compensating vector which is more suitable (has a higher reliability). If a more suitable motion compensating vector is found, then the re-search section 121 outputs the motion compensating vector to the characteristic amount extraction section 122 (processing of FIGS. 8 and 29 hereinafter described).

The characteristic amount extraction section (reliability arithmetic operation section) 122 uses the input signal or the creation signal to calculate motion compensation residuals of the candidate vectors based on the re-searched significant candidate vectors and the reliabilities of them to determine the reliabilities of the candidate vectors. The motion compensating vector decision section 123 selects, from among the significant candidate motion vectors, that candidate vector which has the highest reliability as a selected vector and determines a shift amount of the noticed pixel (central tap) based on the selected vector. Further, the motion compensating vector decision section 123 outputs a shift amount detection characteristic amount such as, for example, the reliability or the motion compensation residual of the determined candidate vector to the classification section 52 and the prediction arithmetic operation section 54 together with the shift amount of the central tap.

Figure 4:
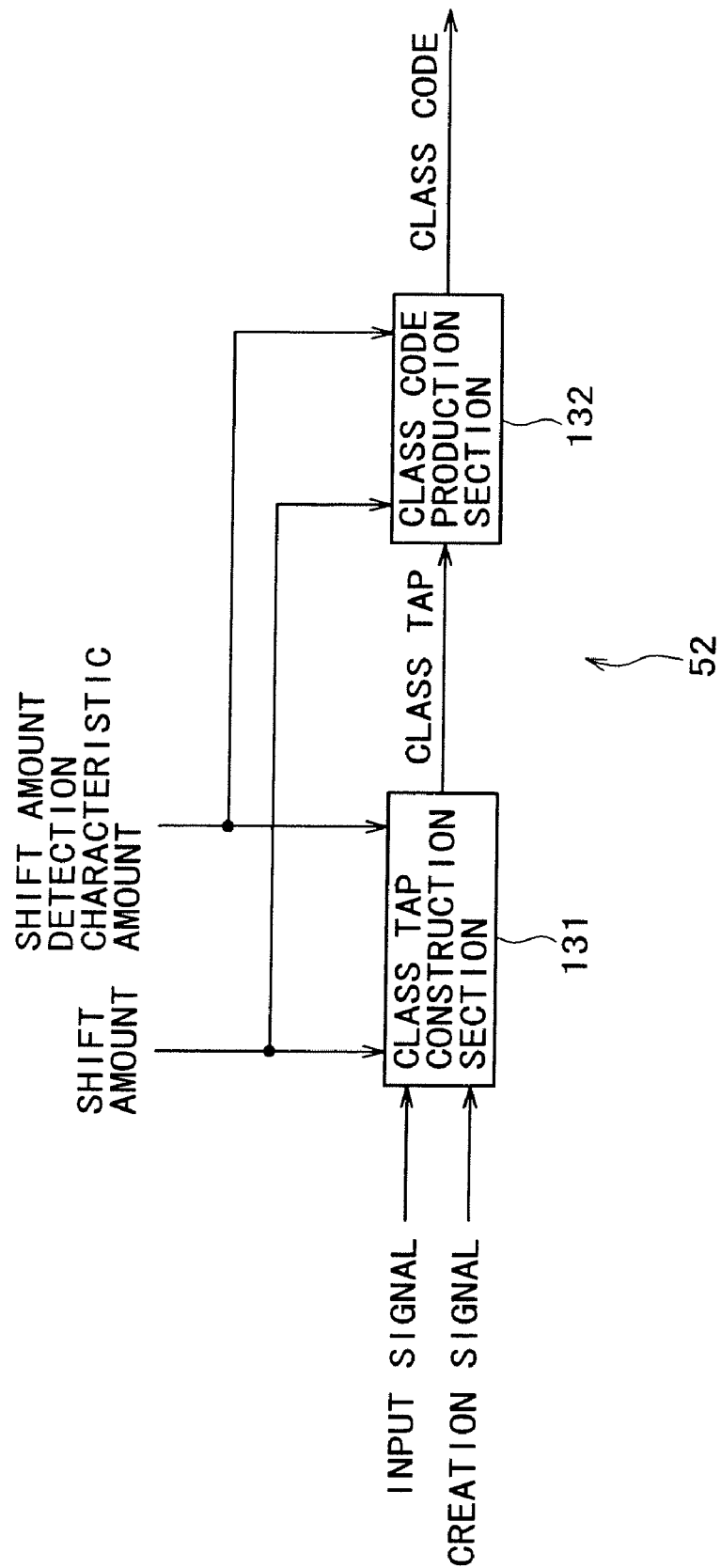
FIG. 4 is a block diagram showing an exemplary configuration of a classification section of FIG. 2.

FIG. 4 shows an example of a configuration of the classification section 52 of FIG. 2.

The classification section 52 includes a class tap construction section 131 and a class code production section 132. The class tap construction section 131 determines a creation pixel by the tap extraction from the input signal and the creation signal based on the shift amount and the shift amount detection characteristic amount from the motion compensating vector decision section 123, constructs a class tap (pixel) corresponding to the creation pixel necessary for execution of classification and outputs the class tap to the class code production section 132.

The class code production section 132 extracts a characteristic amount of the class tap constructed by the class tap construction section 131 based on the shift amount and the shift amount detection characteristic amount. The characteristic amount may be, for example, a shift amount (direction, magnitude) of the central tap, a motion compensation residual from within the shift amount detection characteristic amount, a reliability of a motion compensating vector from within the shift amount detection characteristic amount, a pattern of a block boundary upon the tap extraction or the like. Further, the class code production section 132 decides a class of the creation pixel based on a threshold value set in advance or the like in accordance with the extracted characteristic amount of the class tap, produces a class code of the decided class and outputs the class code to the prediction coefficient selection section 53.

Figure 5:
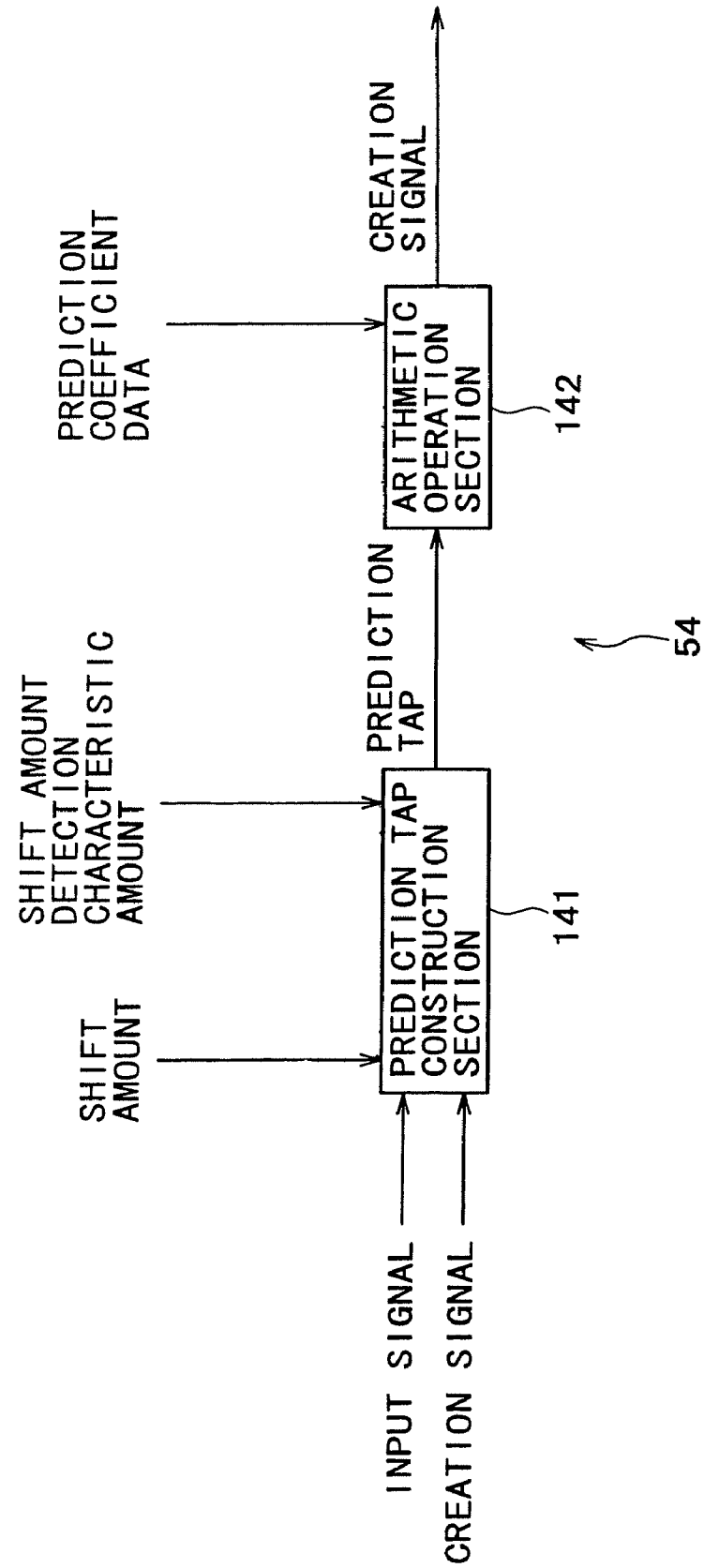
FIG. 5 is a block diagram showing an exemplary configuration of a prediction arithmetic operation section of FIG. 2.

FIG. 5 shows an example of a configuration of the prediction arithmetic operation section 54 of FIG. 2.

The prediction arithmetic operation section 54 includes a prediction tap construction section 141 and an arithmetic operation section 142. The prediction tap construction section 141 determines a creation pixel by the tap extraction from the input signal and the creation signal based on the shift amount and the shift amount detection characteristic amount from the motion compensating vector decision section 123, constructs a prediction tap (pixel) corresponding to the creation pixel and outputs the prediction tap to the arithmetic operation section 142.

The arithmetic operation section 142 multiplies the prediction tap from the prediction tap construction section 141 by the prediction coefficient data determined by the prediction coefficient selection section 53 based on the shift amount and the shift amount detection characteristic amount from the motion compensating vector decision section 123 to execute a prediction arithmetic operation process to produce a creation signal of a time solution and outputs the creation signal.

Now, a principle of a creation process of a time resolution carried out in the present invention is described with reference to FIGS. 6 to 10. It is to be noted that, in the example of FIGS. 6 to 10, images of 30 P are converted into images of 60 P through creation of a time resolution and M is M=1 where the GOP structure includes no B picture (a structure of I, P, P, P, . . . pictures).

FIG. 6 illustrates frames at times t and t−1. In the example of FIG. 6, a partition between frames indicates a macro block. First, as shown in FIG. 6A, a macro block m1 to which a noticed pixel a1 at time t belongs is determined, and a macro block type, a prediction method and a motion compensating vector MV 1-1 of the macro block m1 of the noticed pixel a1 are acquired from the coded information of the side information. Then, a reference pixel b1 at time t−1 is determined based on the acquired prediction method.

Then, as seen in FIG. 6B, a creation pixel c1 at time t−½ intermediate between time t1, at which motion compensation (MC) is performed with a motion compensating vector MV1-2, and time t−1 is determined from the reference pixel b1 of at the determined time t−1 (in simple determination, MV1-2=(½)MV1-1 is used). The creation pixel c1 at time t−½ (t−1<t−½<t) is determined in such a manner as described above, and an intermediate frame from the creation pixel c1 is created. In other words, creation of a time resolution by the tap extraction (detailed meaning of which is hereinafter described with reference to FIG. 47).

Figure 7:
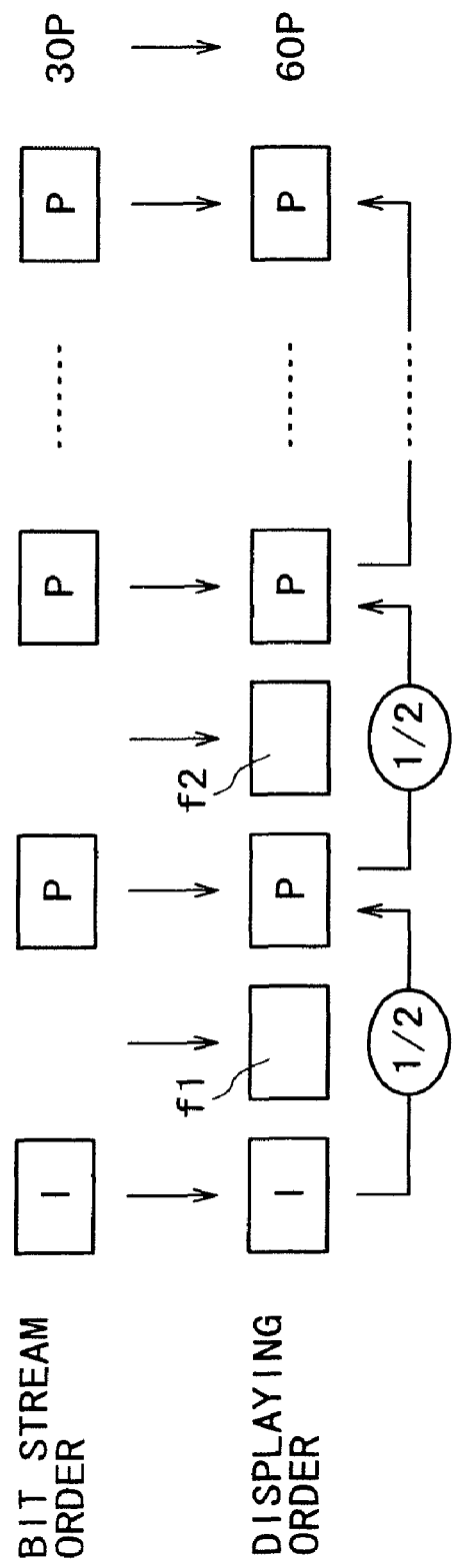
FIG. 7 is a frame sequence of an exemplary creation of an intermediate frame where M=1.
Figure 10:
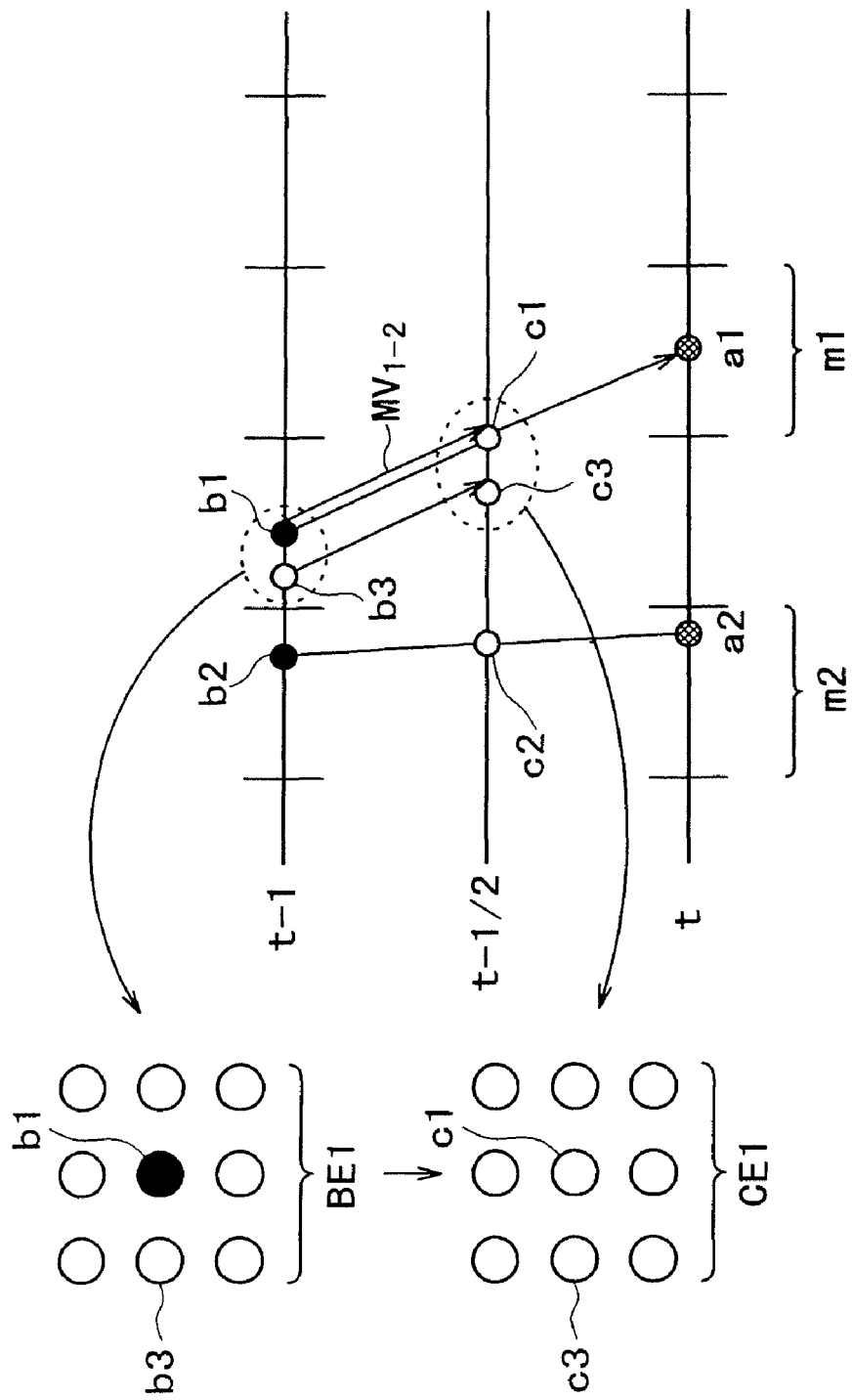
FIG. 10 is a time chart showing a further exemplary tap extraction where M=1.

Further, where M=1, since the I picture and the P pictures among the pictures appearing in order as I, P, P, . . . , P are displayed in this order, in order to convert 30 P images into 60 P images through creation of a time resolution as seen in FIG. 7, motion compensation is performed based on the motion compensating vectors each beginning with the I picture and ending with a P picture, and an intermediate frame f1, another intermediate frame f2, . . . are created between the frames of the pictures and displayed.

In the example of FIG. 7, frames appearing in order in a bit stream are shown in the upper stage, and frames appearing in a displaying order are shown in the lower stage. An arrow mark below each of the pictures appearing in the displaying order in the lower stage indicates a candidate vector in the temporal direction which can be used as a motion compensating vector. The start point of each arrow mark indicates a frame at the start point of a motion vector in the temporal direction (a frame including the reference pixel) while the end point of the arrow mark indicates a frame at the end point of the candidate vector in the temporal direction (a frame including the noticed pixel). Further, an exemplary numerical value (½) appearing on each arrow mark indicates a value for internally dividing the motion compensating vector for creation of an intermediate frame. In particular, in order to create a new frame intermediately between a frame and a next frame, a motion compensating vector obtained by multiplying the value of the motion compensating vector between the two frames by ½ is used. It is to be noted that the numerical value for the internal division is changed in accordance with the creation position of the intermediate frame, and those skilled in the art will recognize that alternative values may be utilized.

Further, in order to execute the creation of a time resolution with a higher degree of accuracy, a process described below is executed in addition to the process described above. For example, after a creation pixel c1 (FIG. 6B) is determined as shown in FIG. 8, block matching is performed again, for example, for a pixel block BE1 of 5×5 pixels in the proximity of the reference pixel b1, in a unit of a pixel based on, for example, a block AE1 of 3×3 pixels around the noticed pixel a1, and an appropriate reference pixel is determined from among the pixels. Then, the creation pixel c1 is re-produced again from the reference pixel and the noticed pixel (process of the re-search section 121 of FIG. 3).

Meanwhile, in an example of FIG. 9, similarly as in determination of the creation pixel c1 of FIG. 6, a macro block m2 to which a noticed pixel a2 at time t belongs (a macro block displaced leftwardly by a two-macro block distance from the macro block m1) is determined, and a motion compensating vector MV2-1 is acquired from the coded information of the side information, whereafter a reference pixel b2 at time t−1 is determined. Then, a creation pixel c2 motion-compensated with the motion compensating vector MV2-1 is determined from the reference pixel b2 at time t−1 thus determined (time t−½). In this instance, a range "e" within which motion compensation is difficult may possibly appear at a portion of time t−½ corresponding to a portion between the macro block m1 and the macro block m2 (boundary between the blocks).

In such an instance, when the creation pixel c1 is to be created, the block BE1 in the proximity of the reference pixel b1 is utilized to create a pixel (for example, a pixel c3) of a block CE1 including pixels in the proximity of the creation pixel c1. If such a process as just described is performed also for the macro block m2, then a pixel can be created within the range e within which motion compensation is difficult.

A creation process of a time resolution is executed using a motion compensating vector in such a manner as described above. However, if a classification adaptive process is not performed, then since a motion compensating vector is calculated unnaturally on the boundary between a moving part and a still part, a bad influence may be had on the creation of an intermediate frame. Further, since an intra-block in a prediction frame (B or P picture) does not involve a motion compensating vector, a time resolution cannot be created for the intra-block. Furthermore, since a motion compensating vector is present only in a unit of a macro block composed of 16×16 pixels, if a process for creation of a time resolution results in failure, then replacement with another block having no relation occurs, resulting in extreme deterioration of the picture quality.

Therefore, in the present invention, a classification adaptive process is used to perform a creation process.

Now, operation is described. The variable length decoding section 20 of the decoding section 11 decodes and demultiplexes a quantized DCT coefficient from within a coded signal transmitted thereto from a coding apparatus not shown and demultiplexes quantization characteristic information from within side information transmitted together with the quantized DCT coefficient, and outputs the quantized DCT coefficient and the quantization characteristic information to the dequantization section 21. The dequantization section 21 dequantizes the quantized DCT coefficient based on the quantization characteristic information. The IDCT section 22 IDCT processes the DCT coefficient dequantized by the dequantization section 21 to decode the original signal.

The motion compensation prediction section 25 uses a motion compensating vector included in the coded information decoded and extracted by the variable length decoding section 20 to perform motion compensation for an image stored in the frame memory 24 and outputs a resulting image to the adder 26. The adder 26 adds the signal motion-compensated by the motion compensation prediction section 25 to the signal output from the IDCT section 22 to produce locally decoded data and supplies the locally decoded data to the picture selection section 23. The picture selection section 23 selects the data from the adder 26 based on the coded information and outputs the selected data to an apparatus in a succeeding stage not shown and supplies necessary data from within the locally decoded data to the frame memory 24 so that the data may be stored into the frame memory 24.

The parameter control section 27 arithmetically operates a function based on the quantization characteristic information and the coded information decoded and extracted from the side information by the variable length decoding section 20 and converts a parameter A input by a user into a parameter B based on the function.

The signal storage section 33 cumulatively stores an input signal output from the picture selection section 23. Further, the coded information storage section 32 cumulatively stores the coded information decoded and extracted from the side information by the variable length decoding section 20.

Each of the classification adaptive processing sections 31-1, 31-2 and 31-3 performs a classification adaptive process to produce a creation signal for a frame of an I picture, a P picture or a B picture, respectively, and outputs the produced creation signal.

The creation process of the exemplary embodiment is described below with reference to a flow chart of FIG. 11. It is to be noted that the creation process is described briefly with reference to FIG. 11 so that a flow of the creation process may be recognized, and details of processes at different steps are hereinafter described successively referring to FIG. 12 and so forth.

The shift amount arithmetic operation section 51 of the classification adaptive processing section 31 receives, as inputs thereto, the input signal supplied from the picture selection section 23 of the decoding section 11 and the creation signal supplied from the signal storage section 33. The input signal and the creation signal have a positional relationship between the present and the past in time. It is to be noted that the creation signal may include a plurality of frames.

The shift amount arithmetic operation section 51 waits at step S1 until the input signal is input from the picture selection section 23 of the decoding section 11. If the input signal and the creation signal are input, then the shift amount arithmetic operation section 51 executes a shift amount calculation process (details of which are hereinafter described with reference to a flow chart of FIG. 12) at step S2.

At step S3, the class tap construction section 131 of the classification section 52 receives, as inputs thereto, the input signal supplied from the decoding section 11 and the creation signal supplied from the signal storage section 33, determines a creation pixel by the tap extraction based on the shift amount and the shift amount detection characteristic amount supplied from the motion compensating vector decision section 123, and constructs a class tap in accordance with the creation pixel.

At step S4, the class code production section 132 extracts a characteristic amount of the class tap constructed by the class tap construction section 131 based on the shift amount and the shift amount detection characteristic amount from the motion compensating vector decision section 123.

At step S5, the class code production section 132 determines the class of the tap (pixel) based on a threshold value set in advance or the like in accordance with the extracted characteristic amount of the class tap, produces a class code and outputs the class code to the prediction coefficient selection section 53.

At step S6, the prediction coefficient selection section 53 selects that one of the coefficient memories 71-0 to 71-N which corresponds to the parameter B supplied from the parameter control section 27 of the decoding section 11, selects that one of prediction coefficient data stored in advance in the selected coefficient memory which corresponds to the class code produced by the classification section 52, and outputs the selected prediction coefficient data to the prediction arithmetic operation section 54.

At step S7, the prediction tap construction section 141 of the prediction arithmetic operation section 54 receives, as inputs thereto, the input signal from the decoding section 11 and the creation signal stored in the signal storage section 33, determines a creation pixel by the tap extraction based on the shift amount and the shift amount detection characteristic amount supplied from the motion compensating vector decision section 123, constructs a prediction tap in accordance with the creation pixel and outputs the prediction tap to the arithmetic operation section 142.

At step S8, the arithmetic operation section 142 performs a prediction arithmetic operation process for the prediction tap constructed at step S7 using the prediction coefficient data selected by the prediction coefficient selection section 53 to produce a creation signal of a created time resolution, and outputs the creation signal.

The creation process of the present invention is executed in such a manner as described above to produce a creation signal of a created time resolution.

In the following, the processes at the steps described above are successively described more particularly. It is to be noted that the process at step S2 described above is described in detail with reference to FIGS. 12 to 46, and the processes at steps S3 to S8 are described in detail with reference to FIGS. 47 to 50.

Figure 11:
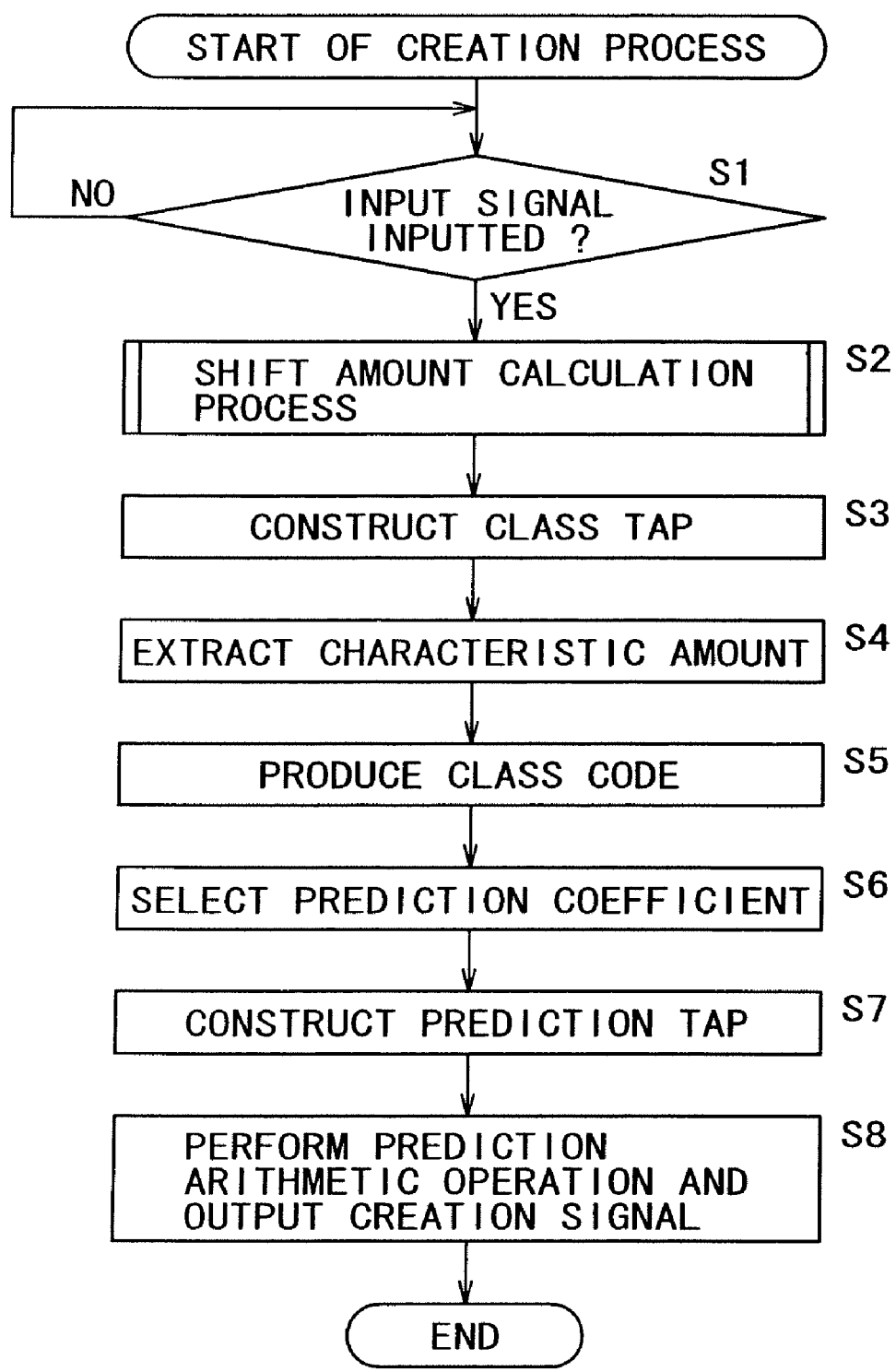
FIG. 11 is a flow chart illustrating a creation process of the classification adaptation processing section of FIG. 1.

First, the shift amount calculation process at step S2 of FIG. 11 is described with reference to a flow chart of FIG. 12.

At step S21, the candidate vector acquisition section 61 of the shift amount arithmetic operation section 51 acquires motion compensating vectors in the temporal direction and the spatial direction as candidate vectors from within the coded information supplied from the coded information storage section 32.

Figure 14A:
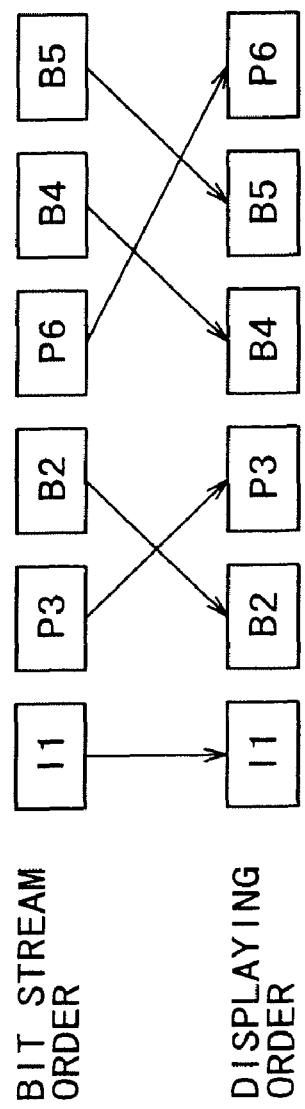
FIGS. 14A and 14B are display orders of another exemplary motion compensating vector in the temporal direction where M=3.
Figure 14B:
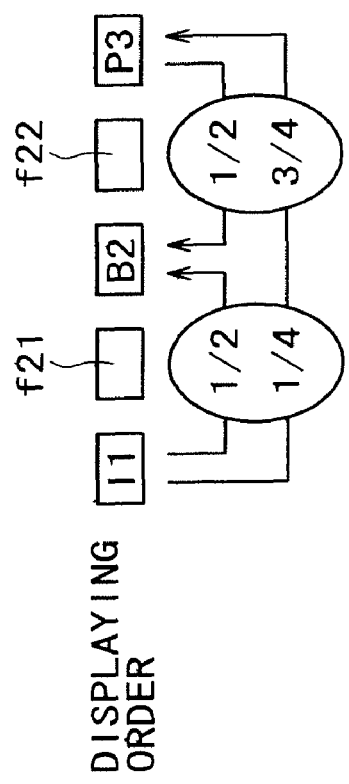

Motion compensating vectors in the temporal direction where M=3 (in the case of IBBPBB . . . pictures) are described with reference to FIGS. 13 and 14. FIG. 13A illustrates an array of frames in the temporal direction in an ordinary case, and FIG. 13B illustrates a relationship between the array of frames in the temporal direction in the ordinary case and motion compensating vectors when intermediate frames are created. Further, FIG. 14A illustrates an array of frames in the temporal direction in an exceptional case, and FIG. 14B illustrates a relationship between the array of frames in the temporal direction and motion compensating vectors in the exceptional case when intermediate frames are created. Numerals subordinate to the characters I, P and B indicate order numbers upon display of the images.

It is to be noted that, similarly as in the example of FIG. 7, in FIGS. 13B and 14B, an arrow mark directed horizontally below each of the pictures arranged in the displaying order in the lower stage indicates a motion compensating vector in the temporal direction which can be used for creation of a time resolution (that is, which can become a candidate vector). Further, the start point of each arrow mark indicates the start point of a motion compensating vector in the temporal direction while the end point of the arrow mark indicates the end point of the motion compensating vector in the temporal direction. Further, an exemplary numerical value denoted on each arrow mark indicates a value for internally dividing the motion compensating vector for creation of an intermediate frame (that is, a value for weighting). The numerical value is changed in accordance with the creation position of the intermediate frame.

In the example of FIG. 13A, after two B pictures (B4 and B5 pictures) following a first I picture (I3 picture) within the bit stream illustrated in the upper stage are displayed, a next P picture (P6 picture) is displayed. Further, after further two B pictures (B7 and B8) pictures are displayed, another I picture (I9 picture) id displayed. Different from the case wherein M=1 described above with reference to FIG. 7, the frame order (coding order) (I3, B1, B2, P6, B4, B5, I9, B7, B8, . . . ) in the bit stream in the upper stage and the frame order (B1, B2, I3, B4, B5, B6, B7, B8, I9, . . . ) in the lower stage when the frames are displayed actually are different from each other.

An intermediate frame is created in such a manner as described hereinabove with reference to FIG. 6B between each adjacent ones of frames of such pictures as described above. In the example of FIG. 13B, in order to create an intermediate frame f11 between a frame of the I3 picture and a frame of the B4 picture, at least one of a value equal to one half a motion compensating vector in the temporal direction whose start point is the I3 picture and whose end point is the B4 picture, another value equal to ¼ a motion compensating vector in the temporal direction whose start point is the I3 picture and whose end point is the B5 picture and a further value equal to ⅙ a motion compensating vector in the temporal direction whose start point is the I3 picture and whose end point is the P6 picture can be used.

Similarly, in order to create an intermediate frame f12 between a frame of the B4 picture and a frame of the B5 picture, at least one of a value equal to ¾ a motion compensating vector in the temporal direction whose start point is the P6 picture and whose end point is the B4 picture, another value equal to ¾ a motion compensating vector in the temporal direction whose start point is the I3 picture and whose end point is the B5 picture and a further value equal to ½ a motion compensating vector in the temporal direction whose start point is the I3 picture and whose end point is the P6 picture can be used. Further, in order to create an intermediate frame f13 between a frame of the B5 picture and a frame of the P6 picture, at least one of a value equal to ¼ a motion compensating vector in the temporal direction whose start point is the P6 picture and whose end point is the B4 picture, another value equal to ½ a motion compensating vector in the temporal direction whose start point is the P6 picture and whose end point is the B5 picture and a further value equal to ⅚ a motion compensating vector in the temporal direction whose start point is the I3 picture and whose end point is the P6 picture can be used.

Furthermore, in order to create an intermediate frame f14 between a frame of the P6 picture and a frame of the B7 picture, at least one of a value equal to ½ a motion compensating vector in the temporal direction whose start point is the P6 picture and whose end point is the B7 picture and another value equal to ¼ a motion compensating vector in the temporal direction whose start point is the P6 picture and whose end point is the B8 picture. In order to create an intermediate frame f15 between a frame of the B7 picture and a frame of the B8 picture, at least one of a value equal to ¾ a motion compensating vector in the temporal direction whose start point is the I9 picture and whose end point is the B7 picture and another value equal to ¾ a motion compensating vector in the temporal direction whose start point is the P6 picture and whose end point is the B8 picture. Meanwhile, in order to create an intermediate frame f16 between a frame of the B8 picture and a frame of the I9 picture, at least one of a value equal to ¼ a motion compensating vector in the temporal direction whose start point is the I9 picture and whose end point is the B7 picture and another value equal to ½ a motion compensating vector in the temporal direction whose start point is the I9 picture and whose end point is the B8 picture.

On the other hand, in the example of FIG. 14A, an I picture (I1 picture) is displayed first, and then a B picture (B2 picture) is displayed, whereafter a P picture (P3 picture) is displayed. Further, two B pictures (B4 and B5 pictures) are displayed, and then a next P6 picture is displayed. Similarly as in the example of FIG. 13A, the frame order (coding order) (I1, P3, B2, P6, B4, B5, . . . ) in the bit stream in the upper stage and the frame order (I1, B2, P3, B4, B5, P6, . . . ) in the lower stage when the frames are displayed actually are different from each other.

An intermediate frame is created in a similar manner as described above with reference to FIG. 13B between each adjacent ones of such frames of the pictures as just described. In the example of FIG. 14B, in order to create intermediate frame f21 between a frame of the I1 picture and a frame of the B2 picture, at least one of a value equal to ½ a motion compensating vector in the temporal direction whose start point is the I1 picture and whose end point is the B2 picture and another value equal to ¼ a motion compensating vector in the temporal direction whose start point is the I1 picture and whose end point is the P3 picture. In order to create an intermediate frame f22 between a frame of the B2 picture and a frame of the P3 picture, at least one of a value equal to ¾ a motion compensating vector in the temporal direction whose start point is the P3 picture and whose end point is the B2 picture and another value equal to ¾ a motion compensating vector in the temporal direction whose start point is the I1 picture and whose end point is the P3 picture.

As described above, where M=3, in order to create an intermediate frame with reference to a B picture, a plurality of, three in the maximum, motion compensating vectors existing in the temporal direction can be used for creation of a time resolution.

While the conversion of 30 P images into 60 P images through creation of a time resolution is described above, conversion of 24 P images into 60 P images through creation of a time resolution using a value for internally dividing a motion compensating vector between frames at the start point and the end point (that is, a value for weighting) is described.

FIG. 15 illustrates an array of frames in the temporal direction. In the example of FIG. 15, a frame of a solid line indicates an original frame of the 24 P images while a frame of a broken line indicates a frame of the 60 P images. Each arrow mark extending between different frames indicates one of motion compensating vectors MV0 to MV4 in the temporal direction which can be used for creation of a time resolution (that is, which can become candidate vectors). The start point of each arrow mark indicates the start point of a motion compensating vector in the temporal direction while the end point of the arrow mark indicates the end point of the motion compensating vector in the temporal direction. Further, an exemplary numerical value shown above or below each frame indicates a value for internally dividing a motion compensating vector for creation of a frame between the frames at the start point and the end point (that is, a value for weighting). This value varies in accordance with the creation position of the frame to be created.

In the example of FIG. 15A, creation of a temporal resolution is performed based on six original frames of the 24 P images using values for internal division of motion compensating vectors to create 15 frames of the 60 P images. In the example of FIG. 15A, between the start point and the end portion of the motion compensating vector MV0 between the first original frame and the second original frame, a frame is created by internally dividing (weighting) the motion compensating vector MV0 by (with) ⁵⁄₁₄, and a next frame is created by internally dividing the motion compensating vector MV0 by ⁵⁄₇. Between the start point and the end point of the motion compensating vector MV1 between the second original frame and the third original frame, the motion compensating vector MV1 is internally divided by ¹⁄₁₄ to create a frame and internally divided by ³⁄₇ to create a next frame, and is further internally divided by ¹¹⁄₁₄ to create another next frame.

Similarly, between the start point and the end portion of the motion compensating vector MV2 between the third original frame and the fourth original frame, the motion compensating vector MV2 is internally divided by ¹⁄₇ to create a frame and internally divided by ½ to create a next frame, and is further internally divided by ⁶⁄₇ to create another next frame. Between the start point and the end portion of the motion compensating vector MV3 between the fourth original frame and the fifth original frame, the motion compensating vector MV3 is internally divided by ³⁄₁₄ to create a frame and internally divided by ⁴⁄₇ to create a next frame, and is further internally divided by ¹³⁄₁₄ to create another next frame. Between the start point and the end portion of the motion compensating vector MV4 between the fifth original frame and the sixth original frame, the motion compensating vector MV4 is internally divided by ²⁄₇ to create a frame and internally divided by ⁹⁄₁₄ to create a next frame.

In this manner, using the six original frames of the 24 P images, a time resolution is created based on the individual motion compensating vectors and 15 frames of the 60 P images are created.

On the other hand, where creation of a time resolution is performed based on the motion compensating vector whose start point and end point are the first original frame and the sixth original frame, respectively, as seen in FIG. 15B, frames between them are created through weighting with ¹⁄₁₄, ²⁄₁₄, ³⁄₁₄, ..., ¹³⁄₁₄. Naturally, use of shorter motion compensating vectors as seen in FIG. 15A realizes smoother motion having a higher degree of continuity.

A DVD (Digital Versatile Disk) or the like has 24 P images recorded thereon, and upon reproduction, a DVD player converts the 24 P images into and reproduces 60 P images. In this instance, images which exhibit a smooth variation can be reproduced by converting 24 P images into 60 P images through creation of a temporal resolution using a value with which a motion compensating vector is internally divided.

FIG. 16 illustrates continuities in motion in a case wherein motion compensating vectors are weighted to perform a time resolution process in such a manner as described above (FIG. 16A) and another case wherein creation of a time resolution is performed by a 2-3 pull-down process (FIG. 16B).

FIG. 16A illustrates the continuity in the case wherein a motion compensating vector between each adjacent ones of original frames is weighted to perform creation of a time resolution as illustrated in FIG. 15A. The images exhibit a smooth and continuous variation.

In contrast, since the 2-3 pull-down process creates three original frames from one original frame as seen in FIG. 16B, no motion is exhibited among the three frames. Since two original frames are created from a next one original frame, no motion is exhibited between the two original frames. Some motion is exhibited only between a unit of three frames and a unit of two frames. Accordingly, the continuity in motion is lost as seen from FIG. 16B. Even if it is tried to create a time resolution from 60 P images created in this manner, it is difficult to recover continuous motion.

From the foregoing, according to the present invention, a value for internally dividing a motion compensating vector is used to create a time resolution to convert 24 P images into 60 P images, and therefore, smoother motion having a higher degree of continuity is realized.

Subsequently, a motion compensating vector in a spatial direction is described with reference to FIG. 17. FIG. 17 shows macro blocks Q0 to Q8 each formed from 16×16 pixels on a frame having an axis of abscissa indicated by a horizontal direction and an axis of ordinate indicated by a vertical direction.

Figure 17B:
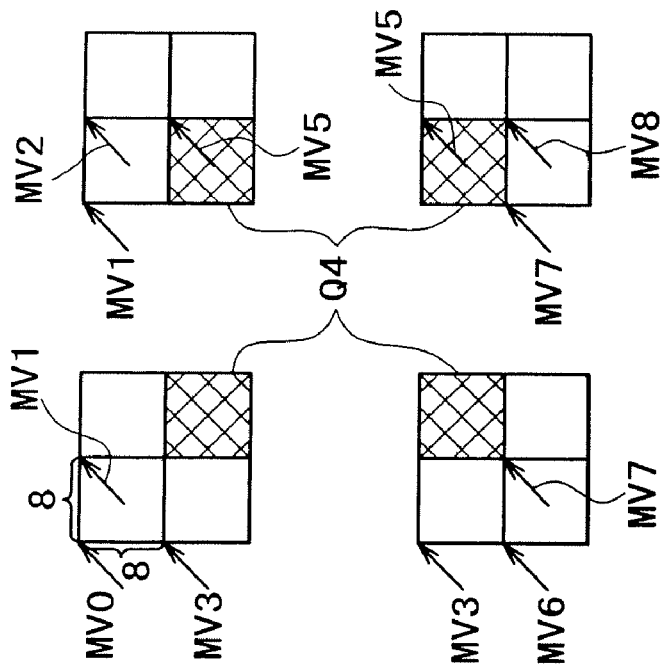
FIGS. 17A and 17B are pixel maps illustrating an exemplary motion compensating vector in the spatial direction.
Figure 17A:
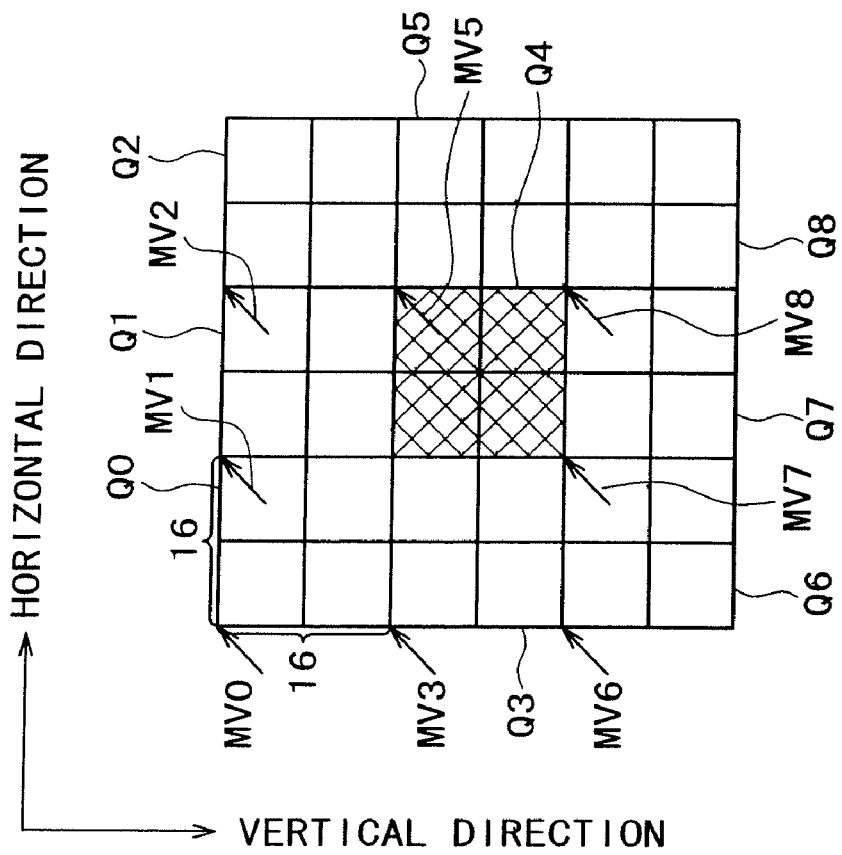

In the example of FIG. 17A, the macro block Q0 corresponds to the motion compensating vector MV0 in the spatial direction; the macro block Q1 corresponds to the motion compensating vector MV1 in the spatial direction; the macro block Q2 corresponds to the motion compensating vector MV2 in the spatial direction; the macro block Q3 corresponds to the motion compensating vector MV3 in the spatial direction; the macro block Q5 corresponds to the motion compensating vector MV5 in the spatial direction; the macro block Q6 corresponds to the motion compensating vector MV6 in the spatial direction; the macro block Q7 corresponds to the motion compensating vector MV7 in the spatial direction; and the macro block Q8 corresponds to the motion compensating vector MV8 in the spatial direction.

However, since the macro block Q4 is an intra block, it corresponds to no motion compensating vector in the spatial direction.

Therefore, as shown in FIG. 17B, the motion compensating vectors in the spatial direction obtained from the macro block Q0 to Q3 and Q5 to Q8 around the macro block Q4 are utilized for the macro block Q4. For example, for a block of 8×8 pixels at a left upper portion of the macro block Q4, the motion compensating vector MV0 of the macro block Q0 leftwardly above the portion of the macro block Q4, the motion compensating vector MV1 of the macro block Q1 above the portion of the macro block Q4 or the motion compensating vector MV3 of the macro block Q3 leftwardly of the portion of the macro block Q4 is used instead. Similarly, for a block of 8×8 pixels at a right upper portion of the macro block Q4, the motion compensating vector MV1 of the macro block Q1 above the portion of the macro block Q4, the motion compensating vector MV2 of the macro block Q2 rightwardly above the portion of the macro block Q4 or the motion compensating vector MV5 of the macro block Q5 rightwardly of the macro block Q4 is used instead. For a block of 8×8 pixels at a left lower portion of the macro block Q4, the motion compensating vector MV3 of the macro block Q3 leftwardly of the portion of the macro block Q4, the motion compensating vector MV6 of the macro block Q6 leftwardly below the portion of the macro block Q4 or the motion compensating vector MV7 of the macro block Q7 below the portion of the macro block Q4 is used instead. For a block of 8×8 pixels at a right lower portion of the macro block Q4, the motion compensating vector MV5 of the macro block Q5 rightwardly of the portion of the macro block Q4, the motion compensating vector MV7 of the macro block Q7 below the portion of the macro block Q4 or the motion compensating vector MV8 of the macro block Q8 rightwardly below the macro block Q4 is used instead. This improves the picture quality on the boundary of a moving object or around an intra block.

Further, while the above description is given of the macro block Q4 of an intra block, the foregoing can be applied also to the other macro blocks. Accordingly, through utilization of motion compensating vectors of surrounding macro blocks in the spatial direction, the accuracy of a motion compensating vector can be improved from a unit of 16×16 pixels to another unit of 8×8 pixels, and the picture quality can be improved as much.

A predetermined plural number of motion compensating vectors in the temporal direction and the spatial direction are acquired in such a manner as described above.

Referring back to FIG. 12, after the candidate vector acquisition section 61 outputs the plurality of motion compensating vectors in the temporal direction and the spatial direction acquired in such a manner as described above as candidate vectors to the shift information extraction section 62, the reliability determination section 101 of the shift information extraction section 62 executes a reliability determination process at step S22 to determine, from among the candidate vectors in the temporal direction and the spatial direction, those candidate vectors which are to be utilized for creation of a time resolution (tap extraction). The reliability determination process is described with reference to a flow chart of FIG. 18.

Figure 19:
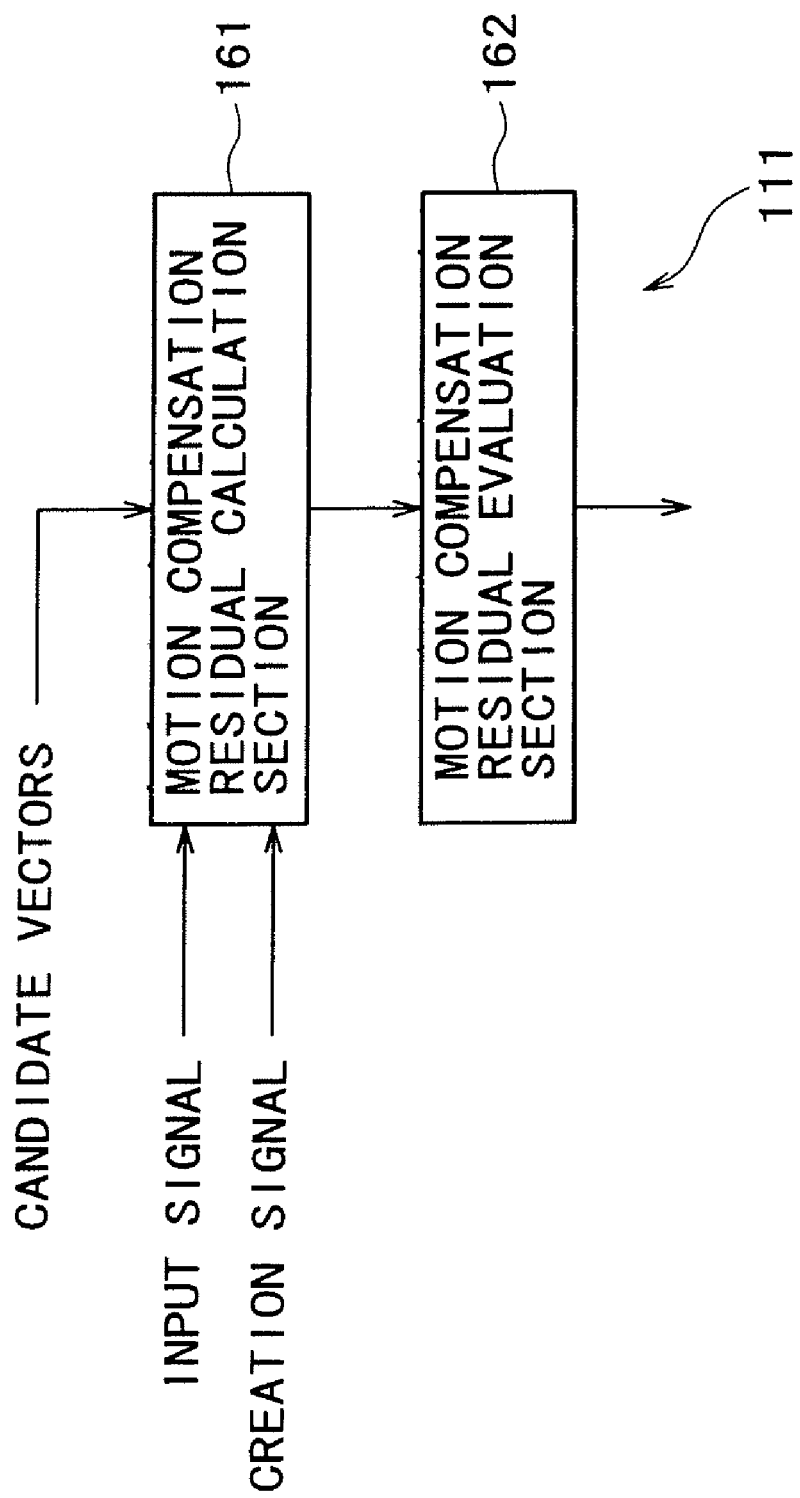
FIG. 19 is a block diagram showing an example of configuration of a characteristic amount extraction section of FIG. 3.

At step S31, the characteristic amount extraction section 111 of the reliability determination section 101 discriminates whether or not a candidate vector to be processed is present. If it is discriminated that a candidate vector to be processed is present, then the characteristic amount extraction section 111 executes a reliability calculation process at step S32. Here, the characteristic amount extraction section 111 includes a motion compensation residual calculation section 161 and a motion compensation residual evaluation section 162 as seen in FIG. 19.

Now, the reliability calculation process is described with reference to a flow chart of FIG. 20.

At step S41, the motion compensation residual calculation section 161 uses the input signal from the picture selection section 23 of the decoding section 11 and the creation signal from the signal storage section 33 supplied at step S1 of FIG. 11 to calculate a motion compensation residual from a candidate motion vector supplied from the candidate vector acquisition section 61. At step S42, the motion compensation residual evaluation section 162 compares and evaluates the motion compensation residual calculated by the motion compensation residual calculation section 161 with a predetermined reference value or another motion compensation residual from another candidate vector to determine the reliability of the candidate vector and outputs the determined reliability to the reliability evaluation section 112. Thereafter, the processing advances to step S33 of FIG. 18. By the comparison and evaluation, a high evaluation is provided, for example, to a candidate vector which exhibits the lowest motion compensation residual value.

Figure 20:
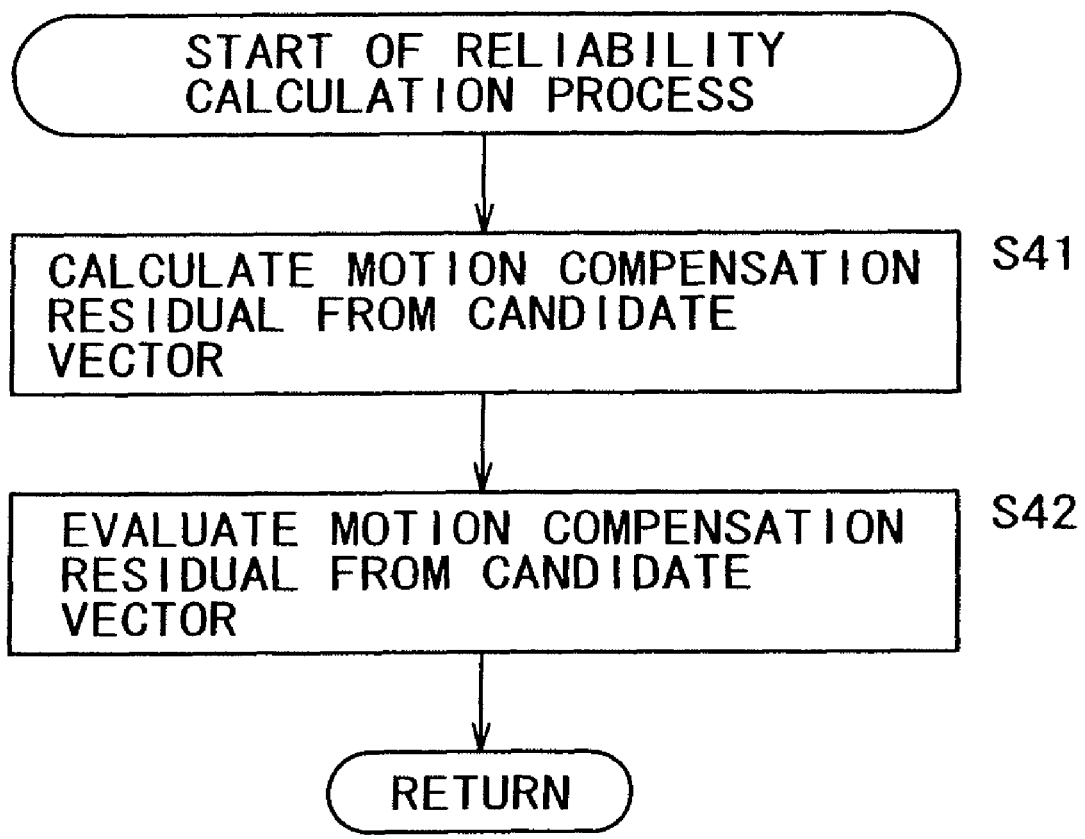
FIG. 20 is a flow chart illustrating a reliability calculation process at step S32 of FIG. 16.
Figure 21:
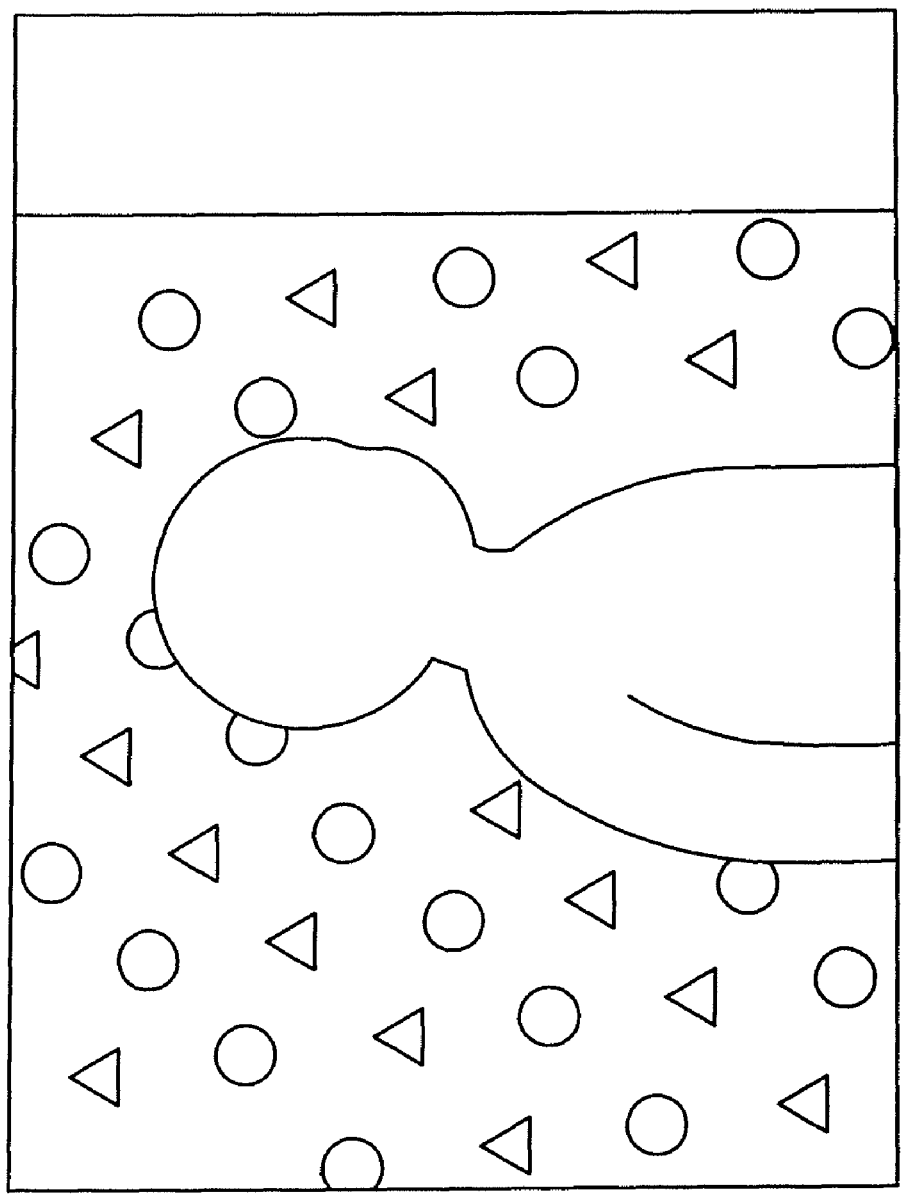
FIG. 21 is a view showing an exemplary original image.
Figure 22:
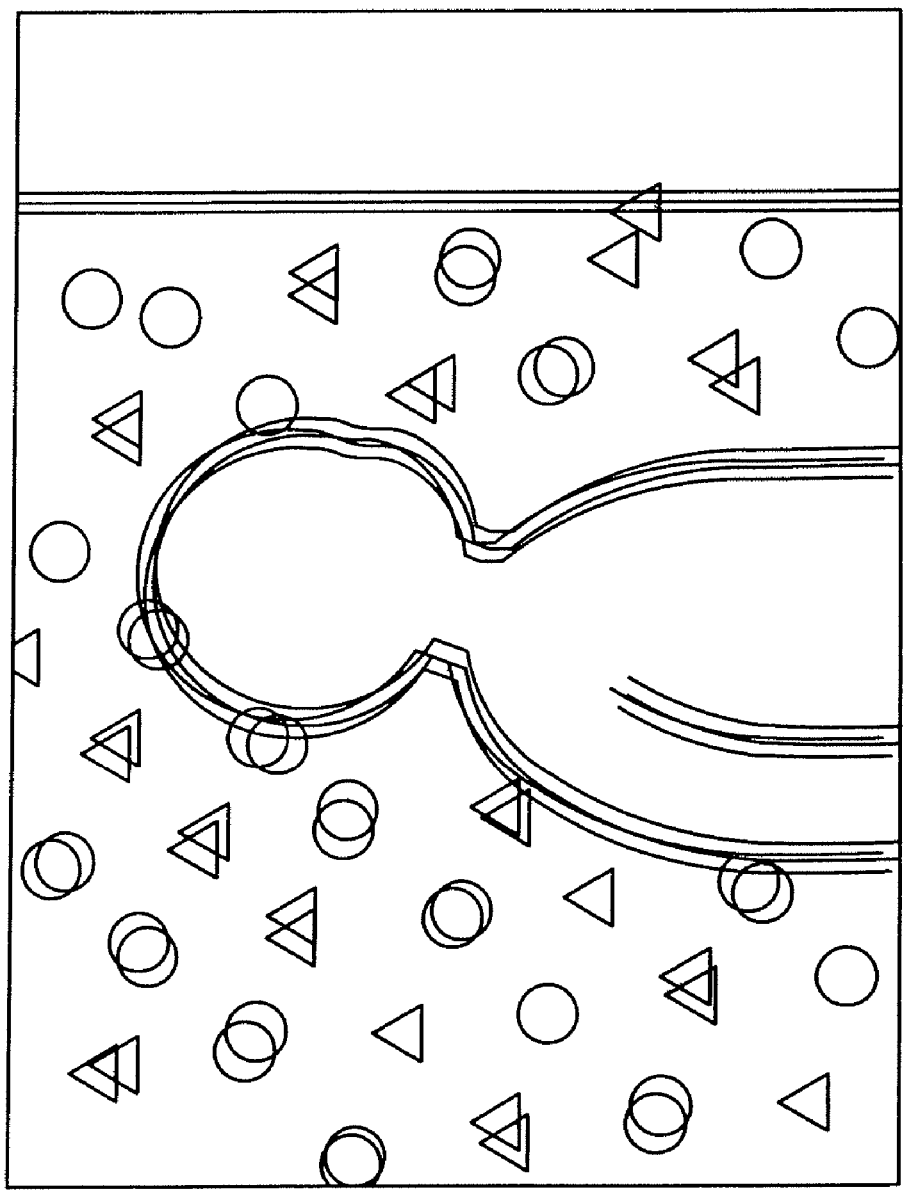
FIG. 22 is a view showing an exemplary image of a created intermediate frame.

FIG. 21 illustrates an example of an original image where a person at a central location moves rightward and a camera moves (pans) rightward following the person. In the example of FIG. 21, a wall having round and triangular patterns thereon is present on the background. Since the camera is panning, also the background moves rightward similarly to the person. If the original image is used and motion compensation residuals from candidate vectors are calculated at step S41 of FIG. 20 and then a candidate vector whose motion compensation residual has the lowest value among the motion compensation residuals is determined as a selected vector and creation of a time resolution is executed based on the selected vector, then such an image of an intermediate frame as shown in FIG. 22 is created. It is to be noted that, in FIG. 22, M=3.

In the example of FIG. 22, edge portions of the background of the rounds and triangles and boundary portions between the background and the person exhibit considerable failure when compared with the example of FIG. 21. This arises from the fact that, where M=3, the distance between frames is considerably long when compared with that where M=1. Through comparison of the image of the created intermediate frame and the relationship of the utilized motion compensating vectors, it can be recognized that a motion compensating vector which is fluctuating (that motion compensating vector which is significantly different in magnitude or direction from the other neighboring motion compensating vectors) has a bad influence on an edge portion of the background of the rounds and triangles and the boundary portions between the background and the person.

Figure 18:
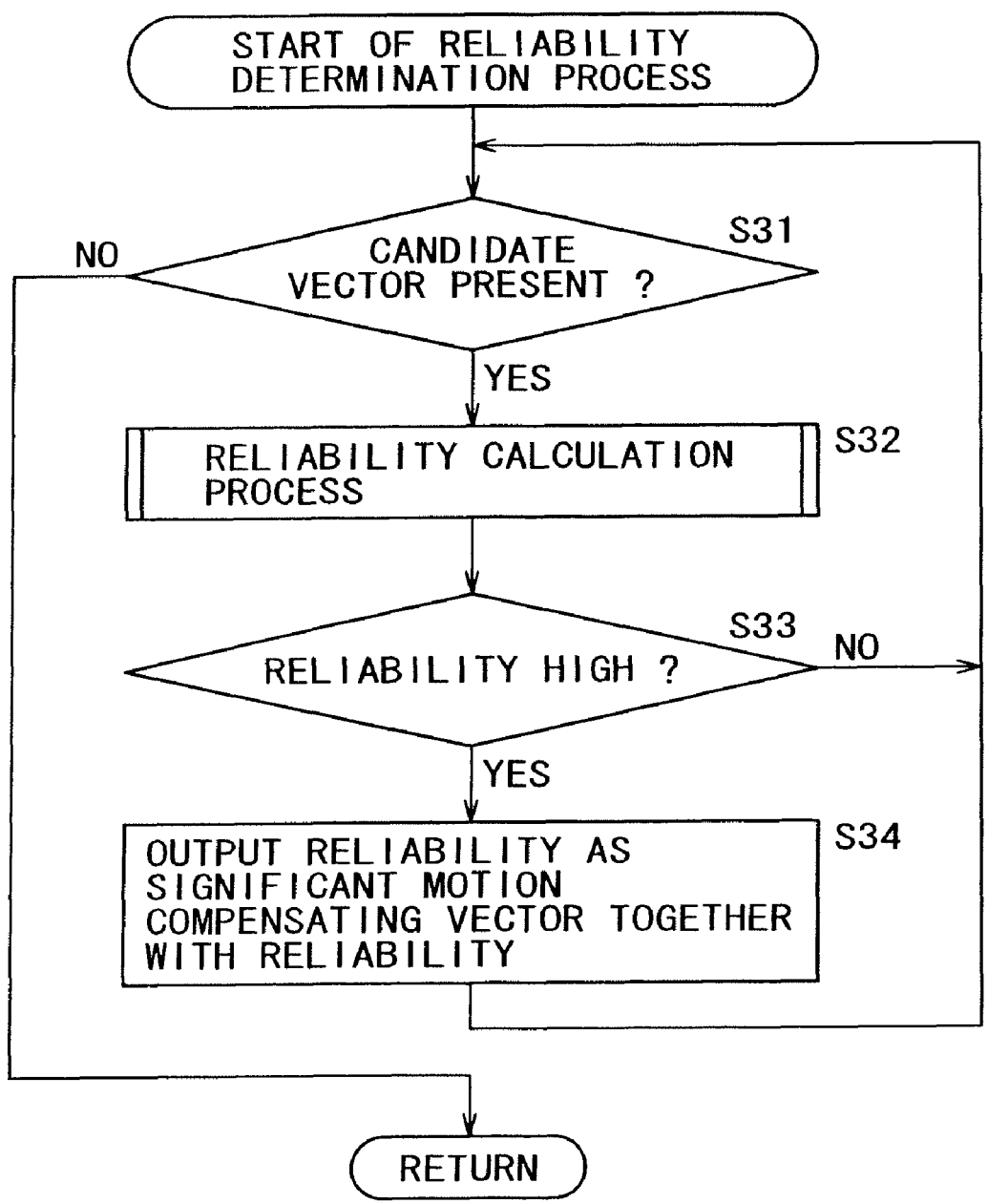
FIG. 18 is a flow chart illustrating a reliability determination process at step S22 of FIG. 12.

Thus, if only those significant motion compensating vectors determined to have high reliabilities through execution of determination of each motion compensating vector in advance at step S33 of FIG. 18 are used for creation of a time resolution without using those motion compensating vectors which have a bad influence, then a good image of an intermediate frame can be produced.

In particular, at step S33, the reliability evaluation section 112 discriminates whether or not the reliability of the candidate vector determined at step S42 of FIG. 20 is higher than a reference value set in advance. If it is discriminated that the reliability of the candidate vector is higher than the reference value set in advance, the reliability evaluation section 112 outputs the candidate vector as a significant vector to the motion compensating vector selection section 102 together with the reliability of the candidate vector at step S34. Thereafter, the processing returns to step S31 to repeat the processes at the steps beginning with step S31.

If it is discriminated at step S33 that the reliability of the candidate vector is lower than the reference value set in advance, then the process at step S34 is not executed (but is skipped), and the processing returns to step S31 so that the processes at the steps beginning with step S31 are repeated. In other words, any candidate vector whose reliability is lower than the reference value set in advance is excluded as a motion compensating vector having a bad influence.

If it is discriminated at step S31 that a candidate vector to be processed is not present, that is, if it is discriminated that the process for all of the candidate vectors is completed, then the processing advances to step S23 of the flow chart of FIG. 12.

Figure 23:
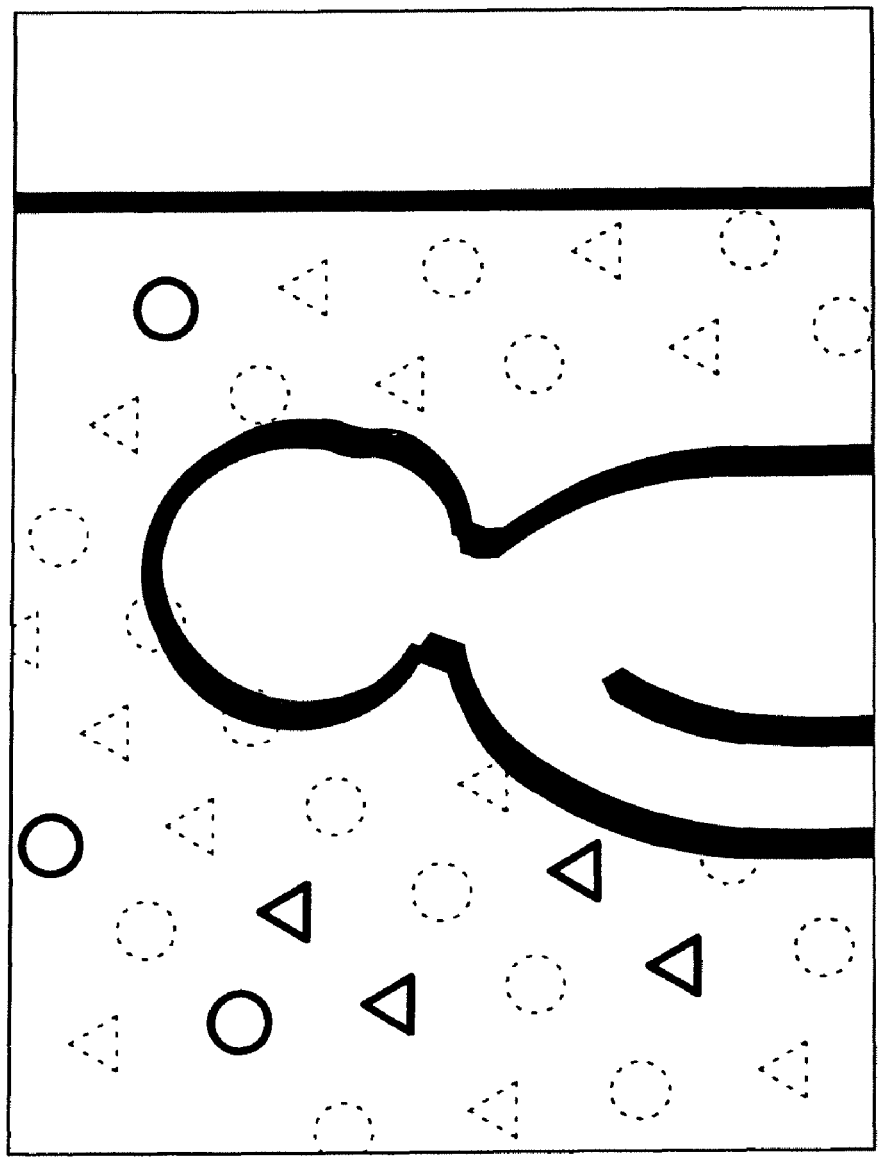
FIG. 23 is a view illustrating an exemplary result of mapping of digitized reliabilities.

FIG. 23 illustrates a result when, where the original image of FIG. 21 is used and a candidate vector whose motion vector residual exhibits the lowest value is determined as a selected vector to produce the image of the intermediate frame of FIG. 22, the reliability of the selected vector is converted into a numeric value and mapped to the original image of FIG. 21.

In the example of FIG. 23, it is shown that a portion (block) indicated by a thicker line has a lower reliability on the motion compensating vector corresponding to the block. It can be recognized through comparison between FIGS. 21 and 23 that a thick line is present along the contour of the body of the person (moving object) shown in FIG. 21 and the reliability on the motion compensating vector is insufficient at part of the boundary of the person or the background. Utilization of this allows detection of the boundary of a moving object. Further, from this, a region for which detection of a motion compensating vector must be performed preferentially (a region indicated by a thick line in the example of FIG. 23) when re-detection of a motion compensating vector (re-search of the re-search section 121 hereinafter described with reference to FIG. 29) is to be performed for a decoded image of the MPEG 2 and such a policy that, when detection of a motion compensating vector is performed, for example, a portion having a high reliability is left as it is whereas, for another portion having a low reliability, a motion compensating vector is determined once more can be recognized.

In contrast, if a reliability is determined at step S53 and only a significant motion compensating vector having a high reliability is used at step S34, then deterioration at a counter portion of an image can be suppressed as hereinafter described with reference to FIG. 46.

Figure 24:
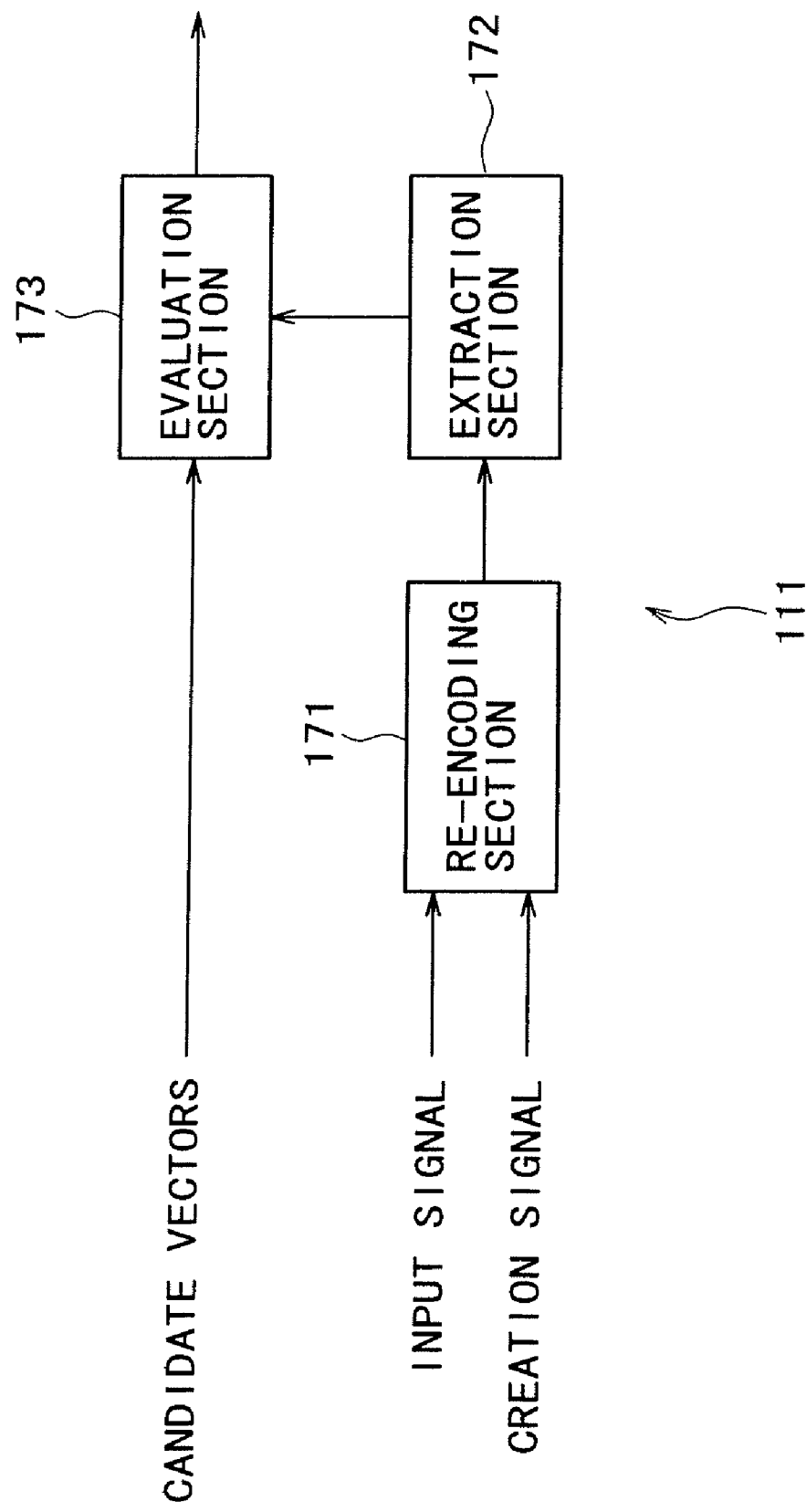
FIG. 24 is a block diagram showing another exemplary configuration of the characteristic amount extraction section of FIG. 3.

FIG. 24 shows another example of configuration of the characteristic amount extraction section 111 of FIG. 3.

In the example of FIG. 24, the characteristic amount extraction section 111 includes a re-encoding section 171, an extraction section 172 and an evaluation section 173. The re-encoding section 171 re-encodes the input signal supplied from the decoding section 11 or the creation signal supplied from the signal storage section 33 to acquire re-coded information.

The extraction section 172 extracts a motion compensating vector corresponding to a candidate vector from within the re-coded information acquired by the re-encoding section 171. The evaluation section 173 compares and evaluates the candidate vector and the motion compensating vector extracted by the extraction section 172 to determine the reliability of the candidate vector and outputs the determined reliability to the reliability evaluation section 112.

The reliability calculation process executed by the characteristic amount extraction section 111 of FIG. 24 is described in more detail with reference to FIG. 25.

Figure 25:
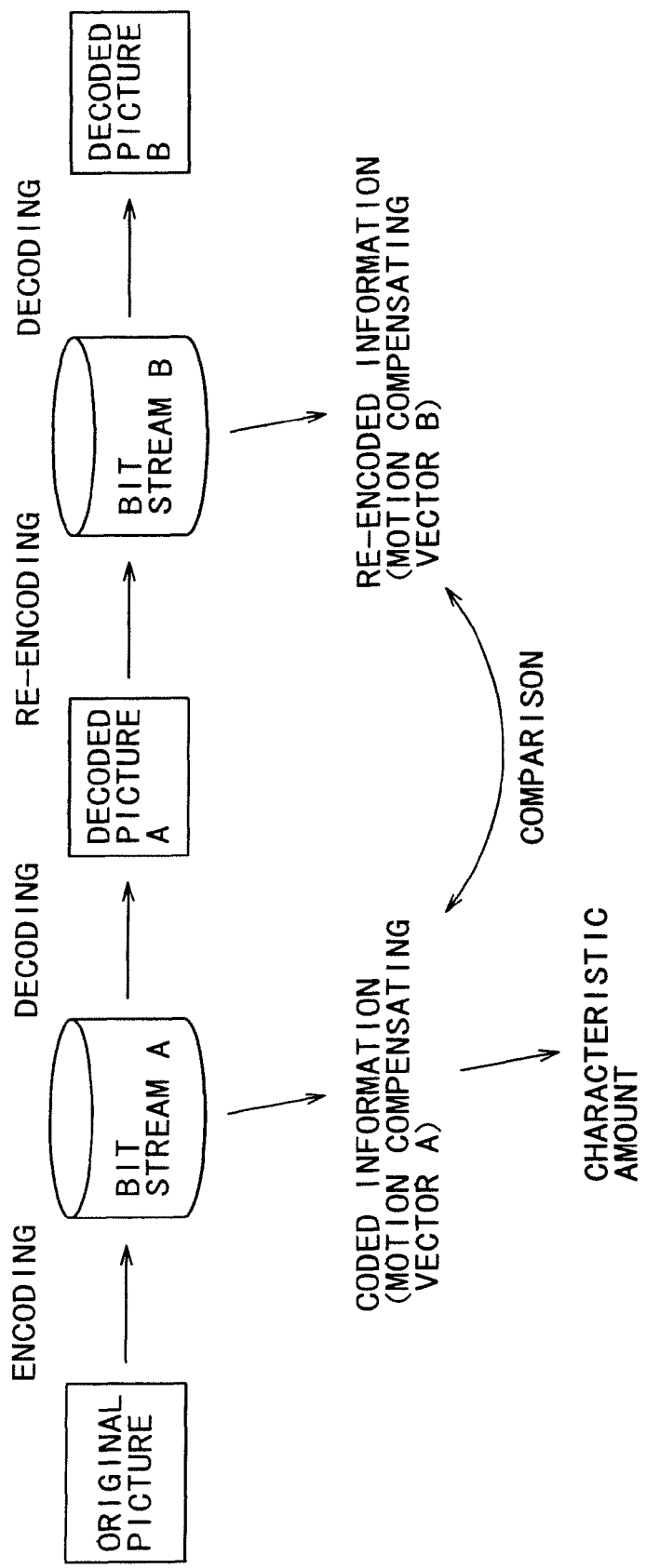
FIG. 25 is a flow diagram illustrating details of the reliability calculation process executed by the characteristic amount detection section of FIG. 3.

As shown in FIG. 25, an encoding section not shown encodes image data of an original picture to produce a bit stream A and coded information (side information) including motion compensating vectors. Then, the variable length decoding section 20 (FIG. 1) decodes the bit stream A to produce a decoded picture A. The re-encoding section 171 re-encodes the decoded picture (input signal) A supplied from the variable length decoding section 20 to produce a bit stream B and re-coded information including a motion compensating vector B. The bit stream B is decoded into a decoded picture B by a decoding section not shown.

Accordingly, the extraction section 172 extracts a motion compensating vector B corresponding to a candidate vector from within the re-encoded information acquired by the re-encoding section 171. The evaluation section 173 compares the motion compensating vector A supplied as a candidate vector from the candidate vector acquisition section 61 and the motion compensating vector B supplied from the extraction section 172 with each other. For example, when the reliability of the motion compensating vector A is high, even if it is compared with the motion compensating vector B, the error between them is small. However, if the reliability of the motion compensating vector A is low, the difference between the motion compensating vector A and the motion compensating vector B is great. Accordingly, when the difference between the motion compensating vector A and the motion compensating vector B is great, the evaluation section 173 can determine that the reliability of the motion compensating vector A is low. Consequently, the characteristic amount extraction section 122 of FIG. 3 extracts a characteristic amount from a motion compensating vector A determined to have a high reliability and uses the extracted characteristic amount for the tap extraction.

Thus, the motion compensating vector B is used only for the determination of the motion compensating vector A by the characteristic amount extraction section 111 of FIG. 24 but is not used for the tap extraction, and only the motion compensating vector A is used for the tap extraction. Accordingly, since the image data processing apparatus 1 of FIG. 1 does not utilize a motion compensating vector determined again from a creation signal (that is, the motion compensating vector B) to perform time resolution creation but only utilizes a motion compensating vector of side information (that is, the motion compensating vector A) as an object of comparison to perform a creation process, a time resolution of a high quality can be achieved.

Figure 26:
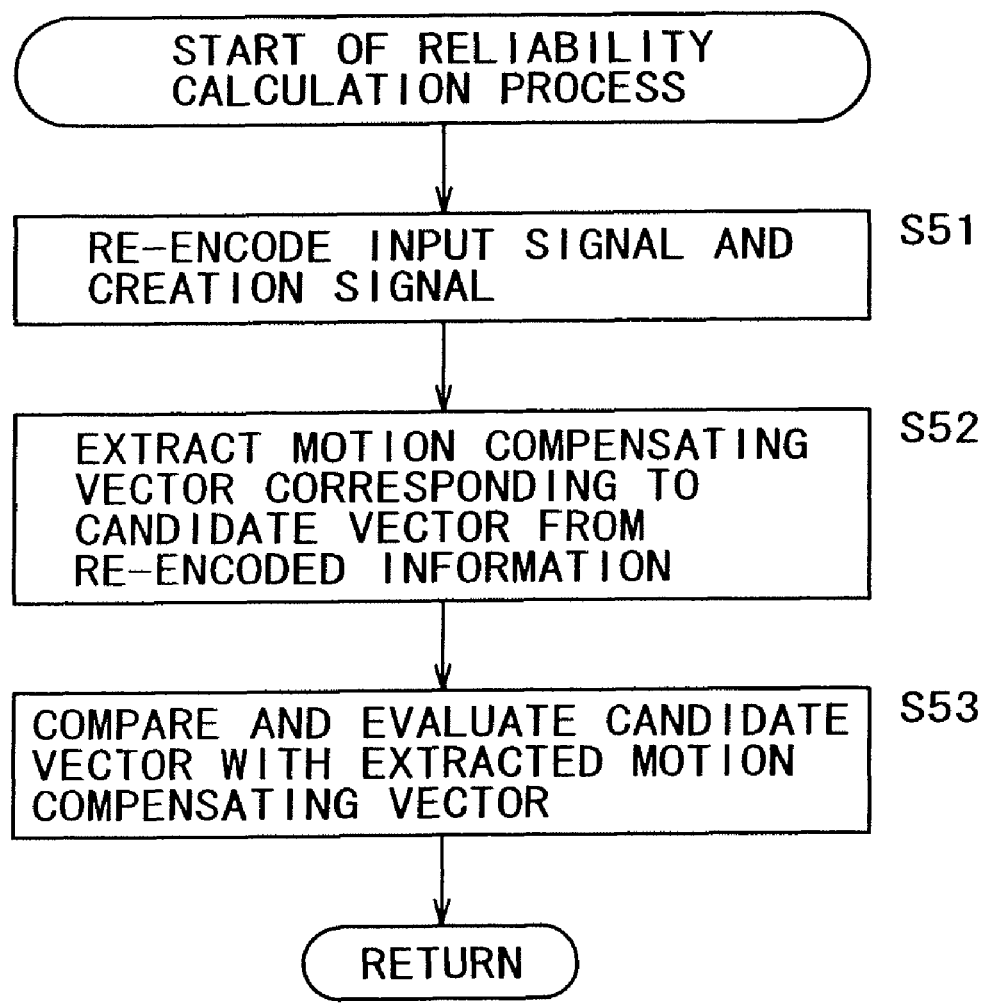
FIG. 26 is a flow chart illustrating another exemplary reliability calculation process at step S32 of FIG. 18.

Subsequently, the reliability calculation process executed by the characteristic amount extraction section 111 of FIG. 24 is described with reference to a flow chart of FIG. 26. It is to be noted that this reliability calculation process is another example of the reliability calculation process at step S32 of FIG. 18.

At step S51, the re-encoding section 171 re-encodes the input signal supplied from the decoding section 11 or the creation signal supplied from the signal storage section 33 to acquire re-encoded information.

At step S52, the extraction section 172 extracts a motion compensating vector corresponding to the candidate vector from within the re-encoded information acquired by the re-encoding section 171 at step S51.

At step S53, the evaluation section 173 compares and evaluates the candidate vector with the motion compensating vector extracted by the extraction section 172 at step S52 to determine the reliability of the candidate vector and outputs the reliability to the reliability evaluation section 112.

Figure 27:
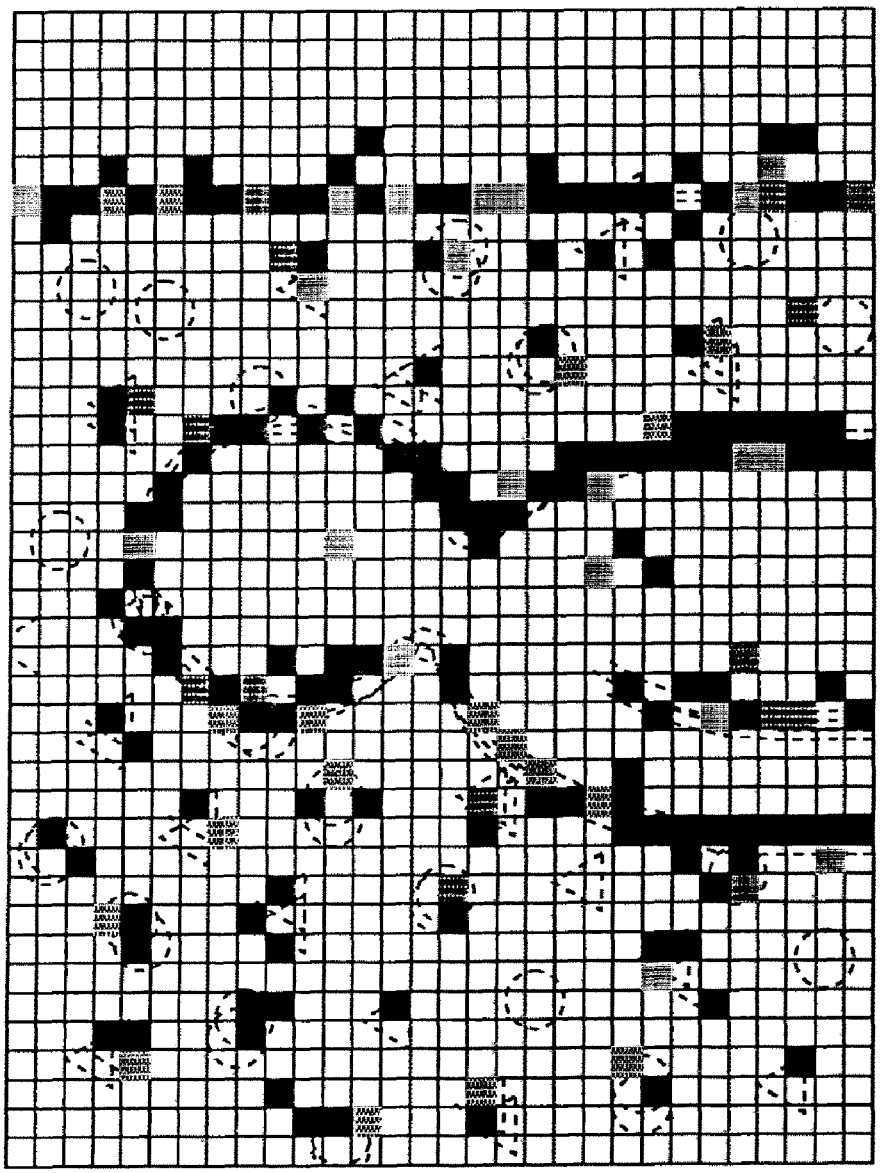
FIG. 27 is a view illustrating an example of result of comparison of motion compensating vectors in a P picture.

FIG. 27 illustrates a result of comparison between candidate vectors of a P picture of the original image of FIG. 21 and motion compensating vectors of re-encoded information corresponding to the candidate vectors. In the example of FIG. 27, it is indicated that a darker block has a lower reliability while a whiter block has a higher reliability. It can be seen that many dark blocks are present along the contour of the body of the person (moving object) shown in FIG. 21 and the reliability on the motion compensating vector is insufficient at part of the boundary of the person or the background.

It is to be noted that, in the reliability determination process at step S33 of FIG. 18, results in reliability determined by the two reliability calculation processes described above or by different reliability calculation processes hereinafter described may be used in combination (integrally) for the determination or only one of the reliabilities may be used for the determination.

After the reliability determination process is completed in such a manner as described above, the motion compensating vector selection section 102 executes, subsequently at step S23 of FIG. 12, a selection process of a motion compensating vector from among the significant candidate vectors output from the reliability evaluation section 112. The motion compensating vector selection process is described with reference to a flow chart of FIG. 28.

At step S61, the re-search section 121 of the motion compensating vector selection section 102 discriminates whether or not a candidate vector to be processed is present. If it is discriminated that a candidate vector to be processed is present, then the re-search section 121 uses, at step S62, the input signal supplied from the decoding section 11 and the creation signal supplied from the signal storage section 33 to execute a re-search process for a motion compensating vector from the significant vectors as seen in FIG. 29.

Figure 29:
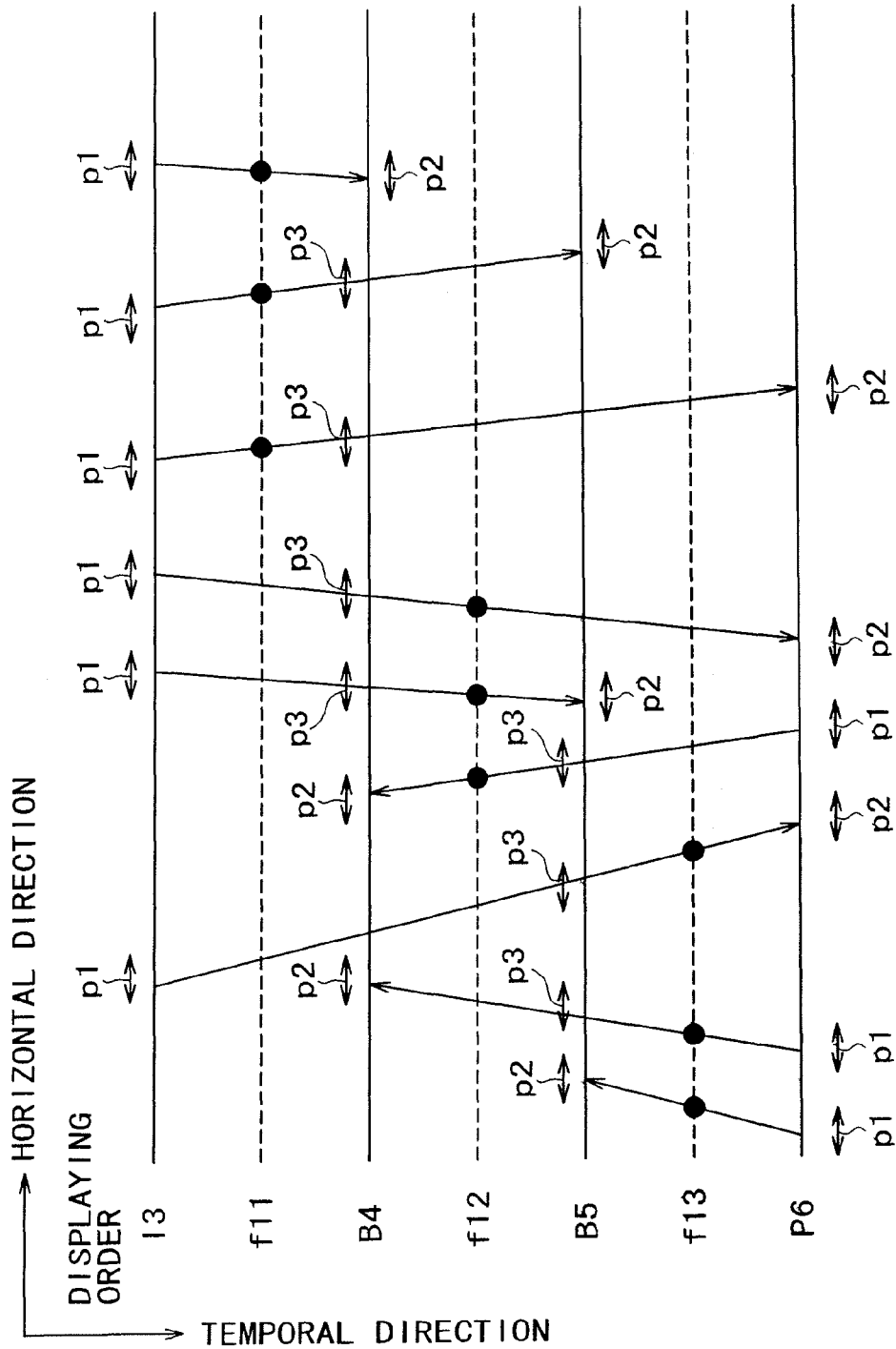
FIG. 29 is a time v. display order chart of a re-search process for a motion compensating vector.

In the example of FIG. 29, the axis of ordinate indicates the temporal direction while the axis of abscissa indicates the horizontal direction of frames. The frames (I3, B4, B5, P6) of FIG. 13B are shown in the displaying order from above and the intermediate frames (f11, f12, f13) are created between adjacent ones of the frames.

Each arrow mark extending between different frames represents a significant candidate vector. The candidate vectors include, in order from the left, three candidate vectors, which can be utilized for creation of the intermediate frame f13 (a candidate vector whose start point is the P6 picture and whose end point is the B5 picture, another candidate vector whose start point is the P6 picture and whose end point is the B4 picture and a further candidate vector whose start point is the I3 picture and whose end point is the P6 picture), three candidate vectors, which can be utilized for creation of the intermediate frame f12 (a candidate vector whose start point is the P6 picture and whose end point is the B4 picture, another candidate vector whose start point is the I3 picture and whose end point is the B5 picture and a further candidate vector whose start point is the I3 picture and whose end point is the P6 picture), and three candidate vectors, which can be utilized for creation of the intermediate frame f11 (a candidate vector whose start point is the I3 picture and whose end point is the P6 picture, another candidate vector whose start point is the I3 picture and whose end point is the B5 picture and a further candidate vector whose start point is the I3 picture and whose end point is the B4 picture).

Further, in each frame, the position thereof at which it contacts with the start point of an arrow mark indicating a candidate vector is the position of a reference pixel while the position thereof at which it contacts with the end point of an arrow mark indicating a candidate vector is the position of a noticed pixel. Further, a dark round on each intermediate frame at which it crosses with an arrow mark indicating a candidate vector represents the position of a creation pixel at which it can be created with the candidate vector.

As seen in FIG. 29, a re-search for a motion compensating vector in the neighborhood p1 of the start point (reference pixel) on the start point frame of each candidate vector is executed based on the end point of the candidate vector. Further, a re-search for a motion compensating vector in the neighborhood p2 of the end point (noticed pixel) on the end point frame of each candidate vector is executed based on the start point of the candidate vector. Furthermore, a re-search for motion compensating vectors in the neighborhood p1 of the start point and in the neighborhood p2 of the end point of each candidate vector is executed based on the neighborhood p3 of a midpoint on one of frames, which is near to the creation pixel, of the candidate vector between the start point frame and the end point frame (for example, with regard to the third leftmost candidate vector of FIG. 29 whose start point is the I3 picture and whose end point is the P6 picture, the B4 frame and the B5 frame are present. The frame near to the creation pixel [frame f13] is the frame of the B5 picture).

Figure 30:
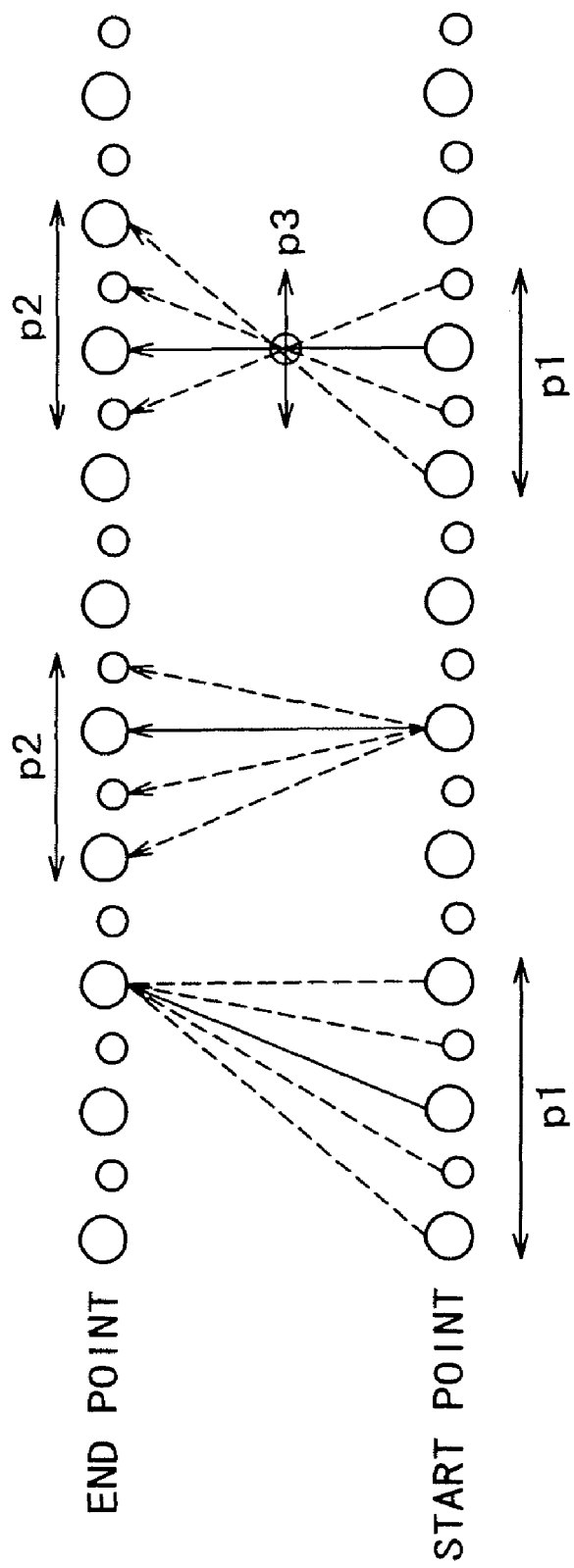
FIG. 30 is a view illustrating candidate vectors the re-search process for a motion compensating vector.

More particularly, as seen in FIG. 30, in the neighborhood p1 of the start point, in the neighborhood p2 of the end point or in the neighborhood p3 of the midpoint of a candidate vector, a more adaptive motion compensating vector is searched for by weighted meaning or the like taking not only a pixel unit represented by a large circular pattern but also a half-pixel unit represented by a small circular pattern into consideration. In particular, if an optimum motion compensating vector corresponding to a candidate vector is re-searched out at a pixel or a half pixel (position between pixels) in the neighborhood p1 of the start point, in the neighborhood p2 of the end point or in the neighborhood p3 of the midpoint of the candidate vector, then the motion compensating vector is output as a candidate vector to the characteristic amount extraction section 122. If such an optimum motion compensating vector is not re-searched out, then the candidate vector supplied from the reliability evaluation section 112 is output as it is to the characteristic amount extraction section 122.

By executing a re-search for a significant candidate vector in such a manner as described above, a more appropriate candidate vector is acquired. As a result, an image of a higher picture quality can be produced.

Figure 28:
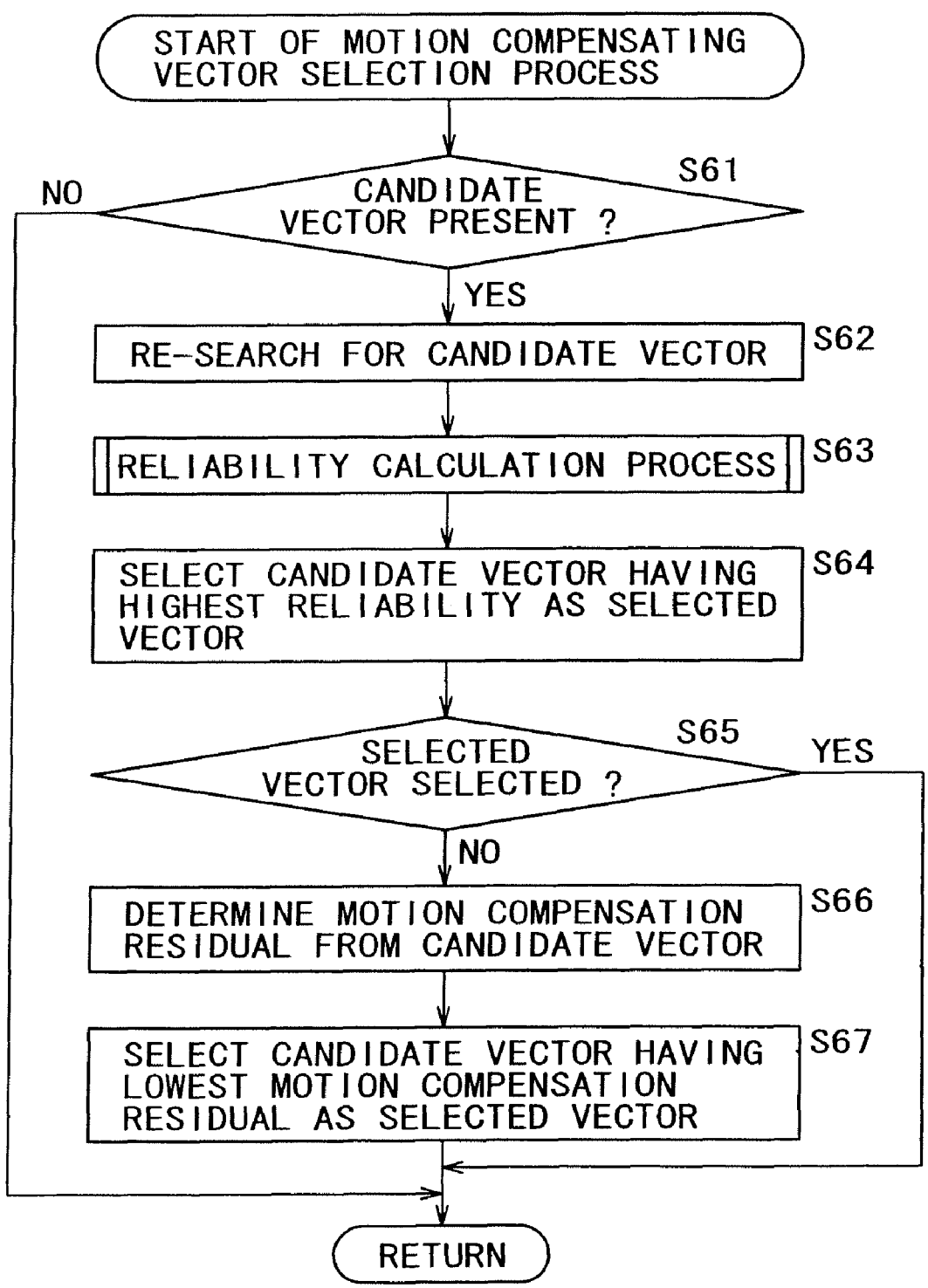
FIG. 28 is a flow chart illustrating a motion compensating vector selection process at step S23 of FIG. 12.

Then, at step S63 of FIG. 28, the characteristic amount extraction section 122 executes a reliability calculation process. This reliability calculation process is similar to the reliability calculation process at step S32 of FIG. 18 described hereinabove (the process of FIG. 20 or FIG. 26), and description thereof is omitted herein to avoid redundancy.

In particular, in the motion compensating vector selection process, the reliability calculation process is executed again. It is to be noted that, in this instance, a reliability calculation process same as the reliability calculation process of FIG. 18 (by the characteristic amount extraction section 111 of the reliability determination section 101) may be performed once again or different reliability calculation processes may be executed. For example, the reliability calculation process based on a motion compensation residual (by the characteristic amount extraction section 122 of the motion compensating vector selection section 102) is performed in the reliability determination process and then, in the motion compensating vector selection process, a motion compensating vector corresponding to a candidate vector by re-encoding is executed and a reliability calculation process by comparison and evaluation is performed (or the processes are executed in the reverse order), or else both reliability calculation processes may be executed in each case.

For example, in the present case, if a motion compensating vector corresponding to a candidate vector by re-encoding is extracted and the reliability calculation process by comparison and evaluation is performed at step S36 of FIG. 28, then at step S64, the motion compensating vector decision section 123 selects that one of candidate vectors having the highest reliability as a selected vector of the noticed pixel.

At step S65, the motion compensating vector decision section 123 discriminates whether or not a selected vector is selected successfully. If it is discriminated at step S65 that a selected vector is not selected successfully, that is, if a candidate vector having the highest reliability cannot be found out, then the motion compensating vector decision section 123 controls the characteristic amount extraction section 122 to determine a motion compensation residual from the candidate vector using the input signal and the creation signal at step S66 and selects that one of candidate vectors exhibiting the lowest motion compensation residual as a selected vector at step S67.

If it is discriminated at step S61 that a candidate vector is not present, if it is discriminated at step S65 that a selected vector is selected successfully or if a selected vector is selected at step S67, then the processing returns to FIG. 12. At step S24 of FIG. 12, the motion compensating vector decision section 123 calculates a shift amount of the noticed pixel (central tap) based on the selected vector. The calculation of the shift amount is hereinafter described with reference to FIG. 47.

At step S25, the motion compensating vector decision section 123 outputs the shift amount and the shift amount detection characteristic amount calculated at step S24 to the classification section 52 and the prediction arithmetic operation section 54. The shift amount detection characteristic amount output at this time is, for example, the reliability of the selected vector. It is to be noted that, where a motion compensation residual with regard to the selected vector has been determined by the characteristic amount extraction section 122, also the motion compensation residual is output as the shift amount detection characteristic amount.

Through the processes described above, from among a plurality of motion compensating vectors, which are present temporally and spatially, the motion compensating vector having the highest reliability is selected as a selected vector of the noticed pixel, and the shift amount of the central tap (noticed pixel) is calculated based on the selected vector.

Figure 31:
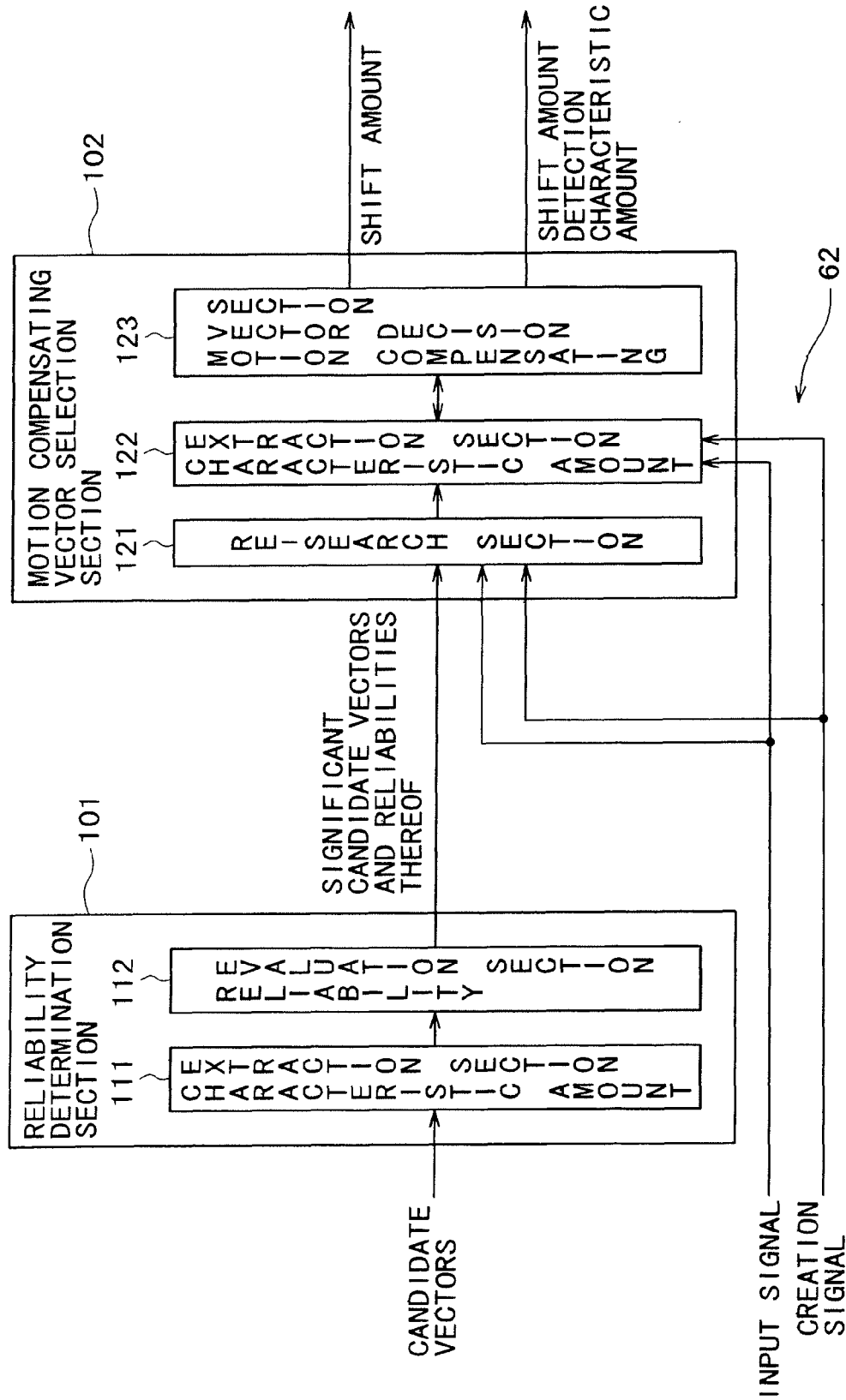
FIG. 31 is a block diagram showing another exemplary configuration of the shift information extraction section of FIG. 2.

FIG. 31 shows a second example of configuration of the shift information extraction section 62 of FIG. 2. It is to be noted that elements corresponding to those in FIG. 3 are denoted by like reference numerals. In particular, the shift information extraction section 62 of FIG. 31 is configured basically similarly to that of FIG. 3. However, the reliability determination section 101 of FIG. 31 is different from the reliability determination section 101 of the shift information extraction section 62 of FIG. 3 in that an input signal from the decoding section 11 and a creation signal from the signal storage section 33 are not supplied but only candidate vectors are supplied from the candidate vector acquisition section 61.

Accordingly, since the characteristic amount extraction section 111 of FIG. 31 cannot utilize the input signal and the creation signal for calculation of the reliability, it compares a candidate vector with motion compensating vectors in the proximity of the candidate vector to determine the reliability of the candidate vector.

Figure 32:
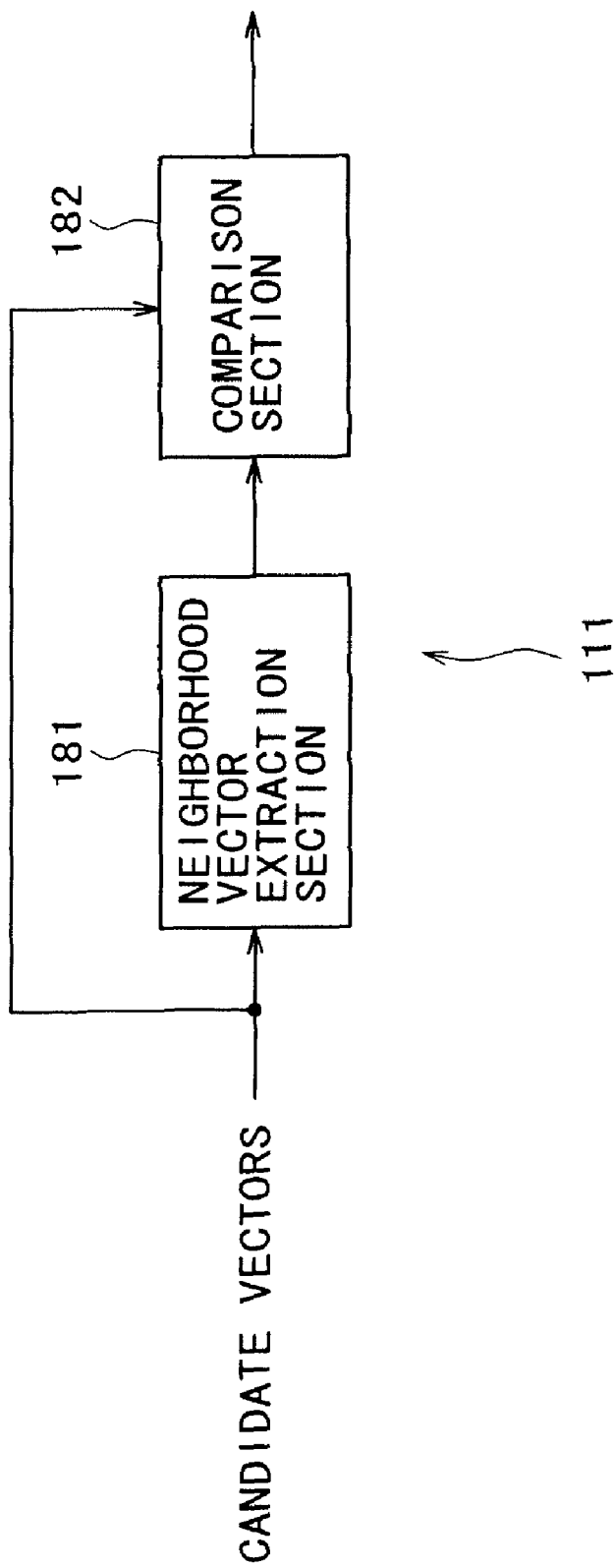
FIG. 32 is a block diagram showing an exemplary configuration of a characteristic amount extraction section of FIG. 31.
Figure 33:
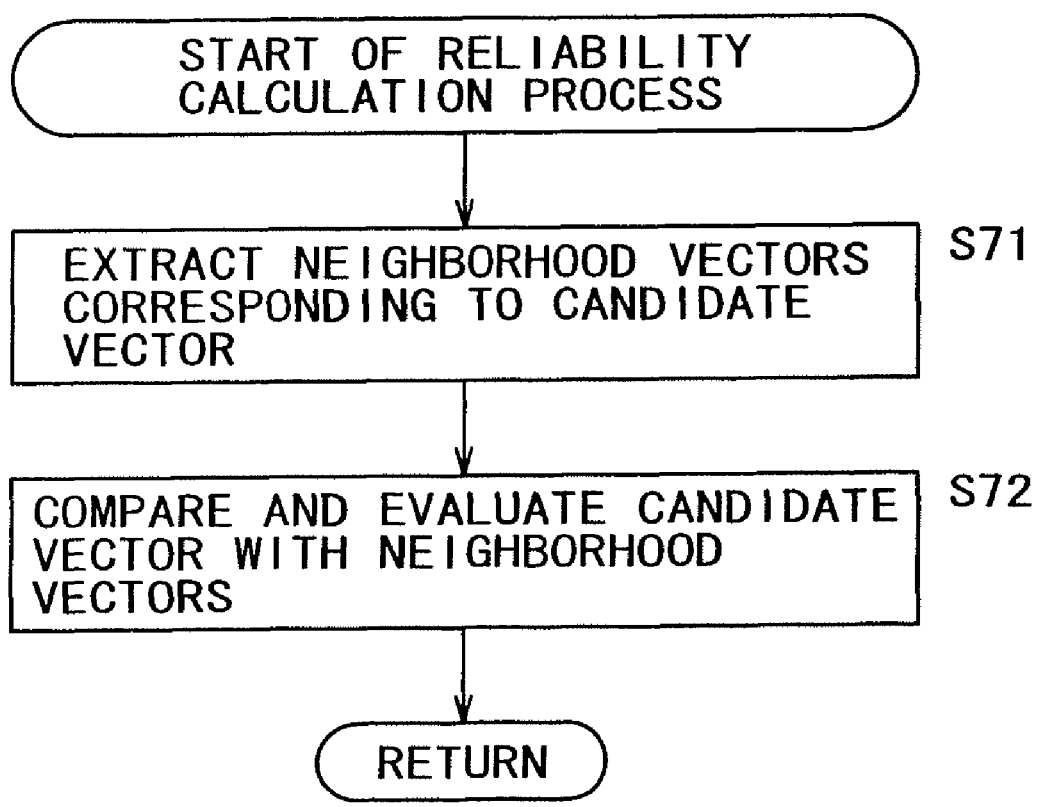
FIG. 33 is a flow chart illustrating another exemplary reliability calculation process at step S32 of FIG. 18.

FIG. 32 shows an example of configuration of the characteristic amount extraction section 111 of FIG. 31.

In the example of FIG. 32, the characteristic amount extraction section 111 includes a neighborhood vector extraction section 181 and a comparison section 182. The neighborhood vector extraction section 181 extracts neighborhood motion compensating vectors (hereinafter referred to as neighborhood vectors) corresponding to a candidate vector from among motion compensating vectors. The comparison section 182 compares and evaluates the neighborhood vectors extracted by the neighborhood vector extraction section 181 with the candidate vector to determine the reliability of the candidate vector and outputs the reliability to the reliability evaluation section 112.

A reliability determination process executed by the reliability determination section 101 of FIG. 31 is similar to the reliability determination process described hereinabove with reference to FIG. 18 except that the reliability calculation process at step S32 is different. Therefore, illustration and description of the reliability determination process are omitted to avoid redundancy. Accordingly, only a different example of the reliability calculation process at step S32 (FIGS. 20 and 26) of FIG. 18 is described with reference to a flow chart of FIG. 33.

At step S71, the neighborhood vector extraction section 181 extracts neighborhood vectors corresponding to the candidate vector from among motion compensating vectors. The neighborhood vectors are a plurality of motion compensating vectors existing spatially. More particularly, a plurality of spatially existing motion compensating vectors are extracted from among the motion compensating vectors acquired by the candidate vector acquisition section 61.

At step S72, the comparison section 182 compares and evaluates the candidate vector with the neighborhood vectors extracted by the neighborhood vector extraction section 181 at step S71 to determine the reliability of the candidate vector and outputs the reliability to the reliability evaluation section 112.

Figure 34:
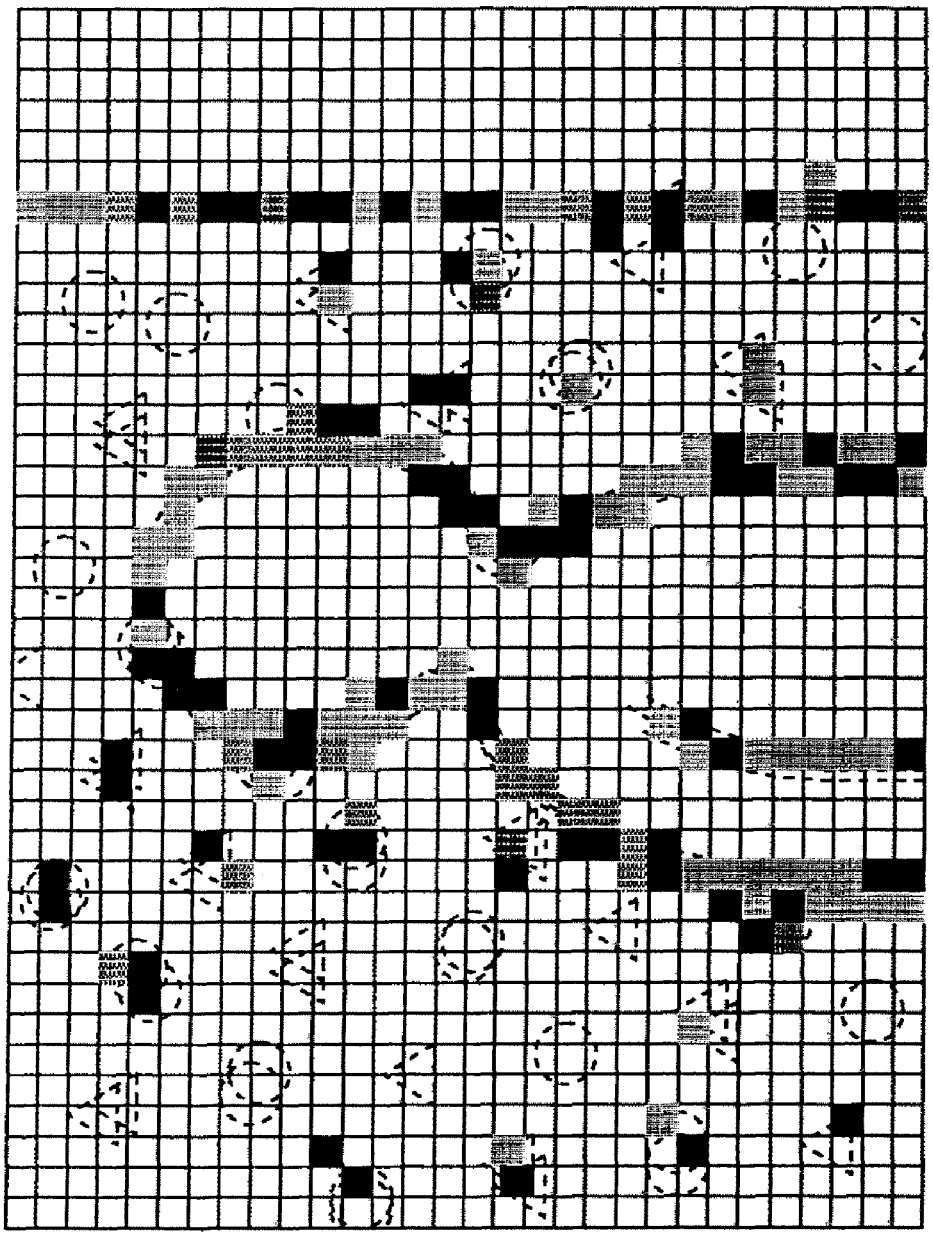
FIG. 34 is a view illustrating another exemplary mapping of digitized reliabilities.
Figure 35:
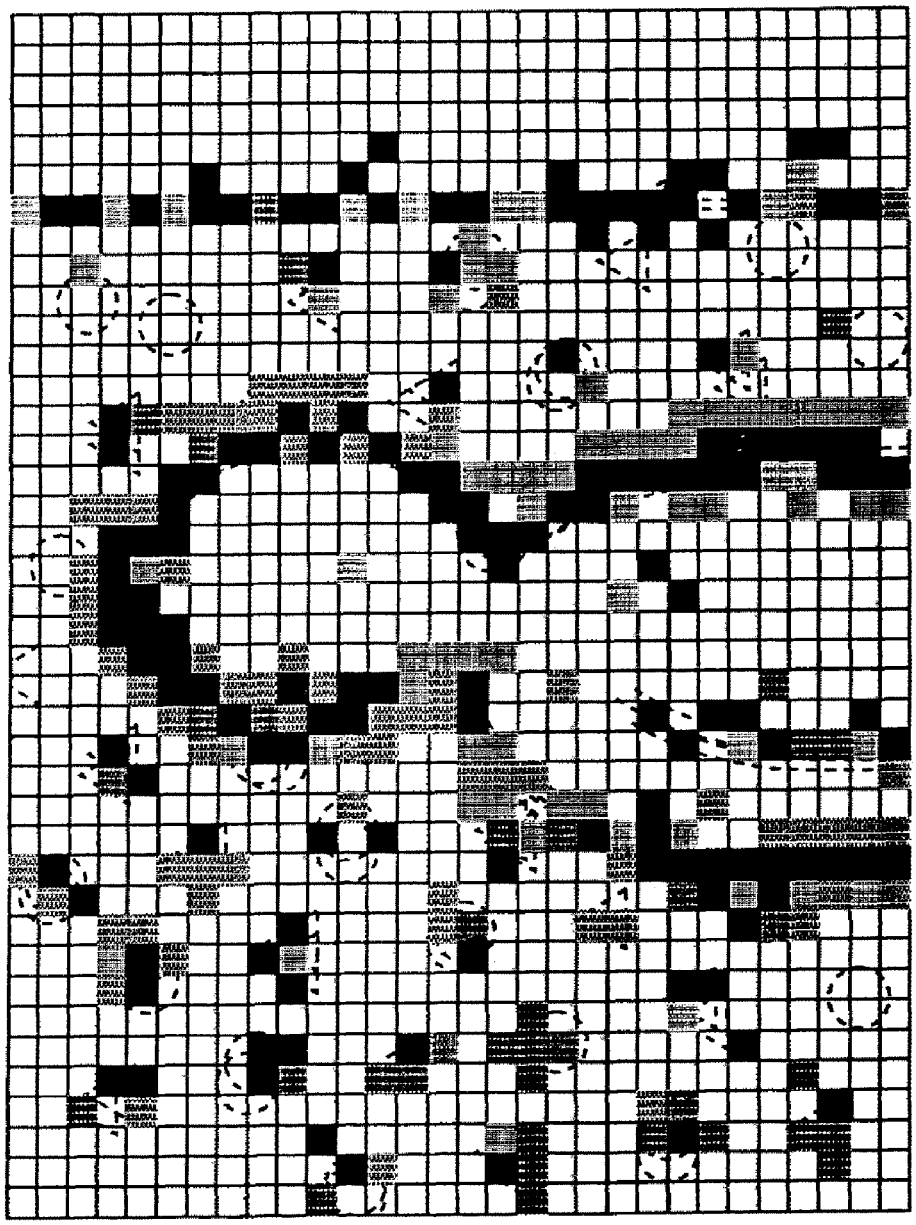
FIG. 35 is a view illustrating a further exemplary mapping of digitized reliabilities.

FIGS. 34 and 35 illustrate results when, using the original image of FIG. 21, the reliabilities are converted into numerical values using difference absolute value sums of candidate vectors of a B picture (FIG. 34) and a P picture (FIG. 35) and corresponding neighborhood vectors (a candidate vector exhibiting a smaller difference absolute value sum from neighborhood vectors has a higher reliability) and mapped to an image.

In the examples of FIGS. 34 and 35, a darker block represents that the candidate vector is fluctuating and has a lower reliability when compared with neighborhood blocks. Further, as seen from FIG. 34, in the frame of the B picture, several blocks exhibit some dispersion on the boundary background of the moving object. However, as seen from FIG. 35, in the frame of the P picture, the tendency of the dispersion appears more significantly than that of FIG. 34. This arises from the fact that, as seen in FIG. 13B, the frame of the P picture is spaced by a greater temporal distance from the reference I picture than the frame of the B picture.

Since evaluation of a reliability can be obtained also by comparison of a candidate vector with neighborhood vectors as described above, the determination process of whether or not the reliability is high is executed at step S33 of FIG. 18 based on a result of the evaluation.

Figure 36:
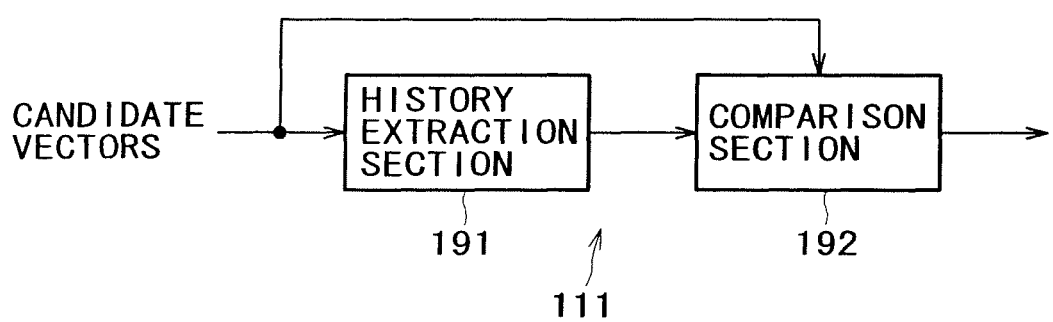
FIG. 36 is a block diagram showing another exemplary configuration of the characteristic amount extraction section of FIG. 31.

FIG. 36 shows another example of configuration of the characteristic amount extraction section 111 of FIG. 31.

In the example of FIG. 36, the characteristic amount extraction section 111 includes a history extraction section 191 and a comparison section 192. The history extraction section 191 determines, from among motion compensating vectors acquired by the candidate vector acquisition section 61, a plurality of motion compensating vectors existing in the forward direction or the backward direction in time to extract a vector history. The comparison section 192 compares and evaluates a candidate vector with motion compensating vectors in the past (hereinafter referred to as past vectors) or motion compensating vectors in the future (hereinafter referred to as future vectors) corresponding to the candidate vector acquired from the vector history to determine the reliability of the candidate vector and outputs the reliability to the reliability evaluation section 112.

Figure 37:
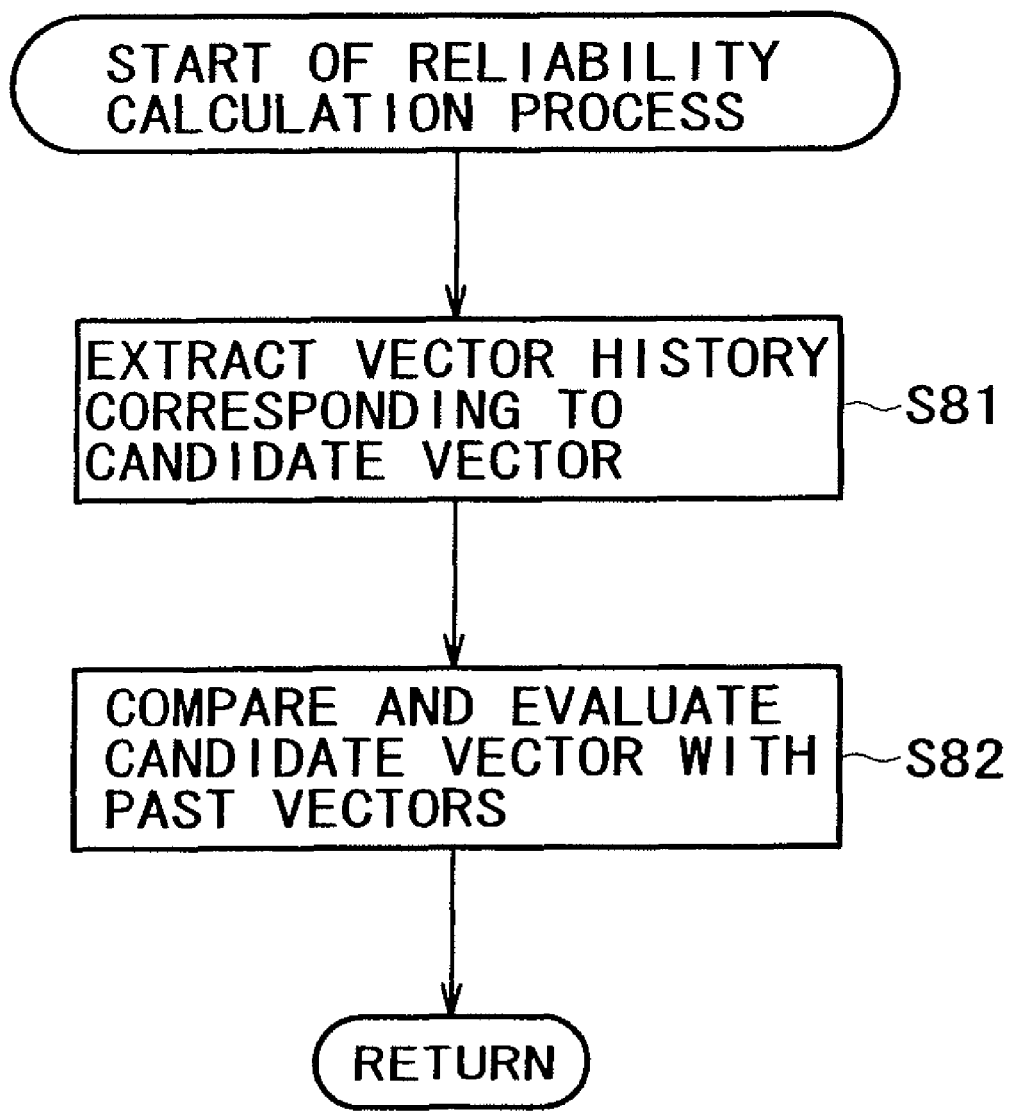
FIG. 37 is a flow chart illustrating another exemplary reliability calculation process at step S32 of FIG. 18.

The reliability calculation process executed by the characteristic amount extraction section 111 of FIG. 36 is described with reference to a flow chart of FIG. 37.

At step S81, the history extraction section 191 extracts the vector history corresponding to the candidate vector. More particularly, the history extraction section 191 determines, from among the motion compensating vectors acquired by the candidate vector acquisition section 61, a plurality of motion compensating vectors existing in the forward direction or the backward direction in time to extract a vector history.

At step S82, the comparison section 192 compares and evaluates, based on the vector history extracted by the history extraction section 191 at step S81, the candidate vector with the past vectors or the future vectors corresponding to the candidate vector to determine the reliability of the candidate vector (for example, a candidate vector having a lower difference absolute value sum from the past vectors (or future vectors) has a higher reliability) and outputs the reliability to the reliability evaluation section 112.

Figure 38:
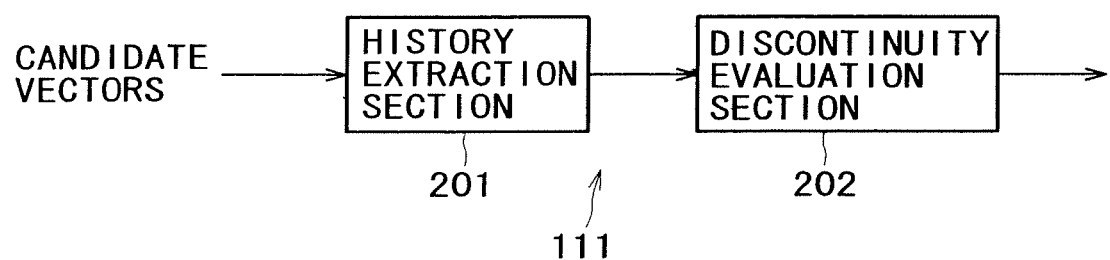
FIG. 38 is a block diagram showing a further exemplary configuration of the characteristic amount extraction section of FIG. 31.

FIG. 38 shows a further example of configuration of the characteristic amount extraction section 111 of FIG. 31.

In the example of FIG. 38, the characteristic amount extraction section 111 includes a history extraction section 201 and a discontinuity evaluation section 202. The history extraction section 201 determines, from among motion compensating vectors acquired by the candidate vector acquisition section 61, a plurality of motion compensating vectors existing in the forward direction or the backward direction in time to extract a vector history. The discontinuity evaluation section 202 evaluates the discontinuity in motion corresponding to the candidate vector acquired from the vector history to determine the reliability of the candidate vector and outputs the reliability to the reliability evaluation section 112.

Figure 39:
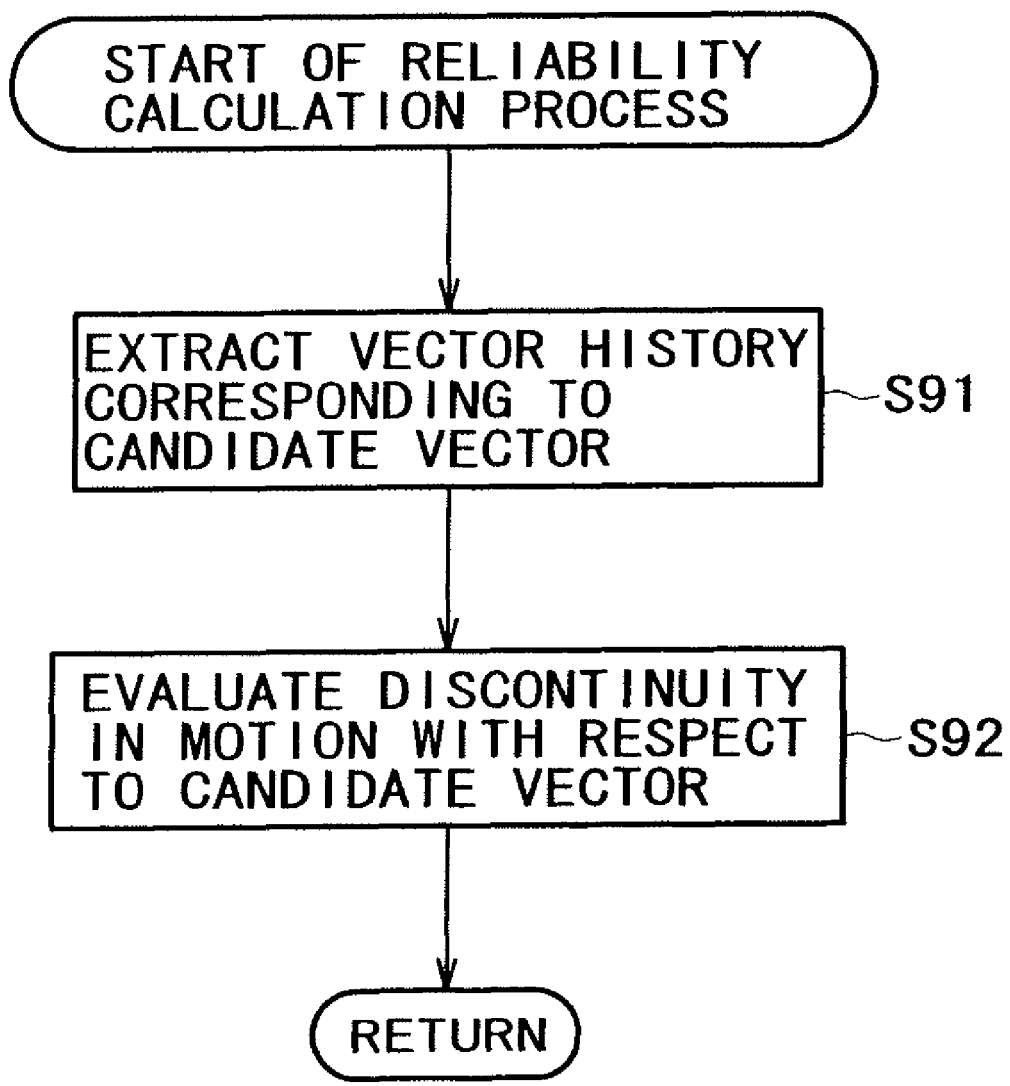
FIG. 39 is a flow chart illustrating a further exemplary reliability calculation process at step S32 of FIG. 18.

The reliability calculation process executed by the characteristic amount extraction section 111 of FIG. 38 is described with reference to a flow chart of FIG. 39.

At step S91, the history extraction section 201 extracts a vector history corresponding to the candidate vector. At step S92, the discontinuity evaluation section 202 evaluates the discontinuity in motion corresponding to the candidate vector acquired from the vector history at step S91 to determine the reliability of the candidate vector (for example, the higher the continuity, the higher the reliability) and outputs the reliability to the reliability evaluation section 112.

Figure 40:
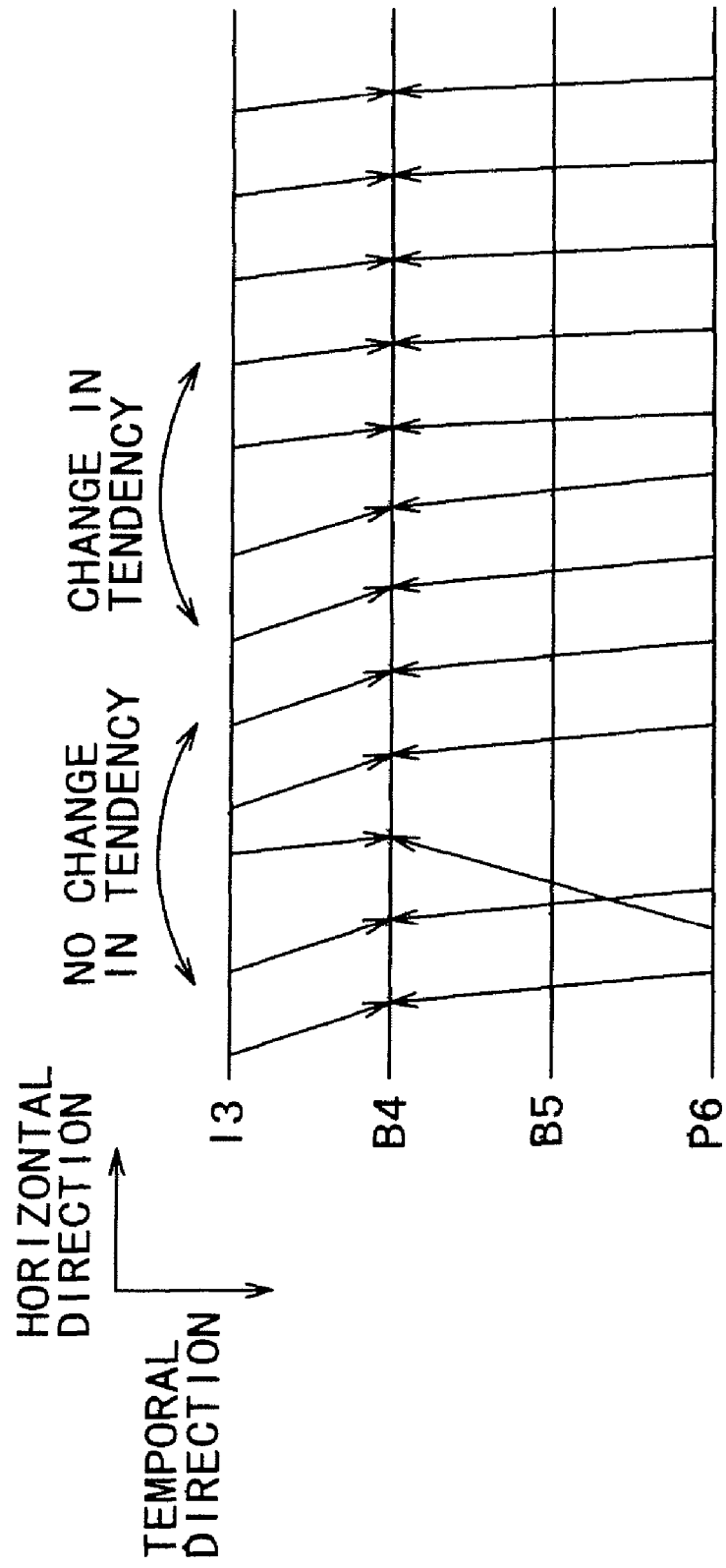
FIG. 40 is a motion compensating vector history.

The processes of FIG. 36 (FIG. 37) and FIG. 38 (FIG. 39) described above are described in more detail with reference to FIG. 40. In the example of FIG. 40, the axis of ordinate indicates the temporal direction, and the time elapses downwardly in FIG. 40 like I3, B4, B5, P6, . . . . Meanwhile, the axis of abscissa indicates the horizontal direction of frames.

In the example, at an arbitrary one of 12 pixels on the B4 frame, a bidirectional vector (a vector history) composed of a forward (past) vector (a motion compensating vector whose start point is the I3 picture and whose end point is the B4 picture) and a reverse (future) vector (a motion compensating vector whose start point is the P6 picture and whose end point is the B4 picture) is indicated.

In the example of FIG. 40, if a notice is taken of the third leftmost reverse vector, it can be seen that only this third leftmost reverse vector crosses with another reverse vector (has a much different direction) and is a fluctuating vector.

By taking notice of the tendency of bidirectional vectors corresponding to a candidate vector and comparing the same with forward vectors or reverse vectors (past vectors or future vectors) as described above, a dispersing candidate vector can be detected. Further, by taking notice of the tendency of bidirectional vectors corresponding to a candidate vector and evaluating the discontinuity in motion, a variation point of the candidate vector can be detected.

Figure 41:
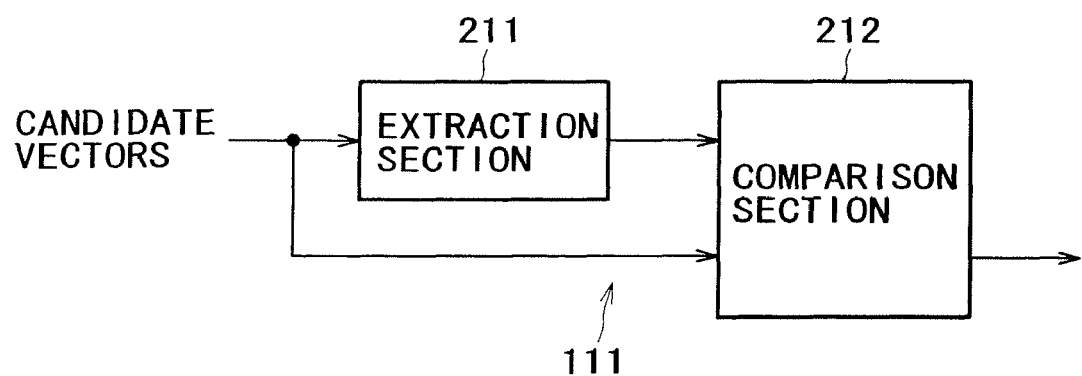
FIG. 41 is a block diagram showing another exemplary configuration of the characteristic amount extraction section of FIG. 3.

FIG. 41 shows a still further example of configuration of the characteristic amount extraction section 111 of FIG. 31.

In the example of FIG. 41, the characteristic amount extraction section 111 includes an extraction section 211 and a comparison section 212. The extraction section 211 extracts, from among motion compensating vectors of coded information supplied from the candidate vector acquisition section 61, a motion compensating vector over a full screen (hereinafter referred to as full screen vector). The comparison section 212 compares and evaluates the candidate vector with the full screen vector extracted by the extraction section 211 to determine a reliability of the candidate vector and outputs the reliability to the reliability evaluation section 112.

Figure 42:
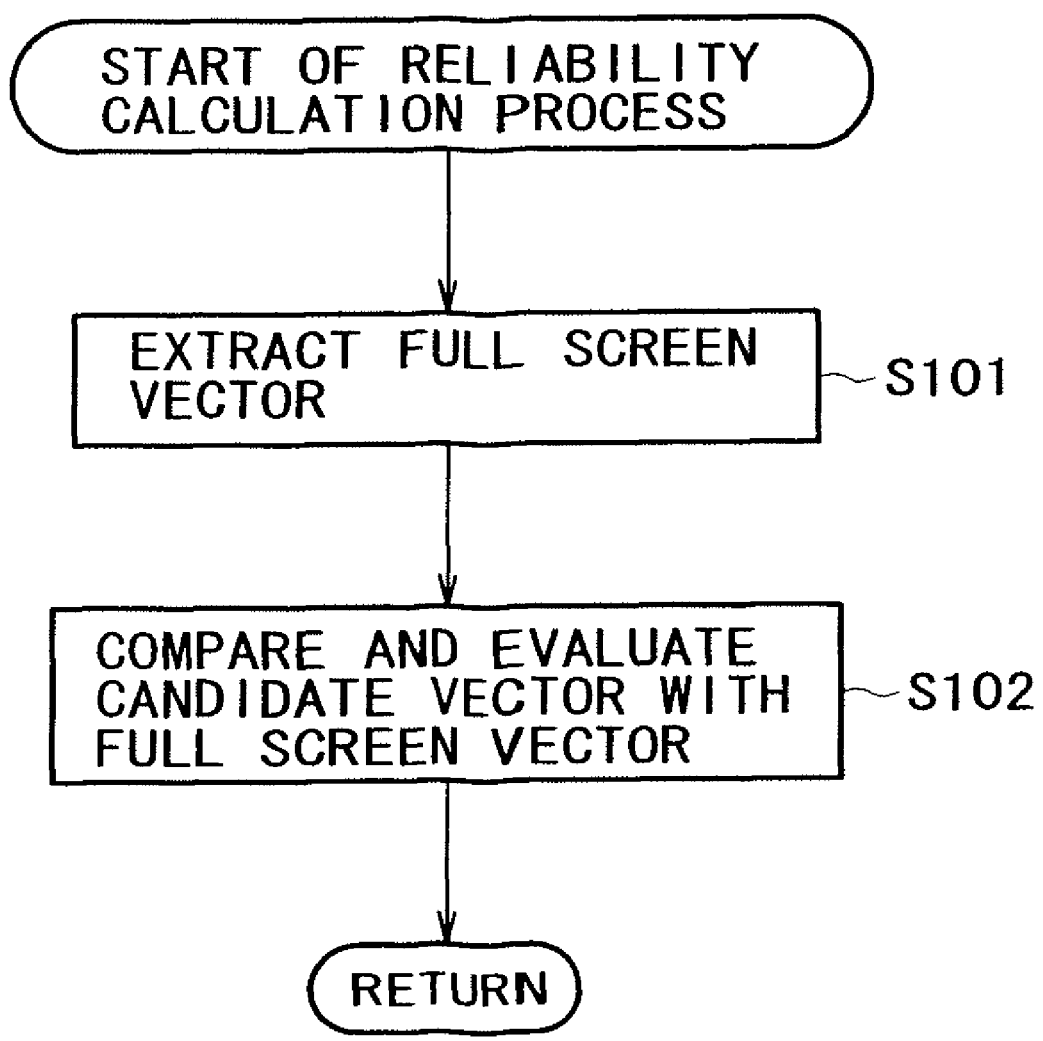
FIG. 42 is a flow chart illustrating another exemplary reliability calculation process at step S32 of FIG. 18.

The reliability calculation process executed by the characteristic amount extraction section 111 of FIG. 41 is described with reference to a flow chart of FIG. 42.

At step S101, the extraction section 211 extracts a full screen vector. In particular, the extraction section 211 arithmetically operates, based on motion compensating vectors of coded information supplied from the candidate vector acquisition section 61, for example, a mean value of all motion compensating vectors on a screen to extract a full screen vector. At step S102, the comparison section 212 compares and evaluates the candidate vector with the full screen vector extracted at step S101 to determine the reliability of the candidate vector and outputs the reliability to the reliability evaluation section 112. Also in this instance, for example, a candidate vector exhibiting a lower difference absolute value sum from the full screen vector is determined to have a higher reliability.

As described above, the reliability of a candidate vector can be determined by comparison and evaluation of the candidate vector with motion compensating vectors on a full screen. Further, though not shown, in order to determine a dispersion of a candidate vector, it is otherwise possible to determine, without using such neighborhood vectors, full screen vector or vector history as described above, the reliability regarding a vector at a half pixel and execute the reliability determination process from a statistic or the like based on the thus determined reliability. Furthermore, while, in the description above, the reliability determination process involves determination with an evaluation value determined by a single calculation process, it may otherwise involve determination from a statistic of a combination of evaluation values determined by the reliability calculation process.

Figure 43:
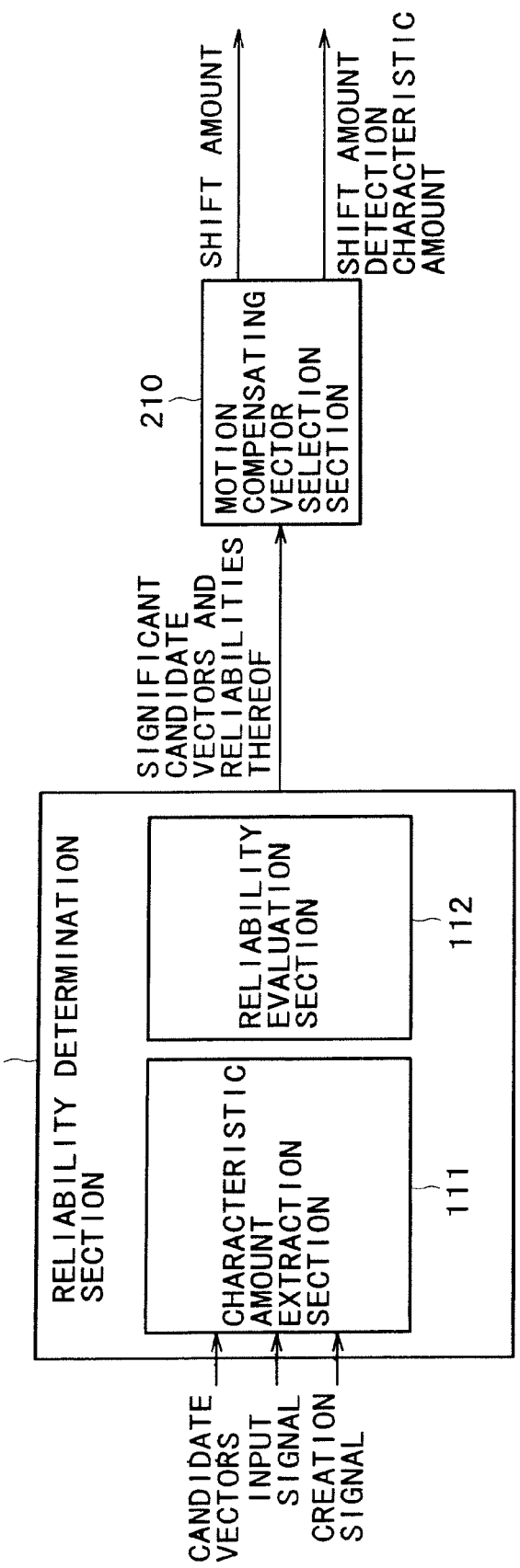
FIG. 43 is a block diagram showing a further exemplary configuration of the shift information extraction section of FIG. 2.

FIG. 43 shows a third example of configuration of the shift information extraction section 62 of FIG. 2. It is to be noted that those elements, which correspond to those of FIG. 3, are denoted by like reference numerals. In particular, the shift information extraction section 62 of FIG. 32 is configured basically similarly to that of FIG. 3. However, the motion compensating vector selection section 210 in the example of FIG. 43 is different from the motion compensating vector selection section 102 of the shift information extraction section 62 of FIG. 43 in that an input signal and a creation signal are not input thereto from the decoding section 11 and the signal storage section 33 but only significant candidate vectors and reliabilities of them are input thereto from the reliability determination section 101.

In particular, the motion compensating vector selection section 210 compares significant candidate vectors with the other motion compensating vectors corresponding to the candidate vectors (for example, neighborhood vectors or past vectors) to select one of the candidate vectors having the highest reliability as a selected vector.

Figure 44:
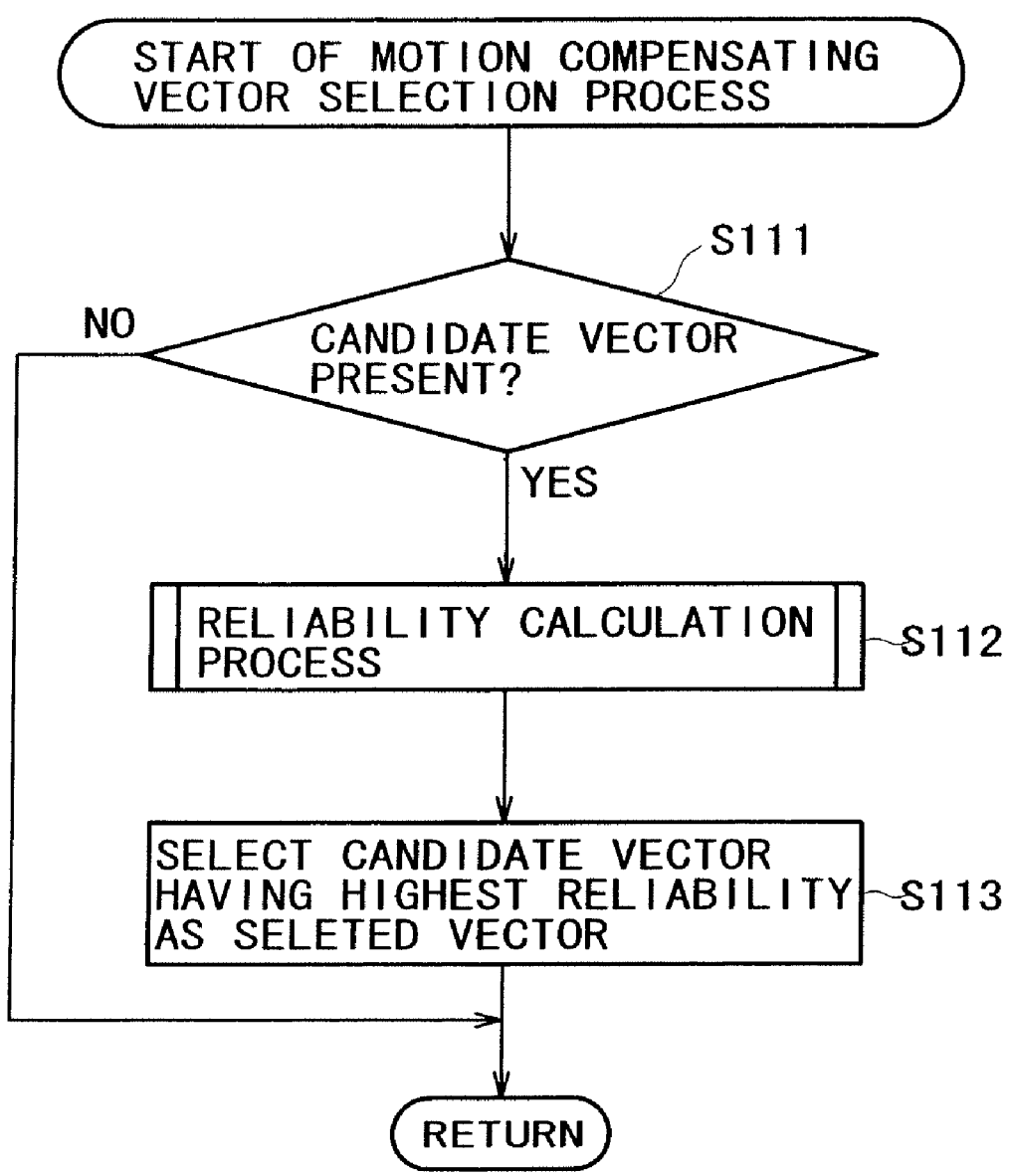
FIG. 44 is a flow chart illustrating another exemplary motion compensating vector selection process at step S23 of FIG. 12.

The motion compensating vector selection process executed by the motion compensating vector selection section 210 of FIG. 43 is described with reference to a flow chart of FIG. 44. It is to be noted that processes at steps S111 to S113 of FIG. 44 are similar to those at steps S61, S63 and S64 of FIG. 28 (the process of FIG. 44 is similar to the motion compensating vector selection process of FIG. 28 except that the steps S62, S65 and S67 of FIG. 28 are excluded and that the reliability calculation process at step S112 is different from that at step S63). Further, the reliability calculation process at step S112 of FIG. 44 is similar to the reliability calculation processes described hereinabove with reference to FIGS. 33, 37, 39 and 42, and description of the same is omitted herein to avoid redundancy.

In particular, since only the significant candidate vectors from the reliability determination section 101 are input to the motion compensating vector selection section 210 but the input signal and the creation signal are not input as described hereinabove, the re-search for a candidate vector executed using the input signal and the creation signal (at step S62 of FIG. 28) and the reliability calculation process including calculation of a motion compensation residual and so forth (FIG. 20 or 26) are not performed. Thus, in the reliability calculation process at step S112, the motion compensating vector selection section 210 executes the reliability calculation processes of FIGS. 33, 37, 39 and 42 in which the input signal and the creation signal are not used but the candidate vectors are used for evaluation through comparison with the other motion compensating vectors (for example, neighborhood vectors or past vectors) corresponding to the candidate vectors. Then at step S113, one of the candidate vectors having the highest reliability is selected as a selected vector, whereafter the motion compensating vector selection process is ended.

Figure 59:
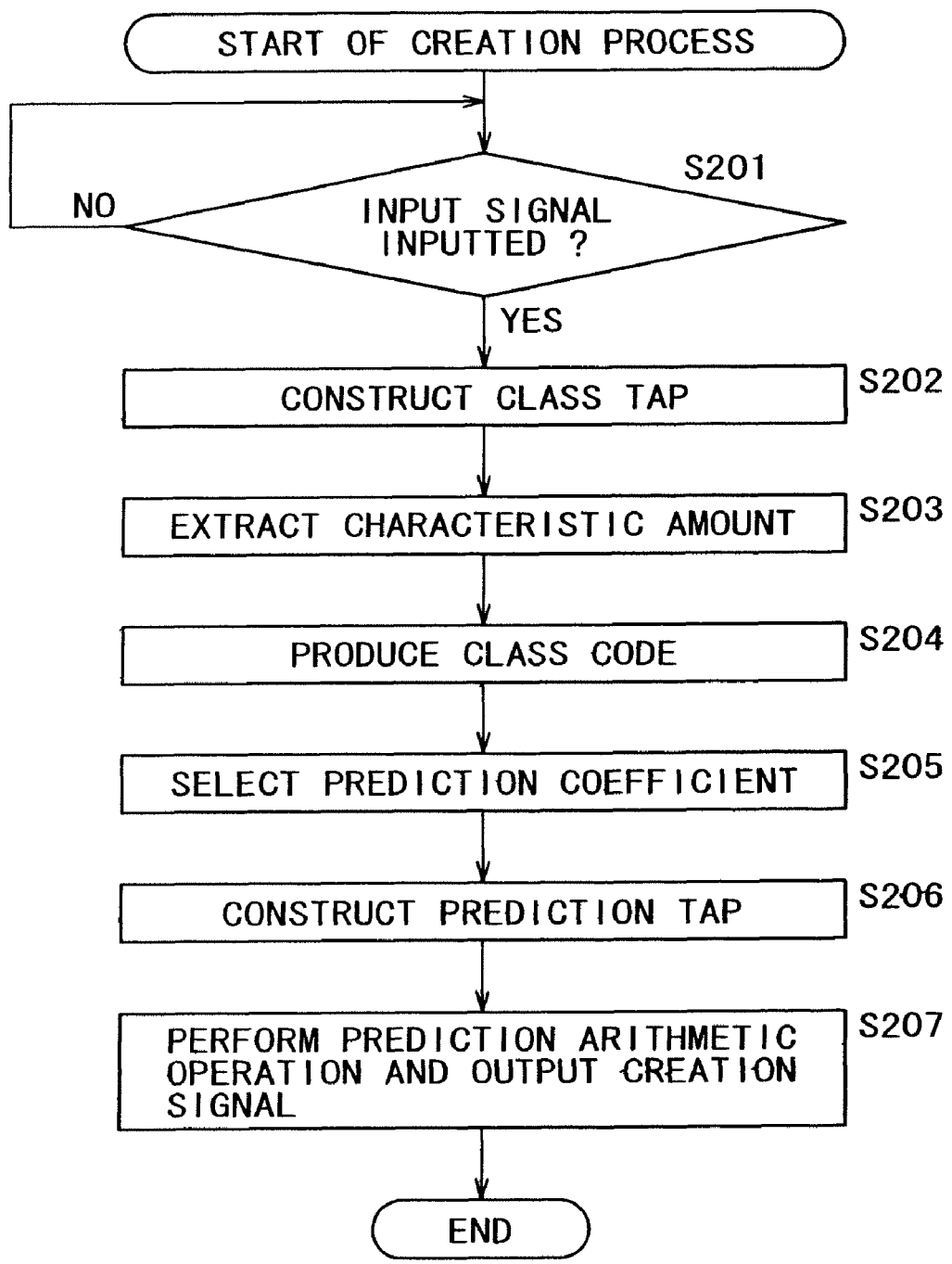
FIG. 59 is a flow chart illustrating an exemplary creation process of the classification adaptation processing section of FIG. 58.

It is to be noted that, since the motion compensating vector selection process of FIG. 44 does not involve utilization of the input signal and the creation signal, it does not include the processes at steps S65 to S67 of FIG. 28. Accordingly, if a candidate vector (motion compensating vector) having the highest reliability cannot be found out from among the candidate vectors at step S113, then neither a shift amount nor a shift amount detection characteristic amount is calculated at steps S24 and S25 of FIG. 12. Thus, as a later process when a candidate vector having the highest reliability cannot be found out from among the candidate vectors at step S113, a process similar to the creation process (processes at the steps beginning with step S202) executed in an intra-frame process (a process in which any other picture is not referred to [a process in which no motion compensation prediction process is executed]) which is hereinafter described with reference to a flow chart of FIG. 59 is executed.

It is to be noted that the combination of the reliability calculation processes executed in the reliability determination process and the motion compensating vector selection process may be repetitive use of a similar process or a combination of different processes. Further, any number of such processes may be used for the combination.

Figure 45:
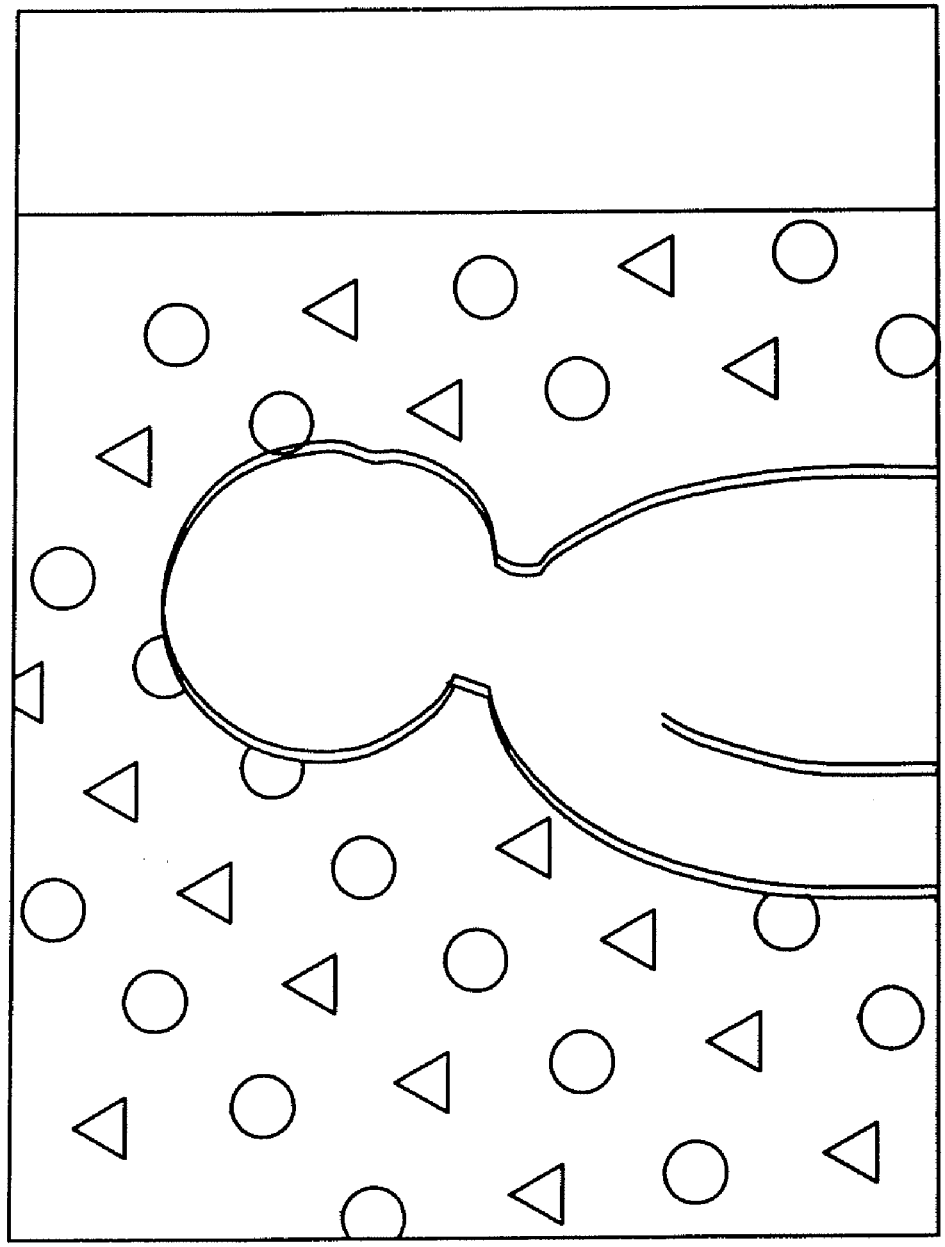
FIG. 45 is a view showing another exemplary image of a created intermediate frame.

FIG. 45 illustrates an image of an intermediate frame obtained by using the original image of FIG. 21 and using results of the comparison and evaluation (FIG. 33) of candidate vectors and neighborhood vectors and results of the comparison and evaluation (FIG. 26) of the candidate vectors and motion compensating vectors from re-encoded information obtained by re-encoding the input signal from within the reliability calculation process executed in such a manner as described above to select those candidate vectors having low evaluation values as selected vectors to execute creation of a time resolution.

It can be seen that, in the example of FIG. 45, failure of pixels particularly on the boundary of the person (moving object) is suppressed and the image is improved considerably when compared with the example of FIG. 22.

Figure 46:
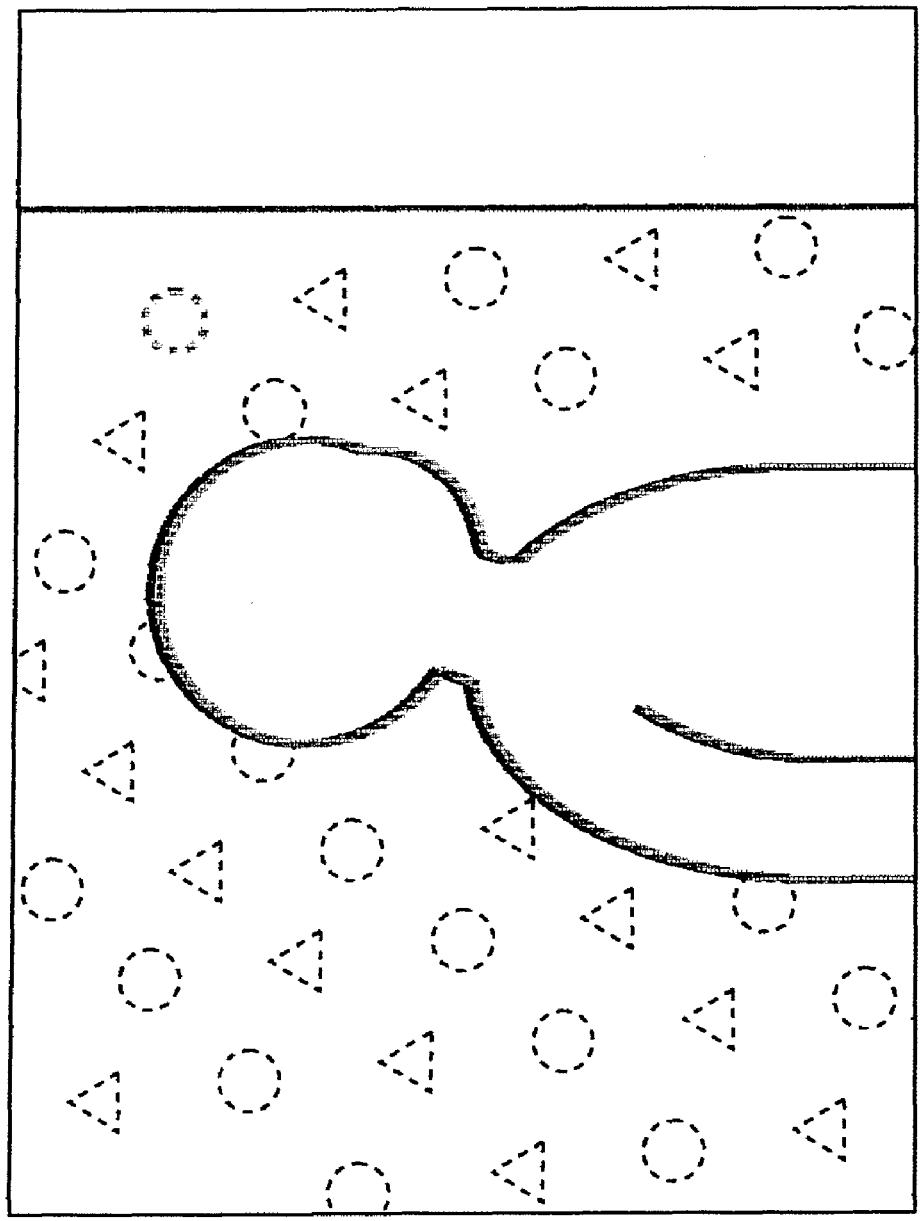
FIG. 46 is a view illustrating another exemplary result of mapping of digitized reliabilities.

Meanwhile, FIG. 46 illustrates a result when, using the original image of FIG. 21, reliability evaluation similar to that of the example of FIG. 45 is executed to select candidate vectors each having a high reliability as selected vectors and an image of an intermediate frame is produced based on the selected vectors and then the reliabilities of the selected vectors are converted into numerical values and mapped to the image of the intermediate frame.

In the example of FIG. 46, it is shown that the thicker and darker the contour, the lower the reliability. It can be seen that the counter of the body of the person is thinner and lighter. At part of the boundary of the person (moving object) or the background, the reliability of the motion compensating vector is higher than that where those candidate vectors with which the motion compensation residual exhibits the lowest value are selected as selected vectors to produce an image of an intermediate frame (FIG. 23). Consequently, it can be recognized that the motion compensating vectors are considerably stable.

Since reliability evaluation of temporal and spatial motion compensating vectors is executed and only significant motion compensating vectors are selected in such a manner as described above, the picture quality of an intermediate frame created is improved.

Further, not only a shift amount of a central tap (noticed pixel) corresponding to a selected vector selected by the motion compensating vector decision section 123 but also a shift amount detection characteristic amount (for example, the reliability or motion compensation residual of the motion compensating vector) is output to the classification section 52 and the prediction arithmetic operation section 54. Since the shift amount detection characteristic represents reliability evaluation of the motion compensating vector itself included in the input signal, a region to which attention should be paid when the determined input signal is processed or a region which is likely to be taken in error when the boundary of a moving body or a motion compensating vector is to be detected again can be indicated. Thus, it is possible to execute a classification process hereinafter described based on the indicated region or boundary.

A shift amount is calculated in such a manner as described above at step S2 of FIG. 11. Processes at the steps beginning with step S3 of FIG. 11, which are executed using the shift amount calculated as described above, are described in more detail below.

At step S3, the class tap construction section 131 of the classification section 52 receives the input signal from the decoding section 11 and the creation signal from the signal storage section 33 as inputs thereto and determines a creation pixel by such tap extraction as illustrated in FIG. 47 based on the shift amount and the shift amount detection characteristic amount supplied from the motion compensating vector decision section 123. Then, the class tap construction section 131 constructs a class tap in accordance with the creation pixel and outputs the class tap to the class code production section 132.

An example of tap extraction where the tap structure includes 3×3 pixels is described with reference to FIGS. 47A-B. FIG. 47A illustrates tap construction on a plane where the axis of ordinate is the vertical direction of a frame and the axis of abscissa is the temporal direction. FIG. 47B shows tap construction on a plane where the axis of ordinate is the vertical direction of a frame and the axis of abscissa is the horizontal direction of the frame.

In the example of FIGS. 47A-B, creation of an intermediate frame F2 between a past frame F1 and a future frame F3 on the time axis is illustrated. It is to be noted that a indicated on the time axis represents a value for internal division of a motion compensating vector MV4 determined from a distance between and/or across frames or the like.

In the present example, the past frame F1 is a frame of a motion compensation reference source and is constructed from the creation signal. Meanwhile, the future frame F3 is a frame after motion compensation reference and is constructed from the input signal. Then, the motion compensating vector MV4 whose end point is a noticed pixel a4 on the future frame F3 and whose start point is a reference pixel b4 on the past frame F1 is selected. Based on the motion compensating vector MV4, a shift amount S1 from the reference pixel (central tap) b4 on the past frame F1 and another shift amount S2 from the noticed pixel (central tap) a4 on the future frame F3 are determined. It is to be noted that the shift amount S1 and the shift amount S2 are calculated and supplied by the motion compensating vector decision section 123 at step S24 of FIG. 12 described hereinabove.

In particular, a creation pixel c4 of the intermediate frame F2 corresponds in position to a pixel b0 of the past frame F1 and another pixel a0 of the future frame F3. However, since a better image is obtained if creation of a time resolution is performed based on the motion compensating vector MV4, as the reference source on the past frame F1, the pixel b4 is used in place of the pixel b0. This can be considered equivalent to shifting (tap extraction) of the pixel of the reference source from the position of the pixel b4 to the position of the pixel b0 by the shift amount S1 to utilize the pixel of the reference source for creation of a time resolution (creation of an intermediate frame). Similarly, as a reference destination on the future frame F3, the pixel a4 is used in place of the pixel a0. This can be considered equivalent to shifting (tap extraction) of the pixel of the reference destination from the position of the pixel a4 to the position of the pixel a0 by the shift amount S2 to utilize the pixel of the reference source for creation of a time resolution (creation of an intermediate frame). Thus, such shifting is only conceptual, not actually performed.

It is to be noted that, since shifting (tap extraction) is performed in a unit of a tap group, a tap group AE4 and another tap group BE4 each including 3×3 pixels in the neighborhood of the noticed pixel a4 and the reference pixel b4 including the same are determined based on the noticed pixel a4 and the reference pixel b4, respectively.

In this manner, the tap group AE4 or the tap group BE4 is shifted conceptively based on the shift amounts S1 and S2 to construct a tap group CE4 including the creation pixel c4 on the intermediate frame F2 (the center of the tap group CE4). More particularly, the tap group CE4 is determined based on the sum of values of the tap group BE4 weighted with an internal division value a and values of the tap group AE4 weighted with another internal division value $(1-\alpha)$.

It is to be noted that, in a B picture or a P picture of the MPEG 2, the positional relationship of the reference source and the reference destination and the temporal positional relationship of them may possibly be different from each other.

A class tap or taps (pixel or pixels) corresponding to the creation pixel c4 are constructed from within the tap group CE4 determined in such a manner as described above. The number and the position of such class pixels are determined suitably accounting for memory limitations, processing speed and such.

For example, the class tap construction section 131 constructs, based on the shift amount and the shift amount detection characteristic amount, 10 taps including 5 taps (pixels) from the input signal and 5 taps from the creation signal, which is positioned preceding in time (in the past) with respect to the input signal, as class taps (pixels in the neighborhood of the creation pixel).

Figure 48A:
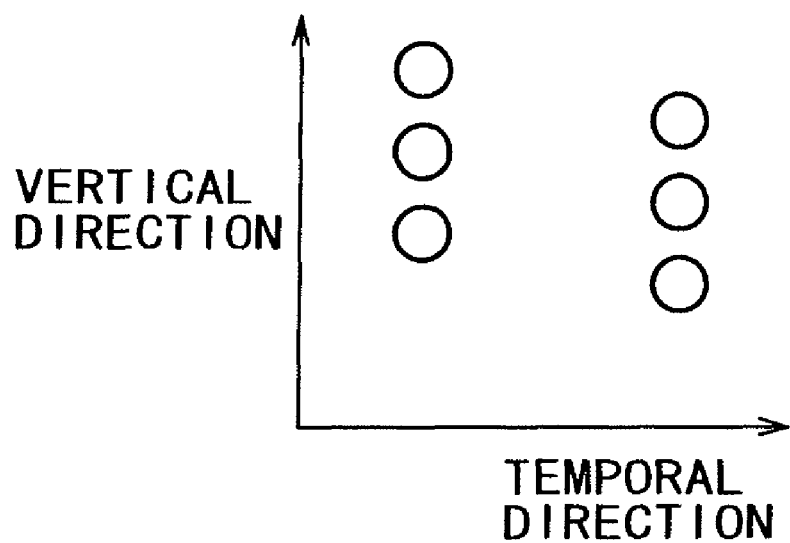
FIGS. 48A and 48B are exemplary configuration of class taps.
Figure 48B:
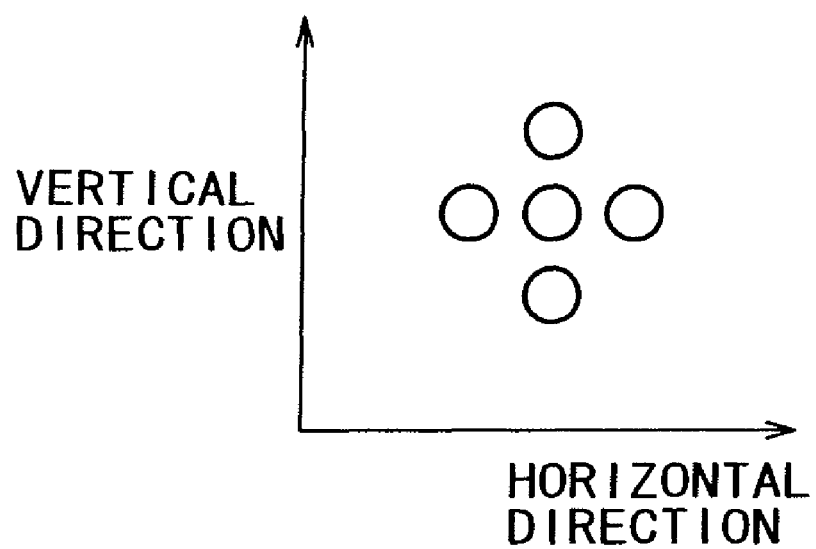

In FIGS. 48A-B, which shows an example of configuration of class taps in the input signal and the creation signal, FIG. 48A shows class taps on a plane whose axis of ordinate indicates the vertical direction of a frame and whose axis of abscissa indicates the temporal direction. Meanwhile, FIG. 48B shows class taps on another plane whose axis of ordinate indicates the vertical direction of the frame and whose axis of abscissa indicates the horizontal direction of the frame.

In the example of FIG. 48A, the preceding tap group (group on the left side in the figure) in the temporal direction is a class tap group of the creation signal, and the succeeding tap group (group on the right side in the figure) is a class tap group of the input signal. Each of the class tap groups of the creation signal and the input signal includes five class taps as seen in FIG. 48B. In other words, while each of the class tap groups is shown including only three class taps in FIG. 48A because some of them overlap with each other, it actually includes five class taps.

Thus, at step S4, the class code production section 132 extracts a characteristic amount of each of the class taps constructed by the class tap construction section 131 based on the shift amount and the shift amount detection characteristic amount from the motion compensating vector decision section 123. The characteristic amount may be, for example, a shift amount (magnitude or direction) of a tap, a motion compensation residual from within the shift amount detection characteristic amount, the reliability of the motion compensating vector from within the shift amount detection characteristic amount, a pattern of a block boundary upon the tap extraction or the like.

Figure 49A:
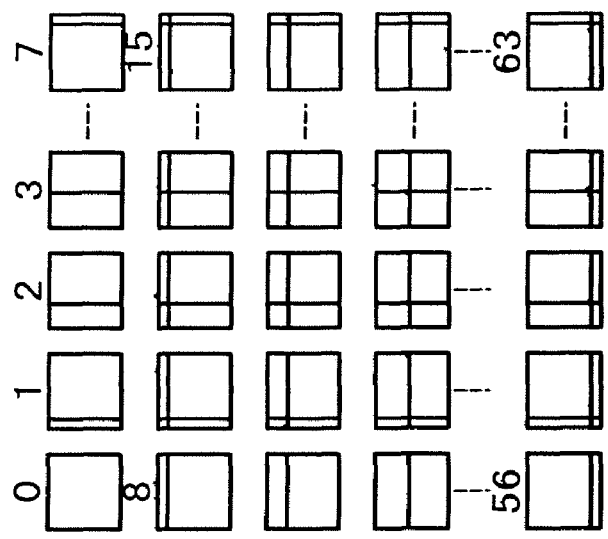
FIGS. 49A and 49B are patterns of a block boundary.

A pattern of a block boundary is described with reference to FIGS. 49A-B. The position of a boundary of a block composed of 8×8 pixels assumes one of 64 patterns as a result of the tap extraction described hereinabove with reference to FIGS. 47A-B. FIG. 49A shows the patterns of a block boundary upon the tap extraction. Patterns of a tap drawn near and a block boundary of a block when the tap extraction is performed are divided into 64 patterns as shown in FIG. 49A.

In the example of FIG. 49A, each of lines extending in a horizontal direction and lines extending in a vertical direction represents a boundary of an original block (prior to the tap extraction). The pattern 0 is a pattern in a case wherein the boundary of the block of the drawn near tap coincides with the boundary of the original block; the pattern 1 is a pattern wherein the block of the drawn near tap is positioned on the left side by a one-pixel distance from the original block; and the pattern 7 is a pattern wherein the block of the drawn near tap is positioned on the left side by a seven-pixel distance from the original block. Further, the pattern 8 is a pattern wherein the block of the drawn near tap is positioned on the upper side by a one-pixel distance from the original block; and the pattern 15 is a pattern wherein the block of the drawn near tap is positioned on the upper side by a one-pixel distance from the original block and on the left side by a seven-pixel distance from the original block. Furthermore, the pattern 56 is a pattern wherein the block of the drawn near tap is positioned on the upper side by a seven-pixel distance from the original block; and the pattern 63 is a pattern wherein the block of the drawn near tap is positioned on the upper side by a seven-pixel distance from the original block and on the left side by a seven-pixel distance from the original block. It is to be noted that, since also the patterns 2 to 6, 9 to 14, 16 to 55, and 56 to 62 can be explained similarly, description thereof is omitted herein.

Figure 49B:
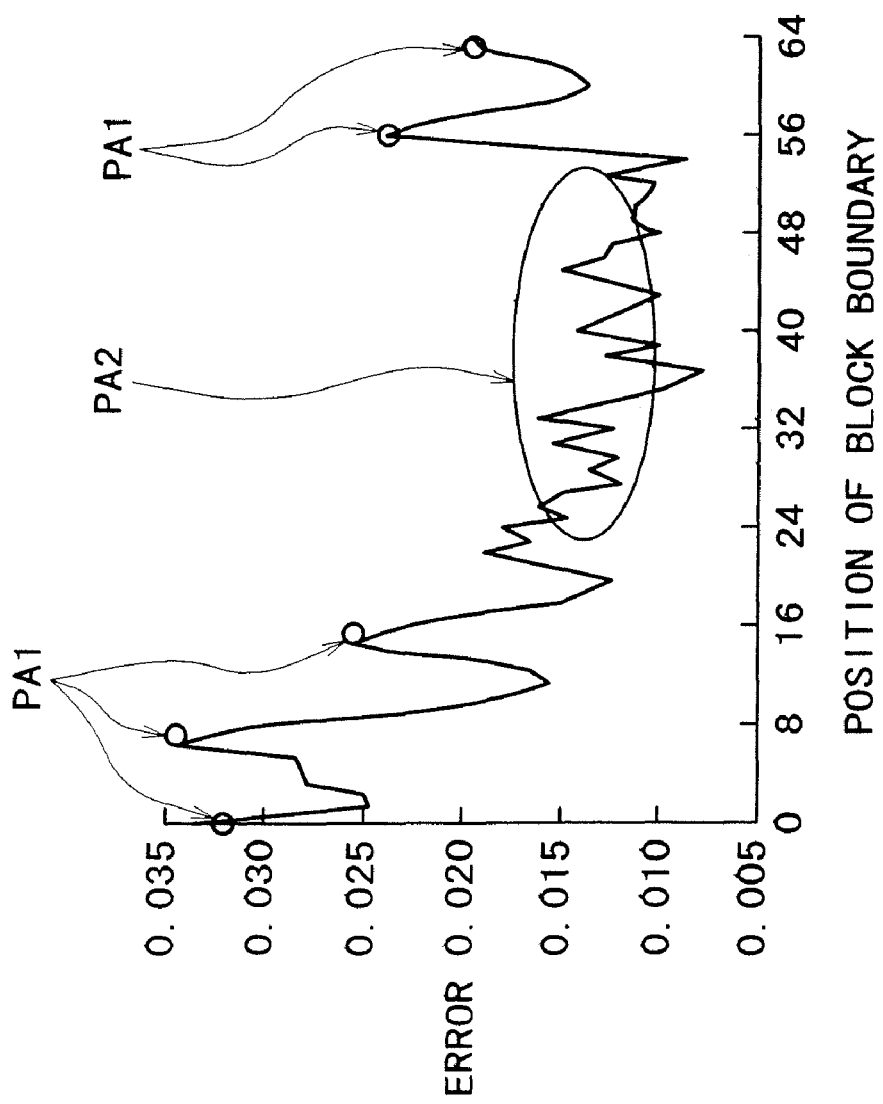

In FIG. 49B, the axis of abscissa indicates the positions (pattern numbers) of the block boundaries of the patterns on the block boundaries patterned as seen in FIG. 49A, and the axis of ordinate indicates errors between the original image and a decoded image obtained by encoding the original image and then decoding the encoded image. It can be seen from FIG. 49B that, if the drawn near tap is on a pattern PA1 wherein it is positioned in the proximity of the original block boundary (for example, the pattern 0, 7, 15, 56 or 63), the error between the original image and the decoded image is great. In contrast, it can be seen that there is a tendency that, where the position of the original block boundary is on a pattern PA2 wherein it is positioned in the inside of the block (for example, one of the patterns 24 to 53), the error between the original image and the decoded image is small.

Since block noise is generated on a block boundary, if the drawn near tap is included in an end portion of a block boundary, a difference in luminance value occurs at the end of the block. An end edge of a block includes, where it is represented with DCT coefficients, many high frequency components, and such high frequency components decrease through quantization with a high probability, which is likely to cause an error. Therefore, those patterns in which the drawn near tap is positioned in the inside of a block boundary can decrease errors between the original image and the decoded image.

Accordingly, if a pattern of a block boundary upon the tap extraction is determined as a characteristic amount and the block is classified based on the characteristic amount, then coding distortion such as block distortion or "mosquito noise" is suppressed and an intermediate frame having a good quality in that the original image and the decoded image exhibit minimized errors is created.

Figure 50:
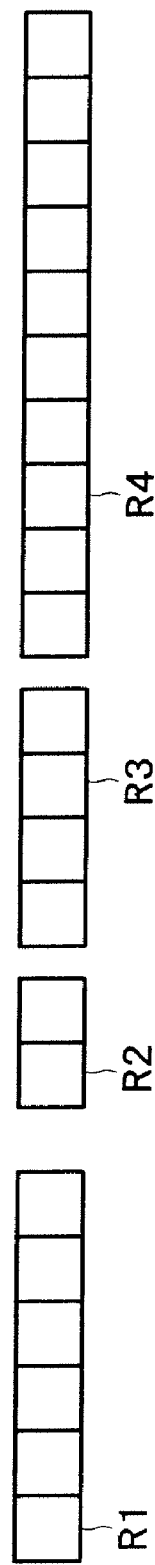
FIG. 50 is a view illustrating an exemplary configuration of a class code.

At step S5 of FIG. 11, the class code production section 132 determines a class of the tap (pixel) based on a threshold value or the like set in advance in accordance with the extracted characteristic amount of the class tap, produces such a class code as seen in FIG. 50 and outputs the class code to the prediction coefficient selection section 53.

When to perform classification by the class taps, it is possible to use a bit string obtained by arranging a bit string representative of sample values of data, which form the class taps, as they are in a predetermined order as a class code. In this instance, however, the number of classes (total number of classes) becomes very great. Therefore, for the classification, a compression process such as, for example, a K-bit ADRC (Adaptive Dynamic Range Coding) process is adopted. For example, when a 1-bit ADRC process is adopted (where K=1), the sample value of data, which form the class tap, is formed from 1 bit.

Accordingly, in the class code illustrated in FIG. 50, classes corresponding to the 64 patterns of block boundaries are represented by 6 bits of R1. However, if the PA2 exhibiting a small error are not used, but only the patterns PA1 exhibiting a great error are used, then the patterns of block boundaries can be represented with a smaller number of bits (for example, 4 bits).

Further, classes corresponding to motion compensation residuals are represented with 2 bits of R2, and classes corresponding to shift amounts are represented with 4 bits of R3. Further, 1-bit ADRC codes for 10 taps, which form a class tap, are represented with 10 bits of R4. As a result, in the example of FIG. 50, a class code is represented with totaling 22 bits.

Then at step S6 of FIG. 11, the prediction coefficient selection section 53 selects the coefficient memory from 71-0 to 71-N. The selected coefficient memory corresponds to the parameter B supplied from the parameter control section 27 of the decoding section 11. The prediction coefficient selection section 53 selects, from among the prediction coefficient data stored in advance in the selected coefficient memory, the prediction coefficient data corresponding to the class code produced by the classification section 52, and outputs the selected prediction coefficient data to the arithmetic operation section 142 of the prediction arithmetic operation section 54. It is to be noted that the prediction coefficient data stored in the coefficient memories 71-0 to 71-N in accordance with the parameter B have been calculated by a learning apparatus 301, which is hereinafter described with reference to FIG. 51.

At step S7, the prediction tap construction section 141 of the prediction arithmetic operation section 54 receives the input signal from the decoding section 11 and the creation signal stored in the signal storage section 33 as inputs thereto, determines a creation pixel by the tap extraction described hereinabove with reference to FIG. 47 based on the shift amount and the shift amount detection characteristic amount supplied from the motion compensating vector decision section 123, constructs a prediction tap in accordance with the creation pixel and outputs the prediction tap to the arithmetic operation section 142.

The arithmetic operation section 142 performs, at step S8, a prediction arithmetic operation process using the prediction coefficient data selected by the prediction coefficient selection section 53 for the prediction tap constructed in such a manner as described above to produce a creation signal of a created time resolution and outputs the creation signal.

The creation signal is output to a monitor or the like, which forms an output section 417 (FIG. 62), and is stored into the signal storage section 33 so as to be used for production of a next creation signal.

As described above, a plurality of motion compensating vectors are extracted from within coded information transmitted and stored as side information. Significant motion compensating vectors are selected based on the extracted motion compensating vectors. Then, an intermediate frame is created based on the significant motion compensating vectors and shift amount detection characteristic amounts such as the reliability. As a result, coding distortion is suppressed and the image quality is improved.

Figure 51:
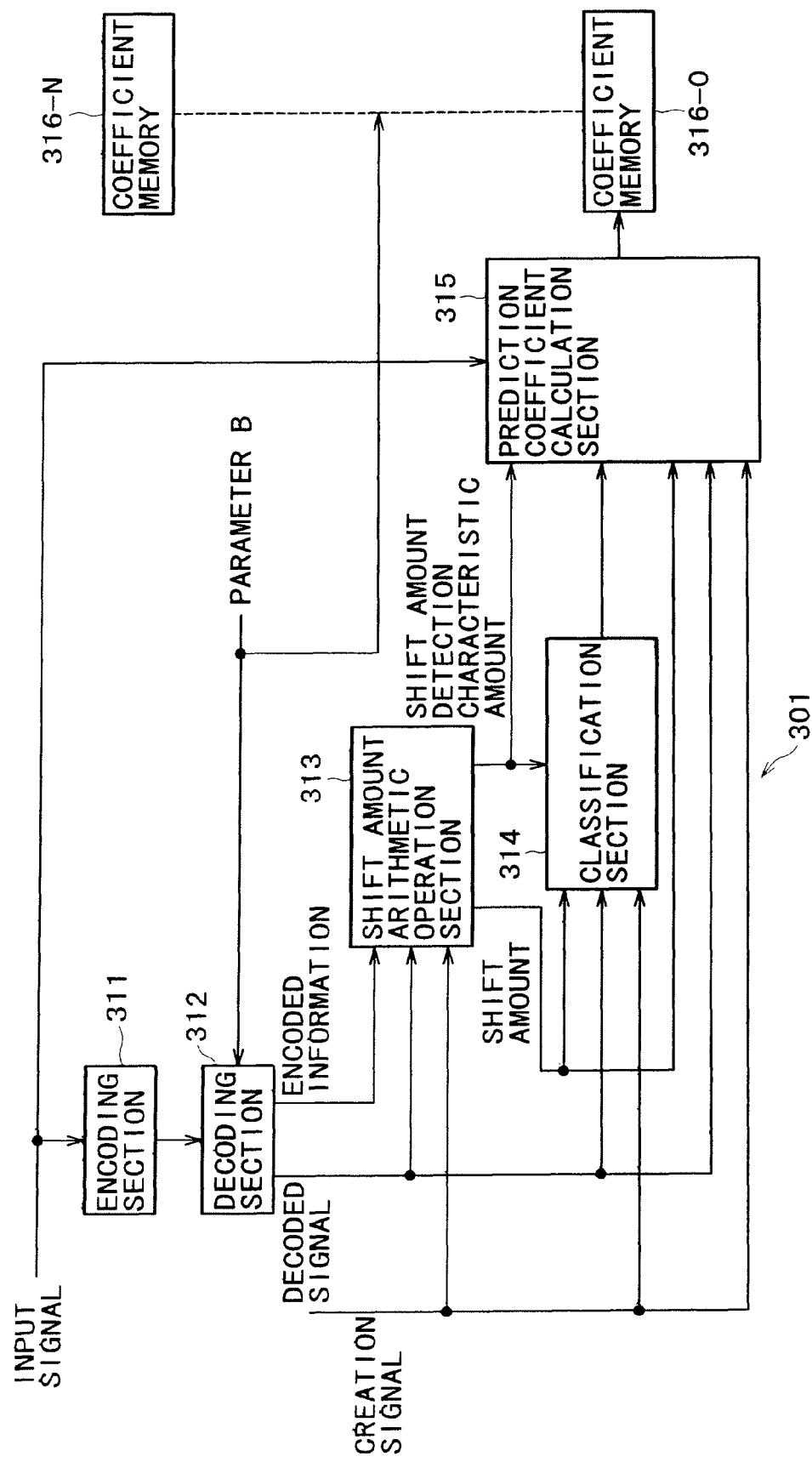
FIG. 51 is a block diagram showing an exemplary configuration of a learning apparatus of the present invention.

FIG. 51 shows a first example of configuration of a learning apparatus 301 for learning prediction coefficient data for different classes to be stored into the coefficient memories 71-0 to 71-N built in the prediction coefficient selection section 53 of the classification adaptation processing sections 31 of FIG. 2.

It is to be noted that the learning apparatus 301 may be included in the image data processing apparatus 1 of FIG. 1, which has the classification adaptation processing sections 31, or may otherwise be formed as an independent apparatus.

An input signal (this input signal is different from the input signal output from the picture selection section 23 of the decoding section 11 of FIG. 1) as a teacher signal is input to an encoding section 311 and is further input as a teacher signal to a prediction coefficient calculation section 315. Also a parameter B (Volume value) is input to the learning apparatus 301 from a parameter production section not shown, which is similar to the parameter control section 27 of FIG. 1.

The encoding section 311 encodes the input signal and outputs the encoded signal to a decoding section 312. The decoding section 312 decodes the encoded signal in accordance with the parameter B and outputs the decoded signal as a first student signal to a shift amount arithmetic operation section 313, a classification section 314 and the prediction coefficient calculation section 315.

A creation signal produced from the input signal as a student signal by a creation section not shown similar to the creation section 12 of FIG. 1 is input as a second student signal to the shift amount arithmetic operation section 313, classification section 314 and prediction coefficient calculation section 315.

The shift amount arithmetic operation section 313 is configured basically similarly to the shift amount arithmetic operation section 51 of FIG. 2. The shift amount arithmetic operation section 313 acquires candidate vectors from among motion compensating vectors included in coded information supplied from the decoding section 312. The shift amount arithmetic operation section 313 evaluates the reliabilities of the candidate vectors using the first student signal and the second student signal to select that one of the candidate vectors, which has the highest reliability, as a selected vector. Further, the shift amount arithmetic operation section 313 determines a shift amount of a central tap (noticed pixel) and a shift amount detection characteristic amount such as a reliability or a motion compensation residual of the motion compensating vector based on the selected vector. The shift amount arithmetic operation section 313 outputs the shift amount and the shift amount detection characteristic amount to the classification section 314 and the prediction coefficient calculation section 315.

The classification section 314 is configured basically similarly to the classification section 52 of FIG. 2, and uses the first student signal and the second student signal to determine a creation pixel by the tap extraction based on the shift amount of the central tap and the shift amount detection characteristic amount supplied from the shift amount extraction section 313, constructs a class tap of the creation pixel, and outputs a class code to the prediction coefficient calculation section 315.

The prediction coefficient calculation section 315 uses the first student signal and the second student signal to determine a creation pixel by the tap extraction based on the shift amount of the central tap and the shift amount detection characteristic amount supplied from the shift information extraction section 62. The prediction coefficient calculation section 315 constructs a prediction tap of the creation pixel, uses the prediction tap and the teacher signal (input signal) corresponding to the prediction tap to learn a relationship between the teacher signal and the student signals based on the class code from the classification section 314 and predicts a prediction coefficient from the parameter B to arithmetically operate and produce prediction coefficient data for each class.

More particularly, for example, a prediction value E[y] of a pixel value y of a pixel of the teacher signal corresponding to a creation signal (student pixel) determined from the first student signal and the second student signal (the two student signals are hereinafter referred to collectively and simply as student signals) is determined using a linear primary combination model defined by a liner combination of a set of several student pixels $x_1, x_2, \ldots$ and predetermined prediction coefficients $w_1, w_2, \ldots$. In this instance, the prediction value E[y] can be represented by the following expression:

$$E[y] = w_1 x_1 + w_2 x_2 + \ldots \quad (1)$$

In order to generalize the expression (1), if a matrix W that is a set of prediction coefficients $w_j$, a matrix X that is a set of student signals $x_{ij}$ and a matrix Y' that is a set of prediction values $E[y_j]$ are defined as

[Expression 1]

$$X = \begin{bmatrix} x_{11} & x_{12} & \ldots & x_{1J} \\ x_{21} & x_{22} & \ldots & x_{2J} \\ \ldots & \ldots & \ldots & \ldots \\ x_{I1} & x_{I2} & \ldots & x_{IJ} \end{bmatrix}$$

$$W = \begin{bmatrix} w_1 \\ w_2 \\ \ldots \\ w_J \end{bmatrix}, Y' = \begin{bmatrix} E[y_1] \\ E[y_2] \\ \ldots \\ E[y_I] \end{bmatrix}$$

then, the following observation equation is established:

$$XW = Y' \quad (2)$$

Here, the component $x_{ij}$ of the matrix X signifies the "j"th student signal in the "i"th set of student signals (a set of student signals to be used for prediction of the "i"th student signal $Y_i$) (prediction coefficients), and the component $w_j$ of the matrix W represents the "j"th student signal in the set of student signals. Accordingly, $E[y_i]$ represents a prediction value of the "i"th teacher signal. It is to be noted that y on the left side of the expression (1) represents the component $y_i$ of the matrix Y from which the suffix i is omitted, and also $x_1, x_2, \ldots$ on the right side of the expression (1) represent the components $x_{ij}$ of the matrix X from which the suffix i is omitted.

It is examined here to apply, for example, the least square method to the observation equation of the expression (2) to determine the prediction value E[y] proximate to the original pixel value y. In this instance, if the matrix Y, which is a set of true pixel values y making a teacher signal and the matrix E, which is a set of residuals e of the prediction values E[y] for the pixel values y, are defined by

[Expression 2]

$$E = \begin{bmatrix} e_1 \\ e_2 \\ \cdots \\ e_I \end{bmatrix}, Y = \begin{bmatrix} y_1 \\ y_2 \\ \cdots \\ y_I \end{bmatrix}$$

then the following residual expression is established from the expression (2):

$$XW = Y + E \qquad (3)$$

In this instance, the prediction coefficient $w_j$ for determining the prediction value E[y] proximate to the original pixel value y can be determined by minimizing the square error

[Expression 3]

$$\sum_{i=1}^{I} e_i^2$$

Accordingly, where a differentiation value of the square error given above with respect to the prediction coefficient $w_j$ is 0, that is, where the prediction coefficient $w_j$ satisfies the following expression, it has an optimum value for determination of the prediction value E[y] proximate to the original pixel value y.

[Expression 4]

$$e_1 \frac{\partial e_1}{\partial w_j} + e_2 \frac{\partial e_2}{\partial w_j} + \ldots + e_I \frac{\partial e_I}{\partial w_j} = 0 (j = 1, 2, \ldots, J) \qquad (4)$$

Thus, the following expression is established by differentiating the expression (3) with respect to the prediction coefficient $w_j$:

[Expression 5]

$$\frac{\partial e_i}{\partial w_1} = x_{i1}, \frac{\partial e_i}{\partial w_2} = x_{i2}, \ldots, \frac{\partial e_i}{\partial w_J} = x_{iJ}, (i = 1, 2, \ldots, I) \qquad (5)$$

From the expressions (4) and (5), the expression (6) is obtained:

[Expression 6]

$$\sum_{i=1}^{I} e_i x_{i1} = 0, \sum_{i=1}^{I} e_i x_{i2} = 0, \ldots, \sum_{i=1}^{I} e_i x_{iJ} = 0 \qquad (6)$$

Further, by taking the relationship of the residual $e_i$ into consideration with the student signal $x_{ij}$, prediction coefficient $w_j$ and teacher signal $y_i$ of the residual equation of the expression (3), the following normal equation can be obtained from the expression (6):

[Expression 7]

$$\begin{cases} \left(\sum_{i=1}^{I} x_{i1}x_{i1}\right)w_1 + \left(\sum_{i=1}^{I} x_{i1}x_{i2}\right)w_2 + \ldots + \left(\sum_{i=1}^{I} x_{i1}x_{iJ}\right)w_J = \left(\sum_{i=1}^{I} x_{i1}y_i\right) \\ \left(\sum_{i=1}^{I} x_{i2}x_{i1}\right)w_1 + \left(\sum_{i=1}^{I} x_{i2}x_{i2}\right)w_2 + \ldots + \left(\sum_{i=1}^{I} x_{i2}x_{iJ}\right)w_J = \left(\sum_{i=1}^{I} x_{i2}y_i\right) \\ \cdots \\ \left(\sum_{i=1}^{I} x_{iJ}x_{i1}\right)w_1 + \left(\sum_{i=1}^{I} x_{iJ}x_{i2}\right)w_2 + \ldots + \left(\sum_{i=1}^{I} x_{iJ}x_{iJ}\right)w_J = \left(\sum_{i=1}^{I} x_{iJ}y_i\right) \end{cases} \qquad (7)$$

It is to be noted that, if the matrix (covariance matrix) A and the vector v are defined as

[Expression 8]

$$A = \begin{pmatrix} \sum_{i=1}^{I} x_{i1}x_{i1} & \sum_{i=1}^{I} x_{i1}x_{i2} & \cdots & \sum_{i=1}^{I} x_{i1}x_{iJ} \\ \sum_{i=1}^{I} x_{i2}x_{i1} & \sum_{i=1}^{I} x_{i2}x_{i2} & \cdots & \sum_{i=1}^{I} x_{i2}x_{iJ} \\ & & \cdots & \\ \sum_{i=1}^{I} x_{iJ}x_{i1} & \sum_{i=1}^{I} x_{iJ}x_{i2} & \cdots & \sum_{i=1}^{I} x_{iJ}x_{iJ} \end{pmatrix}$$

$$v = \begin{pmatrix} \sum_{i=1}^{I} x_{i1}y_i \\ \sum_{i=1}^{I} x_{i2}y_i \\ \vdots \\ \sum_{i=1}^{I} x_{iJ}y_i \end{pmatrix}$$

and the vector W is defined as represented by the Expression 1, then the normal equation given by the expression (7) can be represented by the expression $$AW = v \qquad (8)$$

A number of such normal equations of the expression (7) equal to the number J of the prediction coefficients $w_j$ to be determined can be established by preparing a certain number of sets of the student signals $x_{ij}$ and the teacher signal $y_i$. Accordingly, by solving the expression (8) with respect to the vector W (it is to be noted that, in order to solve the expression (8), the matrix A of the expression (8) must be a singular matrix), an optimum prediction coefficient (here, a prediction coefficient minimizing the square error) $w_j$ can be determined. It is to be noted that, in order to solve the expression (8), it is possible to use, for example, a brushing method (the Gauss-Jordan elimination method) and so forth.

As described above, by determining an optimum prediction coefficient, that is, a prediction coefficient $w_j$, which minimizes a statistic error of a prediction value of a pixel value, a prediction value E[y] proximate to the original pixel value y can be determined from the expression (1) using the determined prediction coefficient $w_j$.

The prediction coefficient data produced in such a manner as described above is stored into one of the coefficient memories 316-0 to 316-N in accordance with the parameter B of the same. For example, prediction coefficient data learned from a decoded signal where the parameter B is "1.00" and the bit rate is 10 Mbps is stored into the coefficient memory 316-9. Prediction coefficient data learned from a decoded signal where the parameter B is "0.90" and the bit rate is 9 Mbps is stored into the coefficient memory 316-8. Prediction coefficient data learned from a decoded signal where the parameter B is "0.10" and the bit rate is 1 Mbps is stored into the coefficient memory 316-0.

As described above, in the learning apparatus 301, a plurality of prediction coefficient data are produced from a plurality of teacher signals and a plurality of student signals in accordance with the parameter B and stored into different memories (selected ones of the coefficient memories 316-0 to 316-N) in accordance with the parameter B. In other words, the parameter B is a parameter for production of a prediction coefficient.

Figure 52:
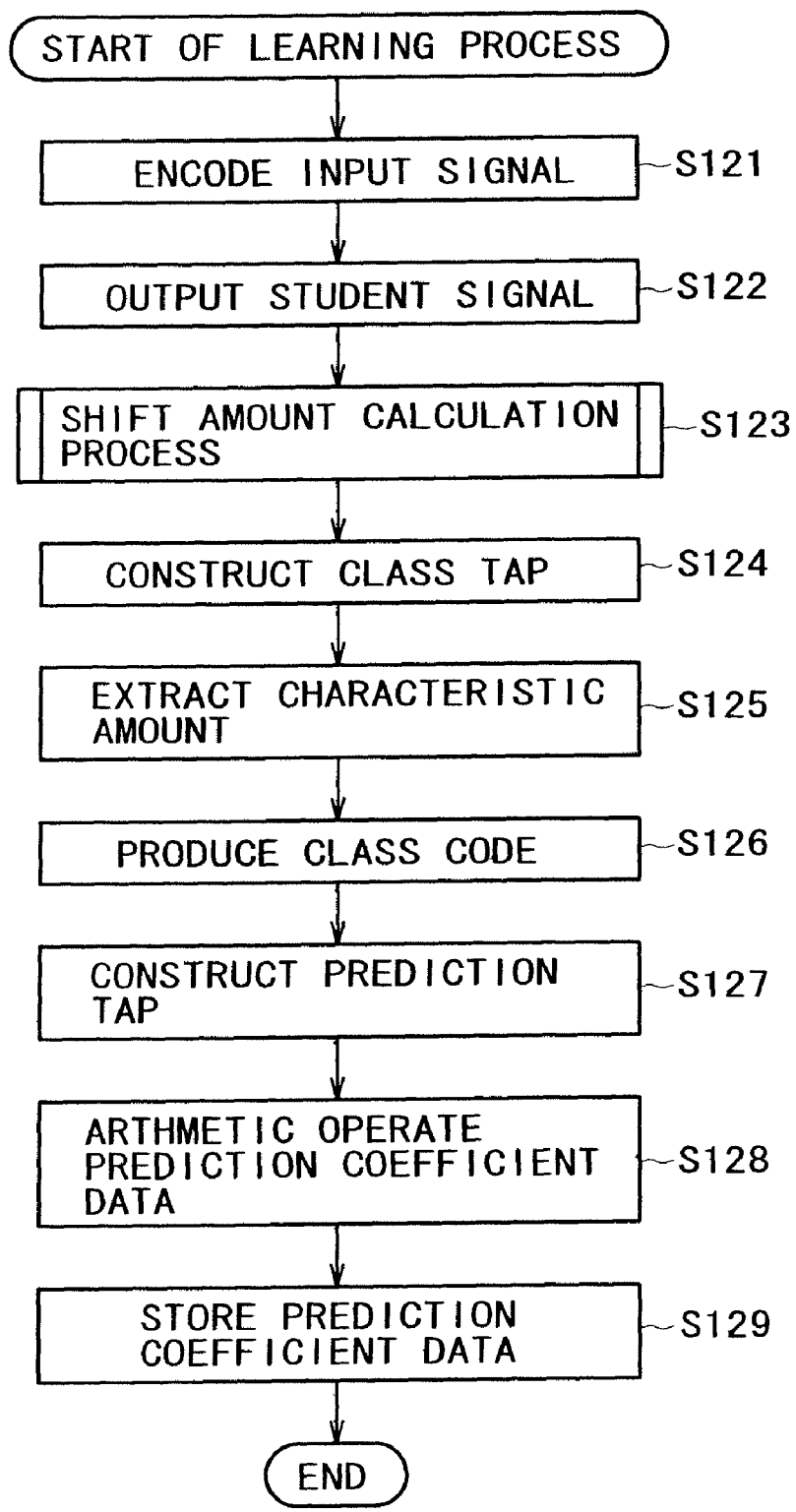
FIG. 52 is a flow chart illustrating a learning process of the learning apparatus of FIG. 51.

Subsequently, a learning process of the learning apparatus 301 is described with reference to a flow chart of FIG. 52.

At step S121, the encoding section 311 encodes the input signal as a teacher signal and outputs the encoded signal to the decoding section 312. At this time, the encoding section 311 outputs quantization characteristic information and encoded information, which is produced upon the encoding, as side information together with a quantized DCT coefficient. At step S122, the decoding section 312 decodes the encoded signal in accordance with the parameter B to produce a first student signal and outputs the first student signal to the shift amount arithmetic operation section 313, classification section 314 and prediction coefficient calculation section 315. Simultaneously, the decoding section 312 outputs also the coded information acquired from the encoded signal to the shift amount arithmetic operation section 313.

At step S123, the shift amount arithmetic operation section 313 executes a shift amount calculation process. The shift amount calculation process is similar to the process of the shift amount arithmetic operation section 51 of FIG. 2 described hereinabove with reference to FIG. 12, and therefore, overlapping description of it is omitted herein to avoid redundancy. By the shift amount calculation process, motion compensating vectors included in the coded information supplied from the decoding section 11 and regarded as candidate vectors are evaluated in regard to the reliability using one of the first student signal and the second student signal (creation signal). Then, one of the candidate vectors, which exhibits the highest reliability, is selected as a selected vector. Then, a shift amount of a central tap (noticed pixel) and a shift amount detection characteristic amount such as the reliability or a motion compensation residual of the selected vector are determined by the shift amount arithmetic operation section 313 and output to the classification section 314 and the prediction coefficient calculation section 315.

At step S124, the classification section 314 uses, similarly to the classification section 52 of FIG. 2, the first and second student signals to determine a creation pixel by the tap extraction based on the shift amount of the central tap and the shift amount detection characteristic amount supplied from the shift amount arithmetic operation section 313 and constructs a class tap of the creation pixel. The classification section 314 extracts, similarly to the classification section 52 of FIG. 2, a characteristic amount of the class tap based on the shift amount and the shift amount detection characteristic amount at step S125, and produces a class code based on the extracted characteristic amount of the class tap and outputs the class code to the prediction coefficient calculation section 315 at step S126.

At step S127, the prediction coefficient calculation section 315 uses the first student signal and the second student signal to determine a creation pixel by the tap extraction based on the shift amount of the central tap and the shift amount detection characteristic amount supplied from the shift amount arithmetic operation section 313 and constructs a prediction tap of the creation pixel (this process is similar to the process of the prediction tap construction section 141 of FIG. 5 of the prediction arithmetic operation section 54 of FIG. 2). At step S128, the prediction coefficient calculation section 315 uses the prediction tap and the corresponding teacher signal to learn the relationship between the teacher signal and the student signals based on the class code from the classification section 314 and predicts a prediction coefficient from the parameter B to arithmetically operate and produce prediction coefficient data for each class. At step S129, the prediction coefficient calculation section 315 stores the prediction coefficient data into that one of the coefficient memories 316-0 to 316-N, which corresponds to the parameter B, and then ends its processing.

Prediction coefficient data for the individual classes stored in the coefficient memories 316-0 to 316-N in accordance with the parameter B in such a manner as described above are stored into the coefficient memories 71-0 to 71-N of the prediction coefficient selection section 53 of FIG. 2.

Figure 53:
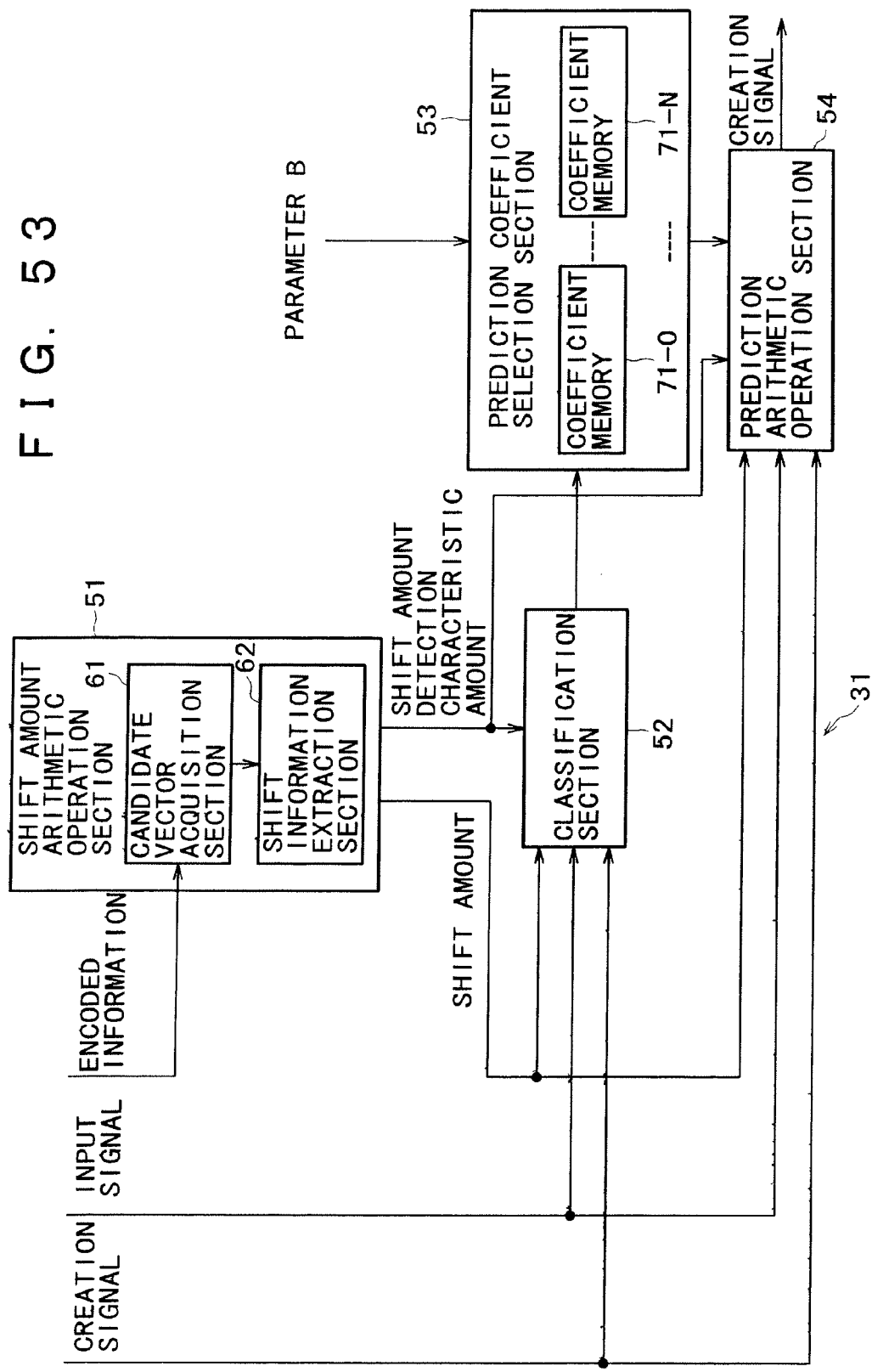
FIG. 53 is a block diagram showing another exemplary configuration of the classification adaptation processing section of FIG. 1.

FIG. 53 shows a second example of configuration of the classification adaptation processing section 31 of FIG. 1. It is to be noted that those elements that correspond to those of FIG. 2 are denoted by like reference numerals. In particular, the classification adaptation processing section 31 of FIG. 53 is configured basically similarly to that of FIG. 2.

However, in the example of FIG. 53, the input signal from the decoding section 11 or the creation signal from the signal storage section 33 is not supplied to the shift information extraction section 62 of the shift amount arithmetic operation section 51. Thus, the shift information extraction section 62 of FIG. 53 compares and evaluates candidate vectors supplied from the candidate vector acquisition section 61 with the other motion compensating vectors to evaluate the reliabilities of the candidate vectors. Then, the shift information extraction section 62 selects that one of the candidate vectors that exhibits the highest reliability as a selected vector, and produces a shift amount of a central tap and a shift amount detection characteristic amount such as the reliability of the selected vector based on the selected vector. Then, the shift information extraction section 62 outputs the shift amount of the central tap and the shift amount detection characteristic amount to the classification section 52 and the prediction arithmetic operation section 54.

Figure 54:
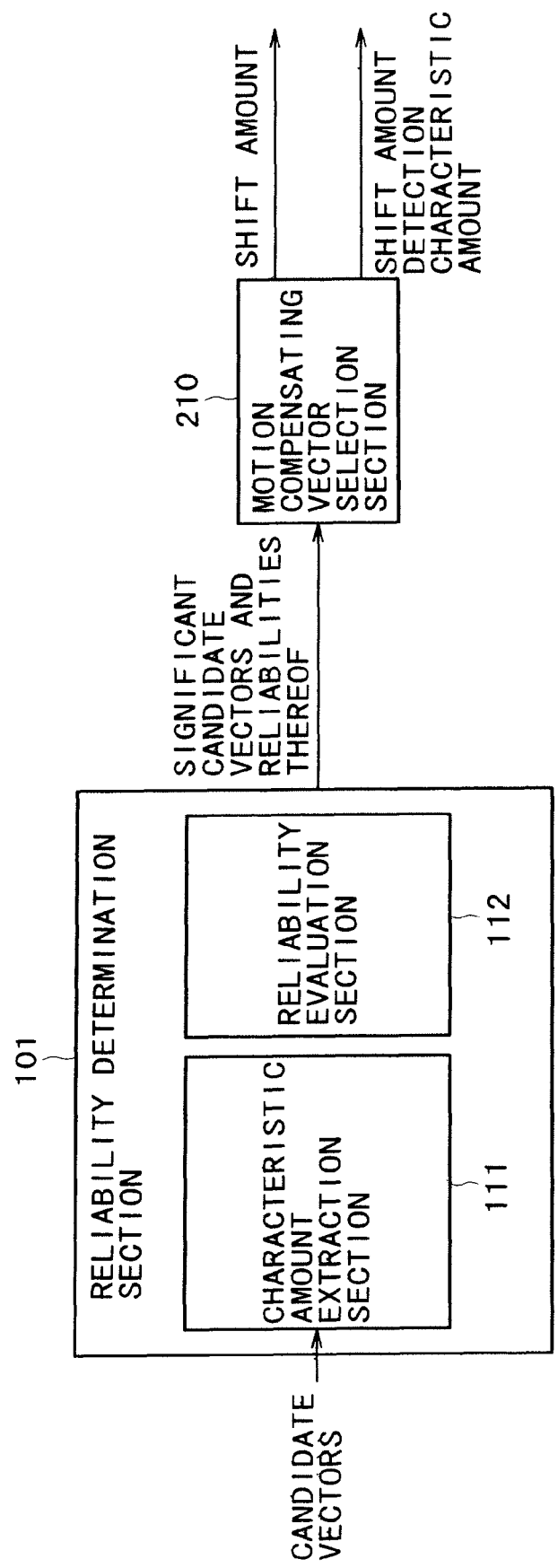
FIG. 54 is a block diagram showing an exemplary configuration of a shift information extraction section of FIG. 53.

FIG. 54 shows an example of configuration of the shift information extraction section 62 of FIG. 53. It is to be noted that the shift information extraction section 62 of FIG. 54 is configured basically similarly to that in FIG. 43. However, in the example of FIG. 54, different from the reliability determination section 101 of the shift information extraction section 62 of FIG. 43, the reliability determination section 101 does not receive the input signal from the decoding section 11 and the creation signal from the signal storage section 33 as inputs thereto but receives only candidate vectors from the candidate vector acquisition section 61 as an input thereto. In particular, the shift information extraction section 62 of FIG. 54 includes the reliability determination section 101 of FIG. 31 and the motion compensating vector selection section 210 of FIG. 43.

Accordingly, the characteristic amount extraction section 111 of the reliability determination section 101 of FIG. 54 compares the candidate vectors with other motion compensating vectors (for example, neighborhood vectors, past vectors or the like) to determine the reliabilities of the candidate vectors. The reliability evaluation section 112 of the reliability determination section 101 discriminates whether or not the reliabilities of the candidate vectors determined by the characteristic amount extraction section 111 are higher than a predetermined reference value. Then, the reliability evaluation section 112 outputs only those of the candidate vectors (significant vectors), which are discriminated to have higher reliabilities, to the motion compensating vector selection section 210 together with the reliabilities.

Further, the input signal and the creation signal are not input to the motion compensating vector selection section 210 either, but only the significant candidate vectors and the reliabilities of them from the reliability determination section 101 are input to the motion compensating vector selection section 210.

Accordingly, the motion compensating vector selection section 210 uses and compares the significant candidate vectors with other motion compensating vectors (for example, neighborhood vectors, past vectors or the like) to select that one of the candidate vectors having the highest reliability.

Figure 55:
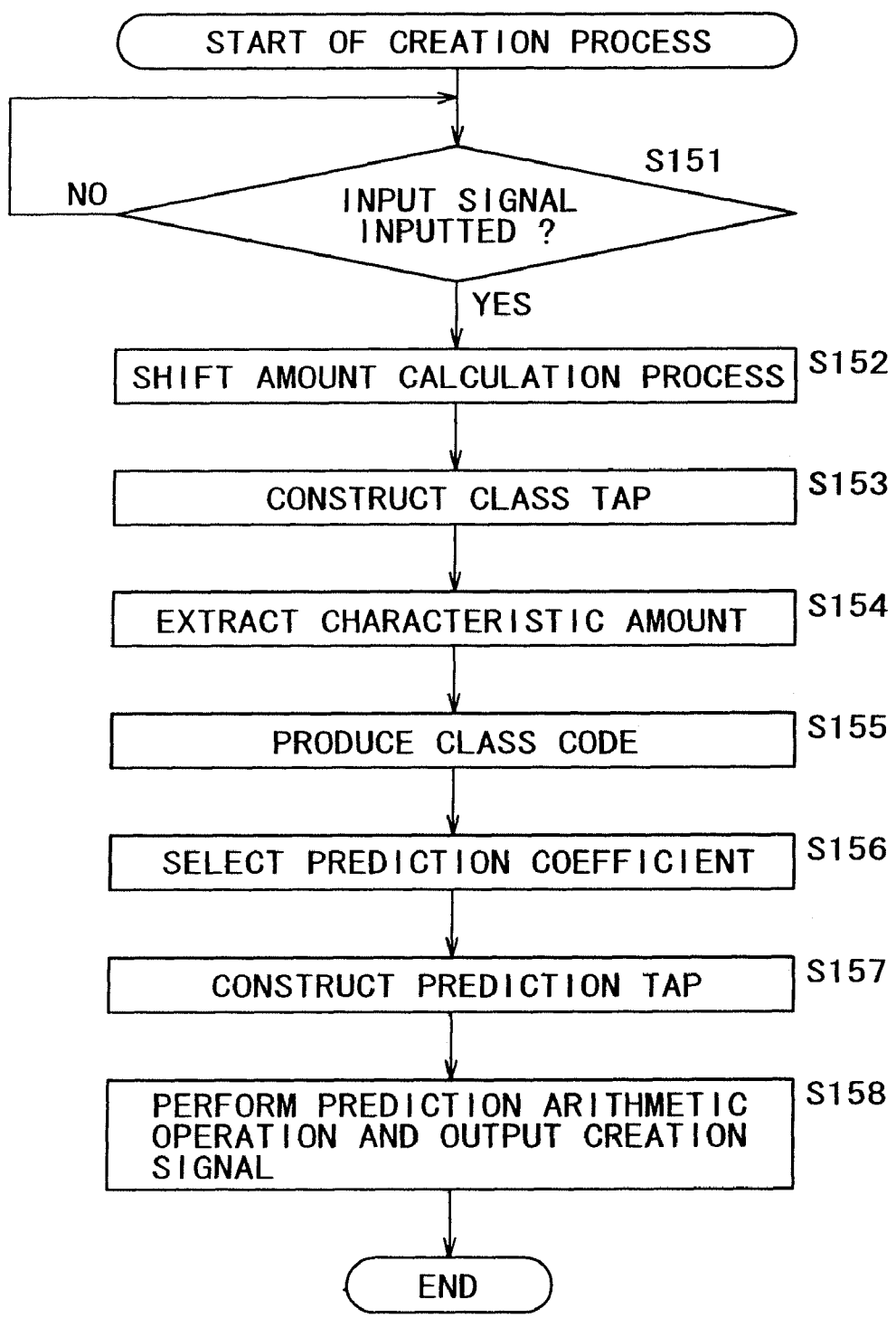
FIG. 55 is a flow chart illustrating an exemplary creation process of the classification adaptation processing section of FIG. 53.

A creation process of the classification adaptation processing section 31 of FIG. 53 is described with reference to a flow chart of FIG. 55. It is to be noted that the creation process of FIG. 55 is basically similar to the classification adaptation process of FIG. 11. In particular, a shift amount calculation process executed at step S152 of FIG. 55 is basically similar to the shift amount calculation process of FIG. 12. However, the reliability determination process executed at step S22 of FIG. 12 and the reliability calculation process (step S32 of FIG. 18 and step S112 of FIG. 40) in the motion compensating vector selection process executed at step S23 are replaced by the reliability calculation process that does not use the input signal and the creation signal as described above with reference to FIGS. 33, 37, 39 and 42. In other words, the shift information extraction section 62 of FIG. 53 does not execute the reliability calculation process (FIGS. 20 and 26), which uses the input signal and the creation signal.

Consequently, the shift amount detection characteristic amount output together with the shift amount in the shift amount calculation process at step S152 of FIG. 55 does not include such information as the motion compensation residual, which is produced based on the input signal and the creation signal. Accordingly, a class tap is constructed at step S153 based on the shift amount detection characteristic information (such as, for example, the reliability of the motion compensating vector) other than such information as the motion compensation residual produced based on the input signal and the creation signal. Then at step S154, a characteristic amount is extracted, and at step S155, a class code is produced. Then at step S156, a prediction coefficient is selected, and a prediction tap is constructed at step S157, whereafter a creation signal is produced and output at step S158.

It is to be noted that the configuration of the shift information extraction section 62 of FIGS. 2 and 53 allows four combinations from among the reliability determination section 101 and the motion compensating vector selection sections 102 and 210 (shift information extraction section 62 of FIGS. 3, 31, 43 and 54) and may have any configuration only if the conditions are satisfied.

Figure 56:
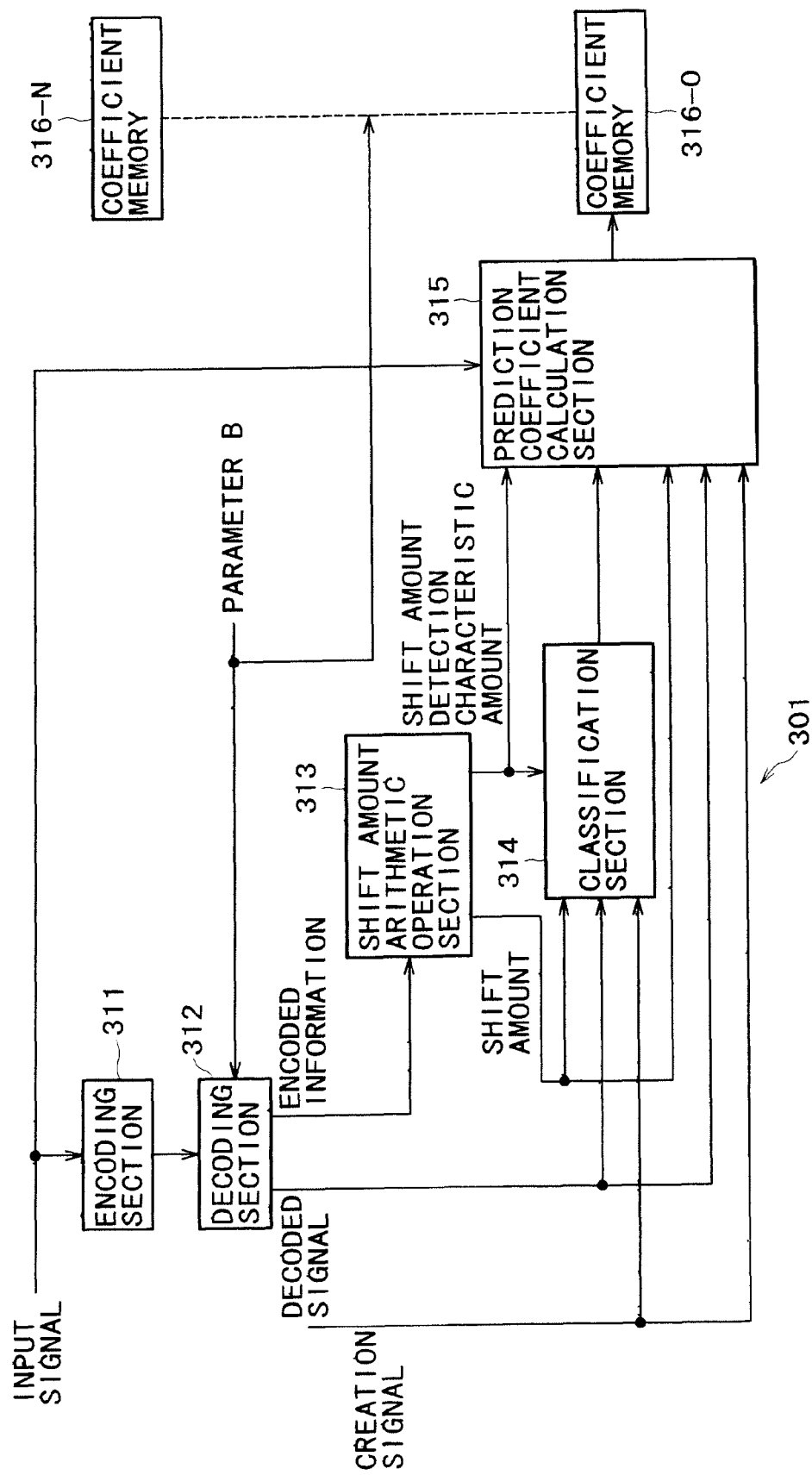
FIG. 56 is a block diagram showing another exemplary configuration of the learning apparatus of FIG. 51.

FIG. 56 shows an example of configuration of the learning apparatus 301 that learns prediction coefficient data to be stored into the coefficient memories 71-0 to 71-N of the classification adaptation processing section 31 of FIG. 53. It is to be noted that like elements to those of FIG. 51 are denoted by like reference characters. In particular, the learning apparatus 301 of FIG. 56 is configured basically similarly to that in FIG. 51.

However, the decoded signal or the creation signal is not input to the shift amount arithmetic operation section 313. Thus, the shift amount arithmetic operation section 313 of FIG. 56 only uses candidate vectors supplied from the decoding section 312 and compares and evaluates them with other motion compensating vectors to evaluate the reliabilities of the candidate vectors. Then, the shift amount arithmetic operation section 313 selects that one of the candidate vectors having the highest reliability as a selected vector and calculates a shift amount of a central tap and a shift amount detection characteristic amount such as the reliability of the selected vector based on the selected vector. Thereafter, the shift amount arithmetic operation section 313 outputs the shift amount and the shift amount detection characteristic amount to the classification section 314 and the prediction coefficient calculation section 315.

Figure 57:
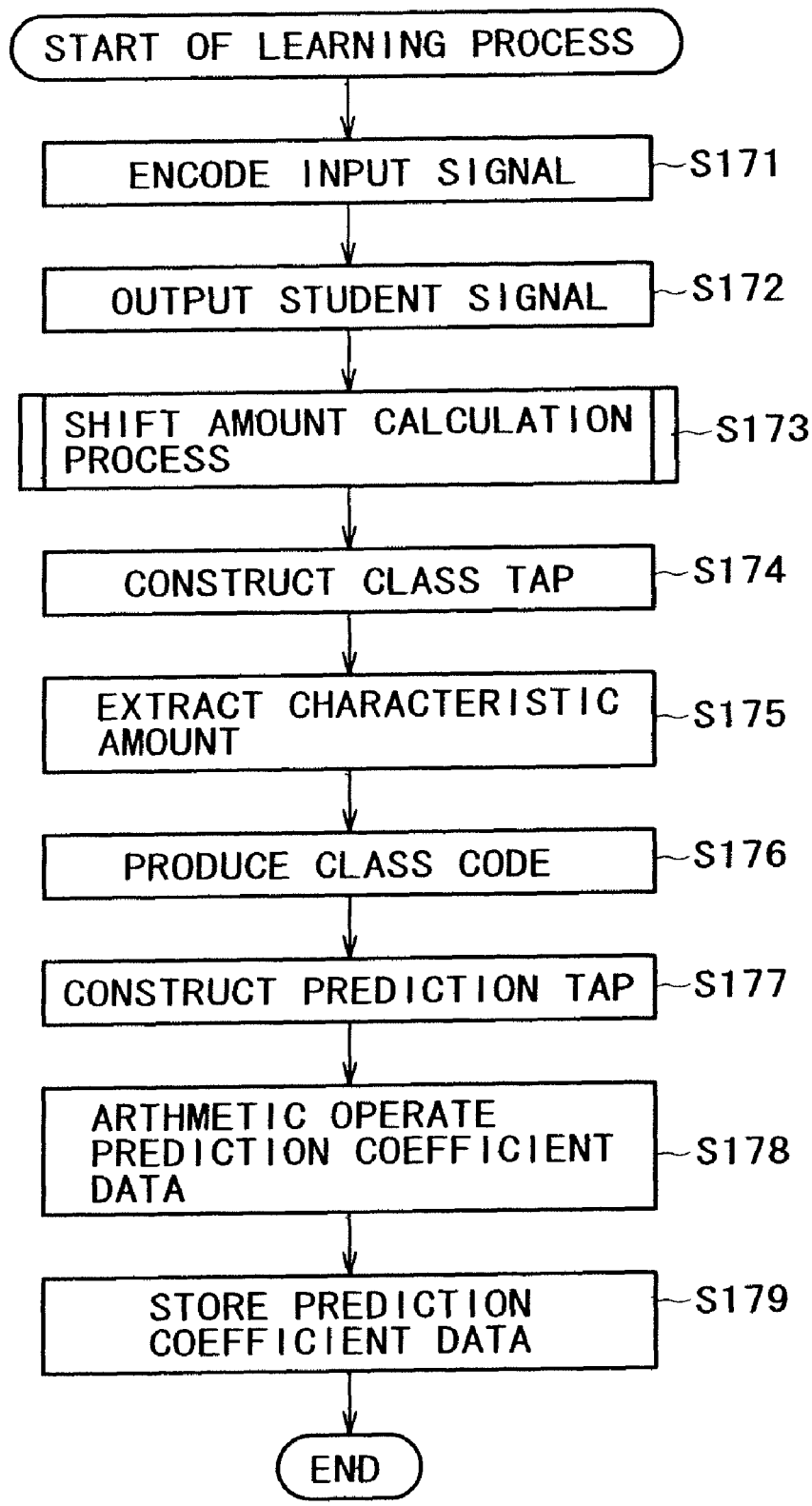
FIG. 57 is a flow chart illustrating a learning process of the learning apparatus of FIG. 56.

A learning process of the learning apparatus 301 of FIG. 56 is described with reference to a flow chart of FIG. 57. It is to be noted that the learning process of FIG. 57 is basically similar to the learning process of FIG. 52. In particular, a shift amount calculation process executed at step S173 of FIG. 57 is basically similar to the shift amount calculation process of FIG. 12. It is to be noted, however, that the reliability determination process executed at step S22 of FIG. 12 and the reliability calculation process (at step S32 of FIG. 18 and step S112 of FIG. 44) in the motion compensating process selection process executed at step S23 are the reliability calculation process that does not use the input signal and the recreation signal described hereinabove with reference to FIGS. 33, 37, 39 and 42. In other words, the shift amount arithmetic operation section 313 of FIG. 56 does not execute the reliability calculation process (FIGS. 20 and 26), which uses the input signal and the creation signal.

Consequently, the shift amount detection characteristic amount output together with the shift amount in the shift amount calculation process at step S173 of FIG. 57 does not include information such as a motion compensation residual, which is produced based on the input signal and the creation signal. Accordingly, at step S174, a class tap is constructed based on the shift amount detection characteristic amount (for example, the reliability of the motion compensating vector) other than the information such as a motion compensation residual, which is produced based on the input signal and the creation signal. Then at step S175, a characteristic amount is extracted, and a class code is produced at step S176, whereafter a prediction tap is constructed at step S177. Then at step S178, the learning apparatus 301 uses the prediction tap and corresponding teacher data to learn the relationship between the teacher data and student data based on the class code from the classification section 314 and predicts a prediction coefficient from the parameter B to arithmetically operate and produce prediction coefficient data for each class. Then, the learning apparatus 301 stores the prediction coefficient data into the coefficient memories 316-0 to 316-N in accordance with the parameter B.

The prediction coefficient data for the individual classes stored in the coefficient memories 316-0 to 316-N in such a manner as described above are stored into the coefficient memories 71-0 to 71-N of the prediction coefficient selection section 53 of FIG. 53.

Figure 58:
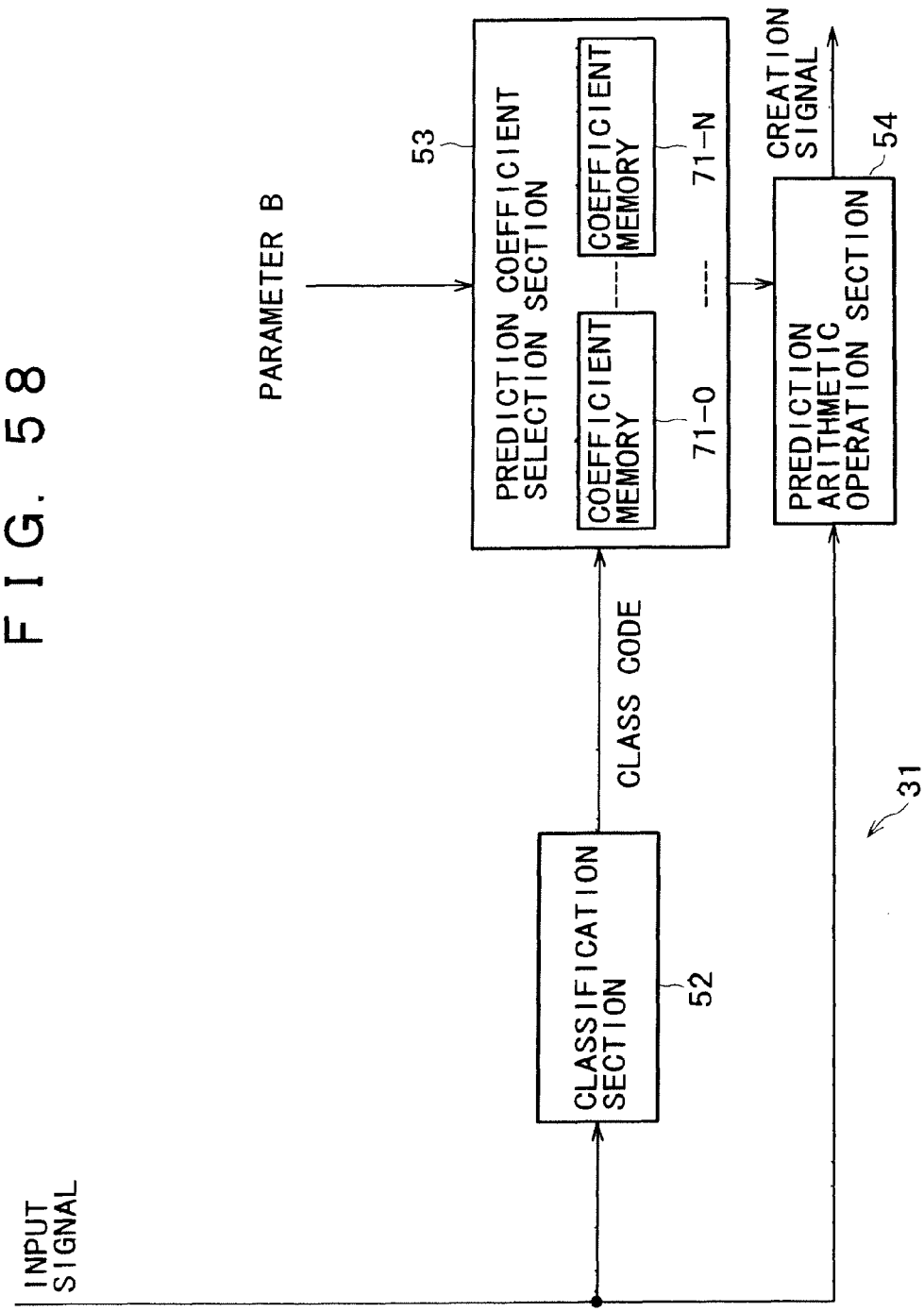
FIG. 58 is a block diagram showing a further exemplary configuration of the classification adaptation processing section of FIG. 1.

FIG. 58 shows a third example of configuration of the classification adaptation processing section 31 of FIG. 1. It is to be noted that, in FIG. 58, like elements to those of FIG. 2 are denoted by like reference characters.

In the example of FIG. 58, the classification adaptation processing section 31 that does not involve an intra-frame process (a process that does not refer to any other picture, that is, a process that does not execute motion compensation prediction) is shown. In the classification adaptation processing section 31 of FIG. 58, the input signal is input to the classification section 52 and the prediction arithmetic operation section 54. The classification section 52 uses the input signal to construct a class tap, produces a class code based on an extracted characteristic amount and outputs the class code to the prediction coefficient selection section 53.

The prediction arithmetic operation section 54 uses the input signal to construct a prediction tap, uses prediction coefficient data from the prediction coefficient selection section 53 to execute an arithmetic operation process based on the prediction tap, performs an intra-frame process to create a time resolution and outputs a creation signal of the created time resolution. Accordingly, the classification adaptation processing section 31 of FIG. 58 does not use the creation signal.

Subsequently, the creation process executed by the classification adaptation processing section 31 of FIG. 58 is described with reference to a flow chart of FIG. 59.

The classification section 52 waits until the input signal is input thereto at step S201. If the input signal is input, then the classification section 52 uses the input signal to construct a class tap in accordance with the noticed pixel at step S202.

At step S203, the classification section 52 extracts a characteristic amount of a pixel, which forms the constructed class tap. Then at step S204, the classification section 52 produces a class code by a 1-bit ADRC process or the like based on the extracted characteristic amount and outputs the class code to the prediction coefficient selection section 53.

At step S205, the prediction coefficient selection section 53 selects one of the coefficient memories 71-0 to 71-N corresponding to the parameter B output from the parameter control section 27. The prediction coefficient selection section 53 selects, from among the prediction coefficient data stored in the selected coefficient memory, prediction data corresponding to the class code output from the classification section 52, and outputs the selected prediction coefficient data to the prediction arithmetic operation section 54. It is to be noted that such prediction coefficient data are calculated by a learning apparatus 301, which is hereinafter described with reference to FIG. 60, and stored in advance in the coefficient memories 71-0 to 71-N in accordance with the parameter B.

The prediction arithmetic operation section 54 constructs a prediction tap in accordance with the noticed pixel from the input signal at step S206. Then at step S207, the prediction arithmetic operation section 54 uses the prediction coefficient data selected by the prediction coefficient selection section 53 to perform a prediction arithmetic operation process to produce a creation signal and outputs the creation signal.

Figure 60:
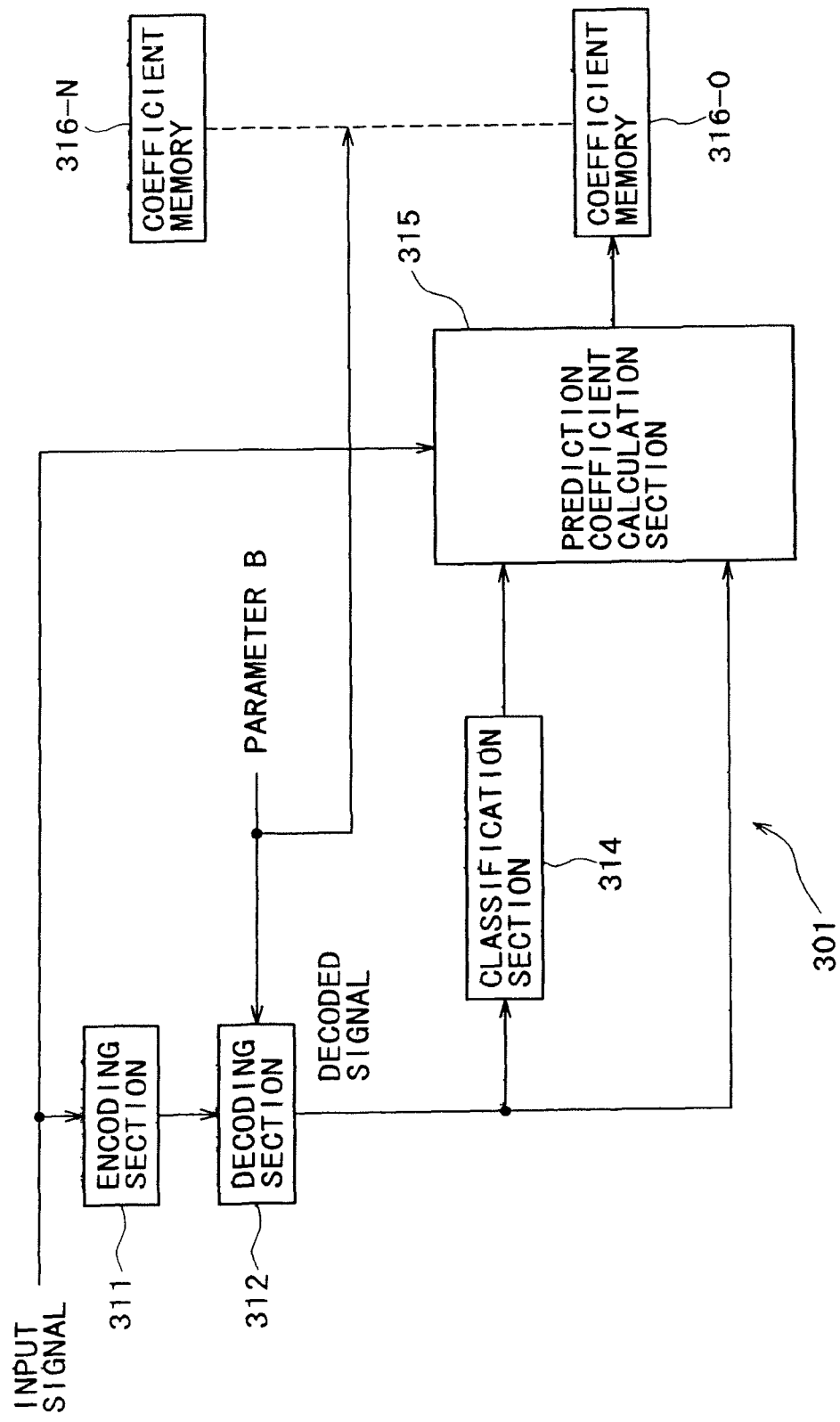
FIG. 60 is a block diagram showing a further exemplary configuration of the learning apparatus of FIG. 51.

FIG. 60 shows an example of configuration of the learning apparatus 301 that learns prediction coefficient data for individual classes to be stored into the coefficient memories 71-0 to 71-N built in the prediction coefficient selection section 53 of the classification adaptation processing section 31 of FIG. 58. In the example of FIG. 60, an example of configuration of the classification adaptation processing section 31 where an intra-frame process is executed is shown. It is to be noted that like elements to those in FIG. 51 are denoted by like reference characters.

The learning apparatus 301 of the example of FIG. 60 receives only the input signal but does not receive the creation signal as an input thereto.

The classification section 314 of FIG. 60 is configured basically similarly to the classification section 52 of FIG. 58. The classification section 314 uses a student signal which is a decoded signal supplied from the decoding section 312, to construct a class tap and outputs a class code to the prediction coefficient calculation section 315.

The prediction coefficient calculation section 315 uses the student signal to construct a prediction tap, and uses the prediction tap and the corresponding teacher signal (input signal) to learn the relationship between the teacher signal and the student signal based on the class code from the classification section 314. Then, the prediction coefficient calculation section 315 predicts a prediction coefficient for each parameter B to arithmetically operate and produce prediction coefficient data for the individual classes, and stores the prediction coefficient data into the coefficient memories 316-0 to 316-N in accordance with the parameter B.

Figure 61:
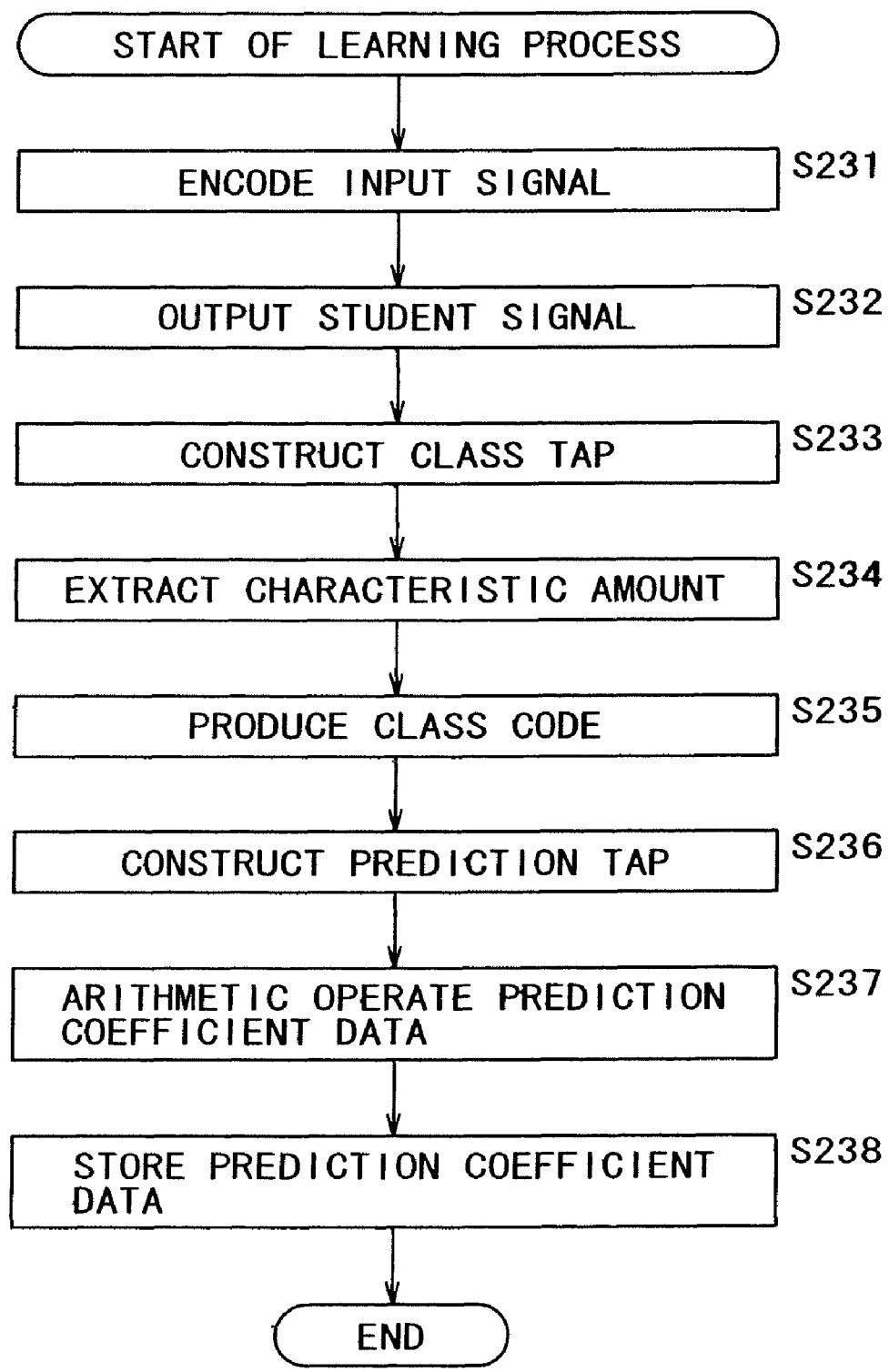
FIG. 61 is a flow chart illustrating a learning process of the learning apparatus of FIG. 60.

Now, a learning process of the learning apparatus 301 of FIG. 60 is described with reference to a flow chart of FIG. 61.

At step S231, the encoding section 311 encodes the input signal and outputs the encoded signal to the decoding section 312. At step S232, the decoding section 312 decodes the encoded signal in accordance with the parameter B and outputs the decoded signal as a student signal to the classification section 314 and the prediction coefficient calculation section 315.

The classification section 314 uses the student signal to construct a class tap at step S233 and extracts a characteristic amount of the class tap based on the student signal at step S234. At step S235, the classification section 314 produces a class code based on the extracted characteristic amount of the class tap and outputs the class code to the prediction coefficient calculation section 315.

At step S236, the prediction coefficient calculation section 315 uses the student signal to construct a prediction tap. At step S237, the prediction coefficient calculation section 315 uses the prediction tap and the corresponding teacher signal to learn the relationship between the teacher signal and the student signal based on the class code from the classification section 314 and predicts a prediction coefficient from the parameter B to arithmetically operate and produce prediction coefficient data for each class. Then at step S238, the prediction coefficient calculation section 315 stores such prediction coefficient data into the coefficient memories 316-0 to 316-N in accordance with the parameter B and then ends its processing.

The prediction coefficient data for the individual classes stored in the coefficient memories 316-0 to 316-N in accordance with the parameter B in this manner are stored into the coefficient memories 71-0 to 71-N of the prediction coefficient selection section 53 of FIG. 60.

It is to be noted that the image data processing apparatus of the exemplary embodiment is applied to DVD recording and/or reproduction apparatus, BS digital signal reception apparatus and the like.

The series of processes described above may be executed by hardware or by software. In the latter case, the image data processing apparatus 1 of FIG. 1 is formed from, for example, such an image data processing apparatus 401 as shown in FIG. 62.

Figure 62:
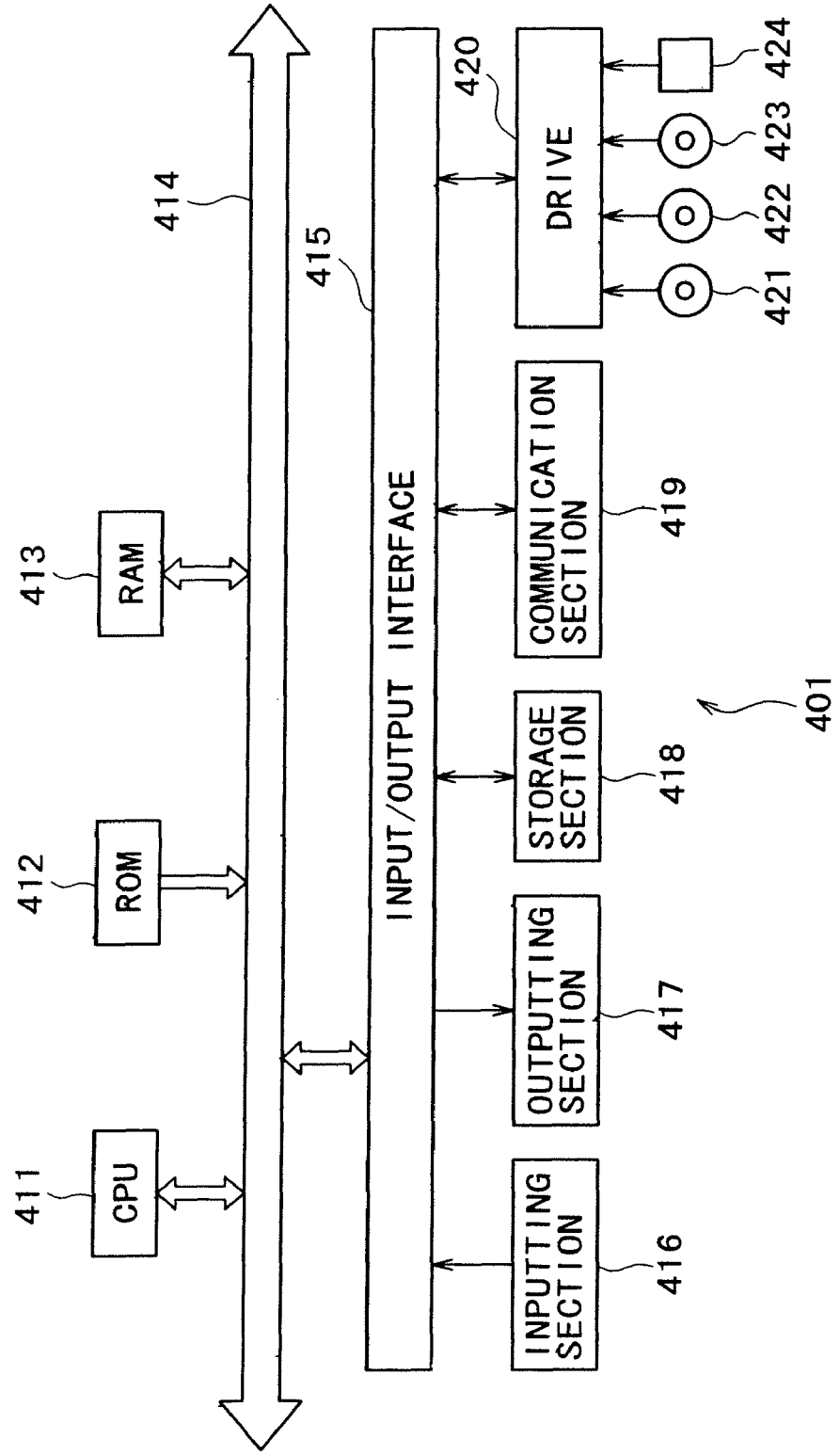
FIG. 62 is a block diagram showing another exemplary configuration of the image data processing apparatus of the present invention.

Referring to FIG. 62, a CPU (Central Processing Unit) 411 executes various processes in accordance with a program stored in a ROM (Read Only Memory) 412 or a program loaded in a RAM (Random Access Memory) 413 from a storage section 418. Also data necessary for the CPU 411 to execute various processes and so forth are suitably stored into the RAM 413.

The CPU 411, ROM 412 and RAM 413 are connected to each other by a bus 414. Also an input/output interface 415 is connected to the bus 414.

Connected to the input/output interface 415 are an input section 416 including a keyboard, a mouse and so forth, an output section 417 including a display unit in the form of a CRT (Cathode Ray Tube), an LCD (Liquid Crystal Display) unit or the like and a speaker or the like, a storage section 418 including a hard disk or the like, and a communication section 419 including a modem, a terminal adapter and so forth. The communication section 419 performs a communication process through a network not shown.

A drive 420 is connected the input/output interface 415 when necessary. A magnetic disk 421, an optical disk 422, a magneto-optical disk 423, a semiconductor memory 424 or some other storage medium is suitably loaded into the drive 420, and a computer program read out from the thus loaded storage medium by the drive 420 is installed into the communication section 419 when necessary.

Where the series of processes are executed by software, a program that constructs the software is installed from a network or a recording medium into a computer incorporated in hardware for exclusive use or, for example, a personal computer for universal use, which can execute various functions by installing various programs.

The recording medium is formed as a package medium having the program recorded thereon or therein and distributed to a user in order to provide the program separately from a computer such as, as shown in FIG. 62, a magnetic disk 421 (including a floppy disk), an optical disk 422 (including a CD-ROM [Compact Disk-Read Only Memory] and a DVD [Digital Versatile Disk]), or a magneto-optical disk 423 (including an MD [Mini-Disk] [trademark]), or a semiconductor memory 334. The recording medium is also provided to a user in a state wherein it is incorporated in an apparatus body in advance by forming as a ROM in which the program is recorded or hard disk included in the communication section 419.

It is to be noted that, in the present specification, the steps that describe the program recorded in a recording medium may be but need not necessarily be processed in a time series in the order as described, and include processes that are executed in parallel or individually without being processed in a time series.

As described above, according to the exemplary embodiment, time resolution can be performed. Particularly, time resolution of a high quality can be performed. Further according to the present invention, coding distortion such as block distortion or mosquito noise is suppressed.

While a preferred embodiment of the present invention has been described using specific terms, such description is for illustrative purpose only, and it is to be understood that changes and variations may be made without departing from the spirit or scope of the following claims.

Thus, the foregoing discussion discloses and describes merely exemplary embodiment of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as the claims. The disclosure, including any readily discernible variants of the teachings herein, define, in part, the scope of the foregoing claim terminology such that no inventive subject matter is dedicated to the public.

This Application claims the benefit of priority document JP 2002-371403, filed in Japan on Dec. 24, 2002, the entire contents of which are incorporated by reference herein in its entirety.

What is claimed is:

1. An image data processing apparatus, comprising:
    selection means for selecting a motion compensating vector of a noticed region based on additional information added to student data;
    classification means for classifying the noticed region into one of a plurality of classes based on the motion compensating vector selected by said selection means; and
    means for constructing a prediction tap of the noticed region based on the motion compensating vector selected by said selection means, for predicting a prediction coefficient based on the one of the plurality of classes and using teacher data corresponding to the constructed prediction tap, for producing prediction coefficient data for each class, based on the prediction coefficient, and for storing the prediction coefficient data in a coefficient memory based on a quantization scale and a bit rate.

2. An image data processing apparatus according to claim 1, further comprising:
    tap extraction means for tap extracting the noticed region as a tap based on the motion compensating vector selected by said selection means, wherein
    said classification means classifies the noticed region into one of the plurality of classes based on a positional relationship of the noticed region drawn near as a tap by said tap extraction means and a boundary of the noticed region before drawn near as a tap by said tap extraction means.

3. An image data processing method, comprising:
    selecting a motion compensating vector of a noticed region based on additional information added to student data;
    classifying the noticed region into one of a plurality of classes based on the motion compensating vector selected by the selecting;
    constructing a prediction tap of the noticed region based on the motion compensating vector selected by the selecting and learning a prediction coefficient based on the one of the plurality of classes and using teacher data corresponding to the constructed prediction tap;
    producing prediction coefficient data for each class, based on the prediction coefficient; and
    storing the prediction coefficient data in a coefficient memory based on a quantization scale and a bit rate.

4. A computer readable carrier, including computer program instructions that cause a computer to implement a method of creating a time resolution for an image data signal, on which a computer-readable program is recorded, the method comprising:
    selecting a motion compensating vector of a noticed region based on additional information added to student data;
    classifying the noticed region into one of a plurality of classes based on the motion compensating vector selected by the selecting;
    constructing a prediction tap of the noticed region based on the motion compensating vector selected by the selecting and learning a prediction coefficient based on the one of the plurality of classes and using teacher data corresponding to the constructed prediction tap;
    producing prediction coefficient data for each class, based on the prediction coefficient; and
    storing the prediction coefficient data in a coefficient memory based on a quantization scale and a bit rate.

5. An image data processing apparatus, comprising:
a selection unit that selects a motion compensating vector of a noticed region based on additional information added to student data;
a classification unit configured to classify the noticed region into one of a plurality of classes based on the motion compensating vector selected by said selection unit; and
a learning unit configured to construct a prediction tap of the noticed region based on the motion compensating vector selected by said selection unit, to learn a prediction coefficient based on the one of the plurality of classes and using teacher data corresponding to the constructed prediction tap, to produce prediction coefficient data for each class, based on the prediction coefficient, and to store the prediction coefficient data in a coefficient memory based on a quantization scale and a bit rate.

* * * * *